(12) United States Patent
Dar et al.

(10) Patent No.: US 7,188,070 B2
(45) Date of Patent: Mar. 6, 2007

(54) VEHICLE RELATED SERVICES SYSTEM AND METHODOLOGY

(75) Inventors: Yair Dar, Moshav Gealia (IL); Ofer Dar, Moshav Gealia (IL)

(73) Assignee: Good Space Ltd., Belize (BZ)

( * ) Notice: Subject to any disclaimer, the term of this patent is extended or adjusted under 35 U.S.C. 154(b) by 1148 days.

(21) Appl. No.: 09/731,643

(22) Filed: Dec. 7, 2000

(65) Prior Publication Data

US 2001/0039509 A1 Nov. 8, 2001

Related U.S. Application Data

(60) Provisional application No. 60/192,199, filed on Mar. 27, 2000.

(51) Int. Cl.
*G06F 17/60* (2006.01)

(52) U.S. Cl. .............................. 705/1; 705/13
(58) Field of Classification Search .................. 705/13, 705/12, 1, 418; 701/29, 35
See application file for complete search history.

(56) References Cited

U.S. PATENT DOCUMENTS

| | | | |
|---|---|---|---|
| 4,533,962 A | 8/1985 | Decker et al. | |
| 4,555,618 A | 11/1985 | Riskin | |
| 4,843,463 A | 6/1989 | Michetti | |
| 4,876,540 A | 10/1989 | Berthon et al. | |
| 4,908,500 A | 3/1990 | Baumberger | |
| 4,958,064 A | 9/1990 | Kirkpatrick | |
| 4,965,821 A * | 10/1990 | Bishop et al. | ............... 455/409 |
| 5,029,094 A | 7/1991 | Wong | |
| 5,034,739 A | 7/1991 | Gruhl | |
| 5,072,380 A | 12/1991 | Randelman et al. | |
| 5,153,559 A | 10/1992 | Atsumi | |
| 5,173,833 A | 12/1992 | Hirotsune et al. | |
| 5,210,702 A | 5/1993 | Bishop et al. | |
| 5,223,844 A | 6/1993 | Mansell et al. | |
| 5,266,947 A | 11/1993 | Fujiwara et al. | |
| 5,283,622 A | 2/1994 | Ueno et al. | |

(Continued)

FOREIGN PATENT DOCUMENTS

EP 745 959 12/1996

(Continued)

OTHER PUBLICATIONS

Proquest "Clifford enters telematics with net-based car PC"; Twice, New York, Jan. 24, 2000. vol. 15.*

(Continued)

*Primary Examiner*—Romain Jeanty
(74) *Attorney, Agent, or Firm*—Abelman, Frayne & Schwab

(57) ABSTRACT

A vehicle-related services system and methodology employing at least one sensor automatically sensing at least one of the time during which a vehicle is not being operated and where the vehicle is located when it is not being operated and at least one data processor receiving information sensed by the sensor, indicating at least one of the time during which the vehicle is not being operated and where the vehicle is located when it is not being operated and providing a billing data output in respect of a vehicle-related service which is dependent on at least one of the time during which the vehicle is not being operated and where the vehicle is located when it is not being operated.

22 Claims, 39 Drawing Sheets

U.S. PATENT DOCUMENTS

| | | | |
|---|---|---|---|
| 5,289,369 A * | 2/1994 | Hirshberg | 705/13 |
| 5,319,374 A | 6/1994 | Desai et al. | |
| 5,339,000 A | 8/1994 | Bashan et al. | |
| 5,351,187 A | 9/1994 | Hassett | |
| 5,359,528 A | 10/1994 | Haendel et al. | |
| 5,414,624 A | 5/1995 | Anthonyson | |
| 5,422,624 A | 6/1995 | Smith | |
| 5,432,508 A | 7/1995 | Jackson | |
| 5,442,348 A | 8/1995 | Mushell | |
| 5,490,079 A | 2/1996 | Sharpe et al. | 364/467 |
| 5,499,181 A | 3/1996 | Smith | |
| 5,499,182 A | 3/1996 | Ousborne | |
| 5,550,551 A | 8/1996 | Alesio | |
| 5,583,765 A | 12/1996 | Kleehammer | |
| 5,612,875 A | 3/1997 | Haendel et al. | |
| 5,621,166 A | 4/1997 | Butler | |
| 5,635,693 A | 6/1997 | Benson et al. | |
| 5,642,484 A | 6/1997 | Harrison, III et al. | |
| 5,659,306 A | 8/1997 | Bahar | |
| 5,694,322 A | 12/1997 | Westerlage et al. | |
| 5,710,557 A | 1/1998 | Schuette | |
| 5,710,743 A | 1/1998 | Dee et al. | |
| 5,717,374 A | 2/1998 | Smith | |
| 5,721,678 A | 2/1998 | Widl | |
| 5,737,710 A | 4/1998 | Anthonyson | |
| 5,742,915 A | 4/1998 | Stafford | |
| 5,745,052 A | 4/1998 | Matsuyama et al. | |
| 5,748,107 A | 5/1998 | Kersken et al. | |
| 5,751,973 A | 5/1998 | Hassett | |
| 5,793,309 A | 8/1998 | Nellson | 340/932.2 |
| 5,796,084 A | 8/1998 | Olsson | |
| 5,797,134 A | 8/1998 | McMillan et al. | |
| 5,809,480 A | 9/1998 | Chasek | |
| 5,819,234 A | 10/1998 | Slavin et al. | |
| 5,831,742 A | 11/1998 | Watson et al. | |
| 5,845,268 A | 12/1998 | Moore | |
| 5,862,500 A | 1/1999 | Goodwin | |
| 5,864,831 A | 1/1999 | Schuessler | |
| 5,877,704 A | 3/1999 | Yoshida | |
| 5,905,247 A | 5/1999 | Ilen | |
| 5,910,782 A | 6/1999 | Schmitt et al. | |
| 5,914,654 A | 6/1999 | Smith | |
| 5,917,434 A | 6/1999 | Murphy | |
| 5,926,546 A | 7/1999 | Maeda et al. | |
| 5,928,291 A | 7/1999 | Jenkins et al. | 701/1 |
| 5,940,481 A | 8/1999 | Zeitman | |
| 5,954,773 A | 9/1999 | Luper | |
| 5,963,129 A | 10/1999 | Warner | |
| 5,970,481 A | 10/1999 | Westerlage et al. | |
| 5,974,356 A | 10/1999 | Doyle et al. | |
| 5,980,185 A | 11/1999 | Vita | |
| 5,991,749 A | 11/1999 | Morrill, Jr. | |
| 5,995,898 A | 11/1999 | Tuttle | |
| 6,006,148 A | 12/1999 | Strong | |
| 6,028,550 A | 2/2000 | Froeberg et al. | |
| 6,037,880 A | 3/2000 | Manion | |
| 6,061,002 A | 5/2000 | Weber et al. | |
| 6,064,970 A | 5/2000 | McMillan et al. | |
| 6,067,008 A | 5/2000 | Smith | |
| 6,085,124 A | 7/2000 | Choi | |
| 6,112,152 A | 8/2000 | Tuttle | |
| 6,141,610 A * | 10/2000 | Rothert et al. | 701/35 |
| 2001/0037298 A1* | 11/2001 | Ehrman et al. | 705/40 |

FOREIGN PATENT DOCUMENTS

| | | |
|---|---|---|
| EP | 952 460 | 10/1999 |
| EP | 952 557 | 10/1999 |
| WO | WO 93/20539 | 10/1993 |
| WO | WO 9521435 A1 * | 8/1995 |
| WO | WO 97/04421 | 2/1997 |
| WO | WO 97/13222 | 4/1997 |
| WO | WO 00/11616 | 3/2000 |

OTHER PUBLICATIONS

Bailey "A simulation analysis of demand and fleet size effects on taxicab service rates"; Proceedings of the 1987 winter simulation conference; pp. 838-844.*

* cited by examiner

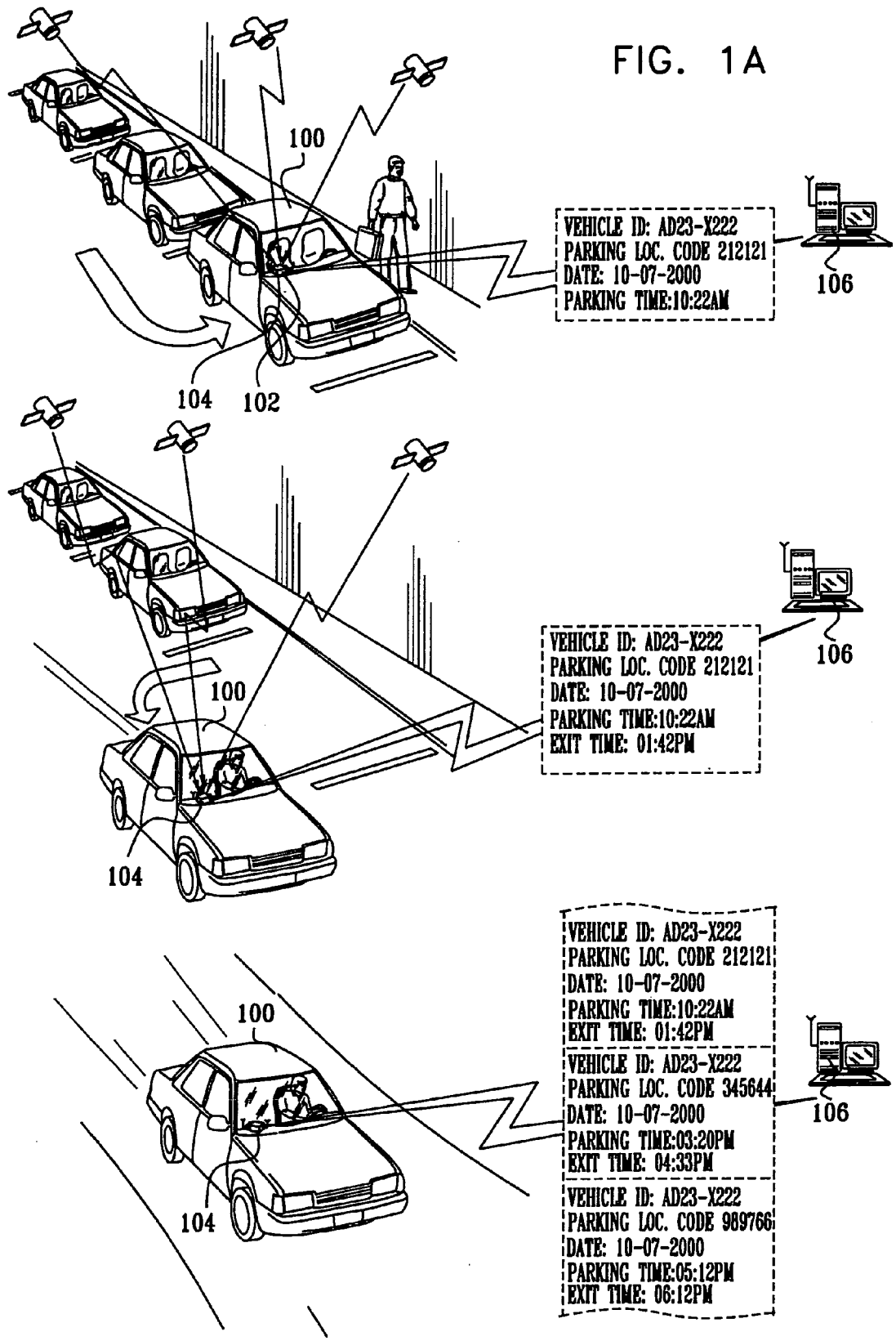

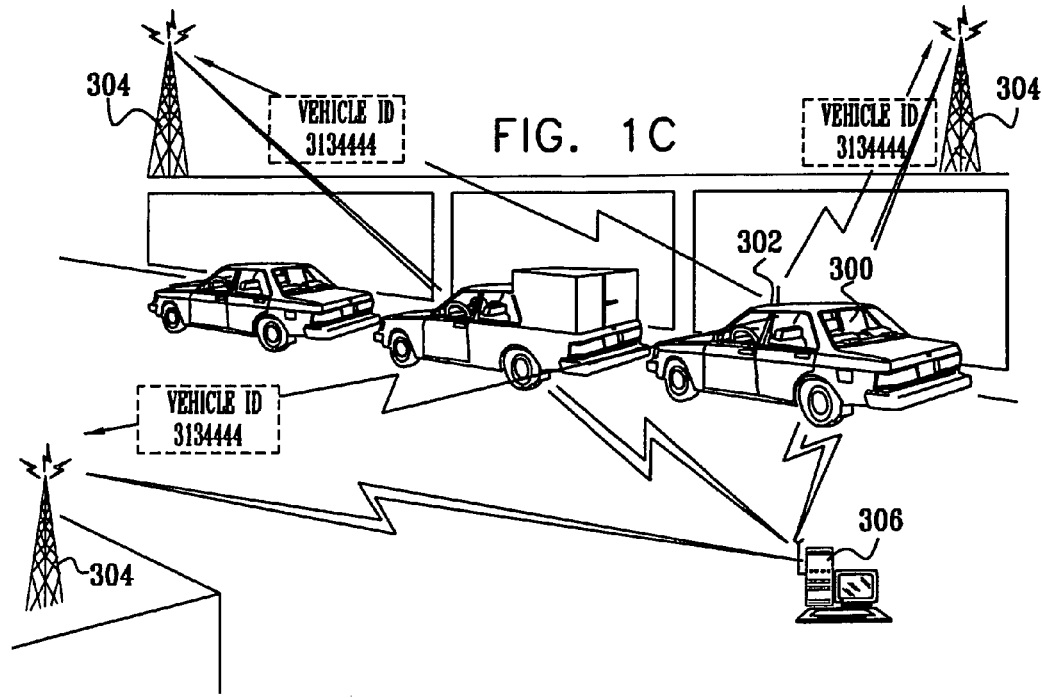
FIG. 1C
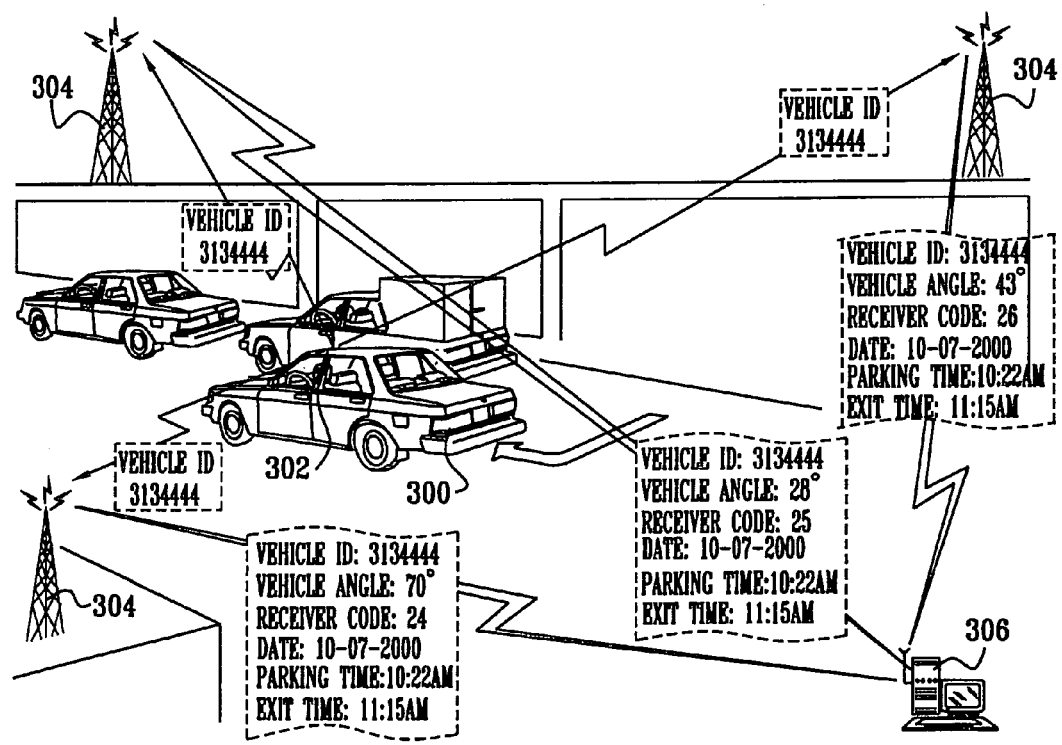

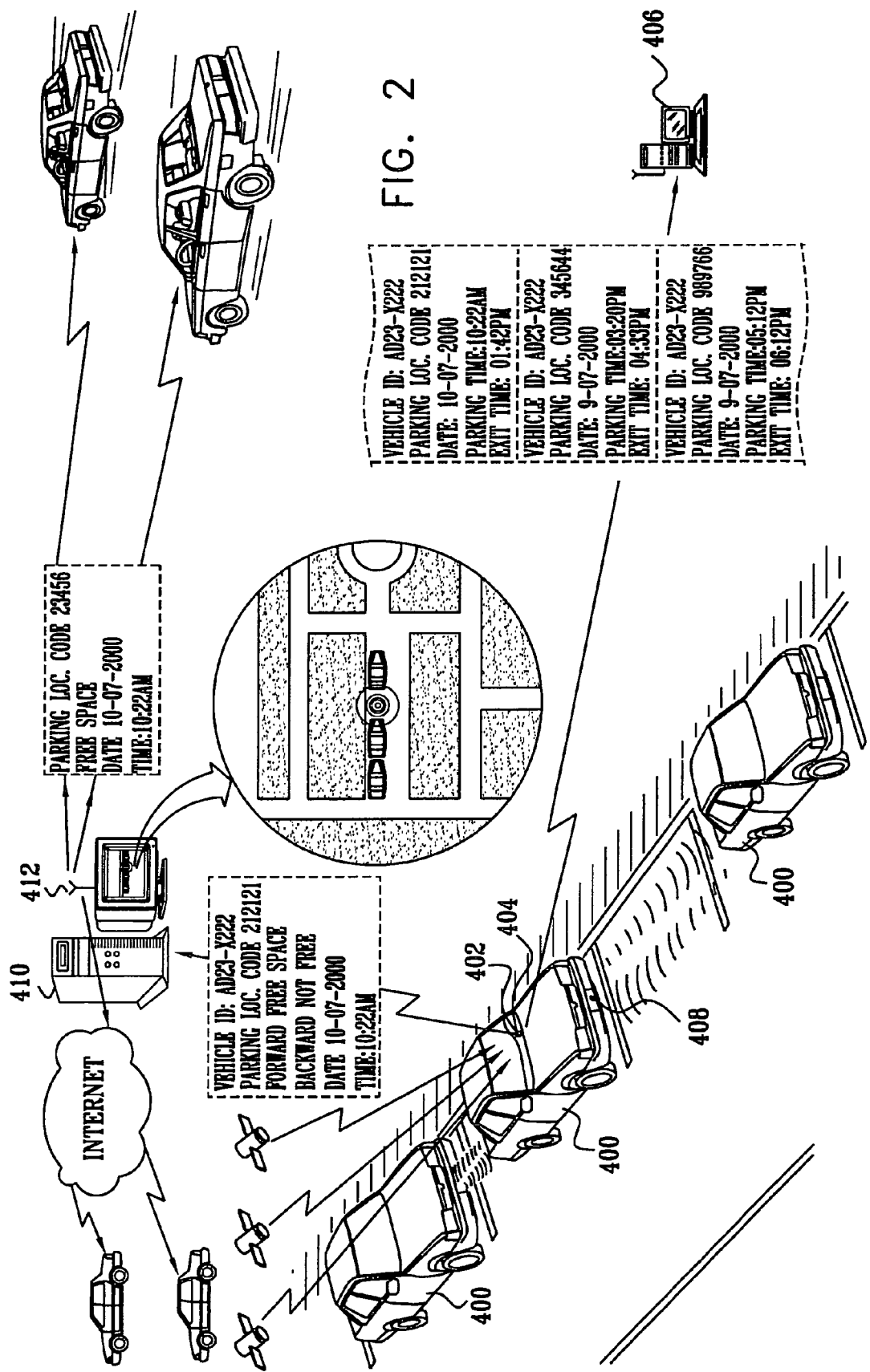

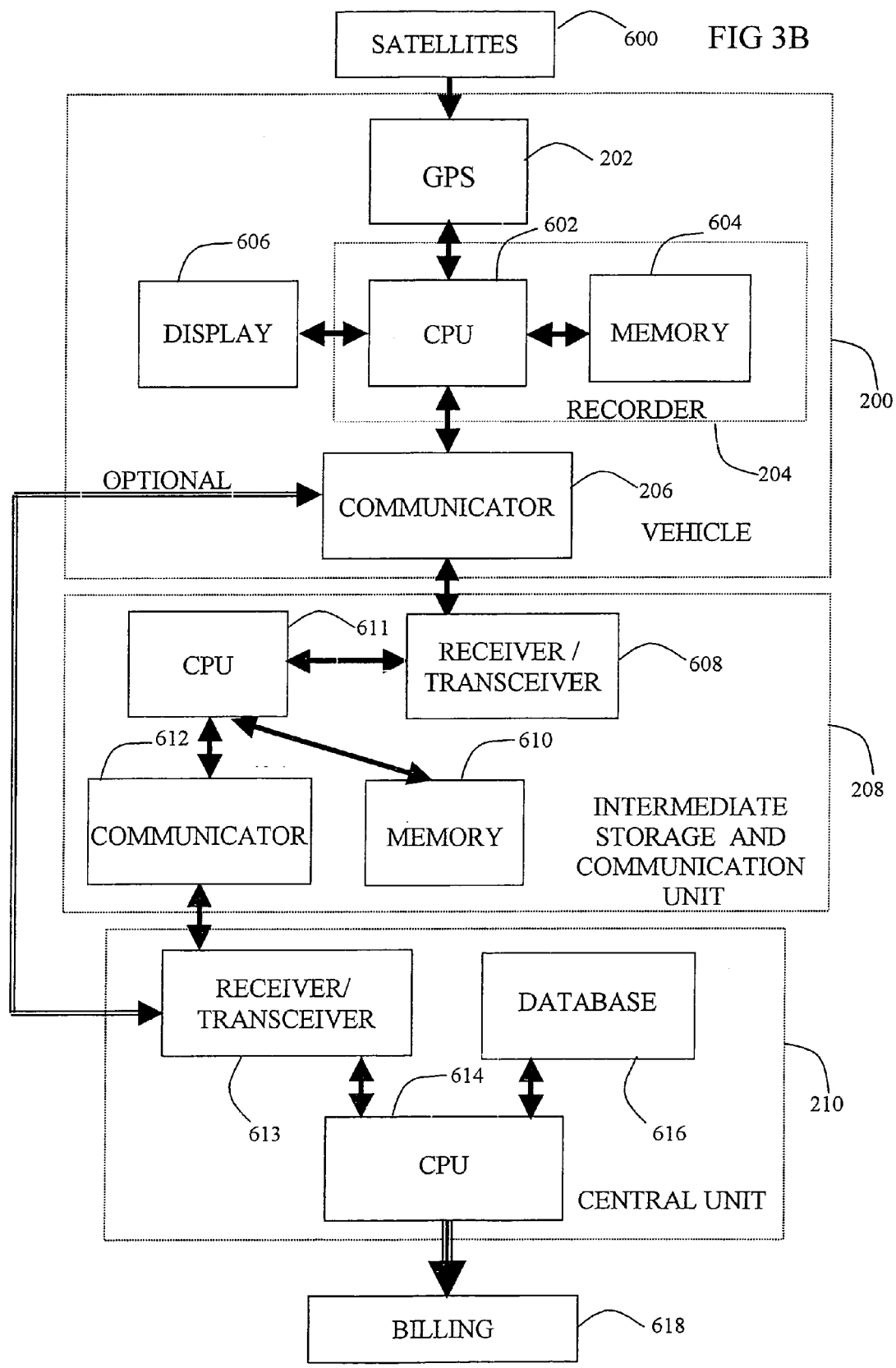

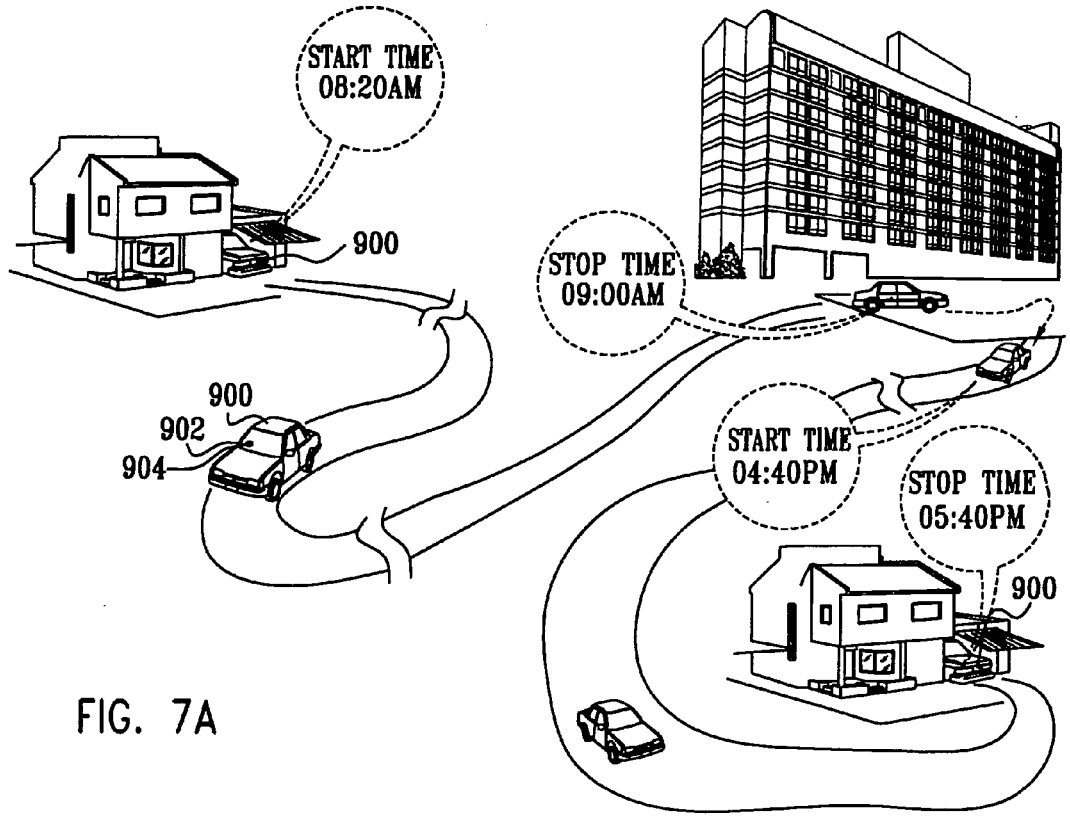
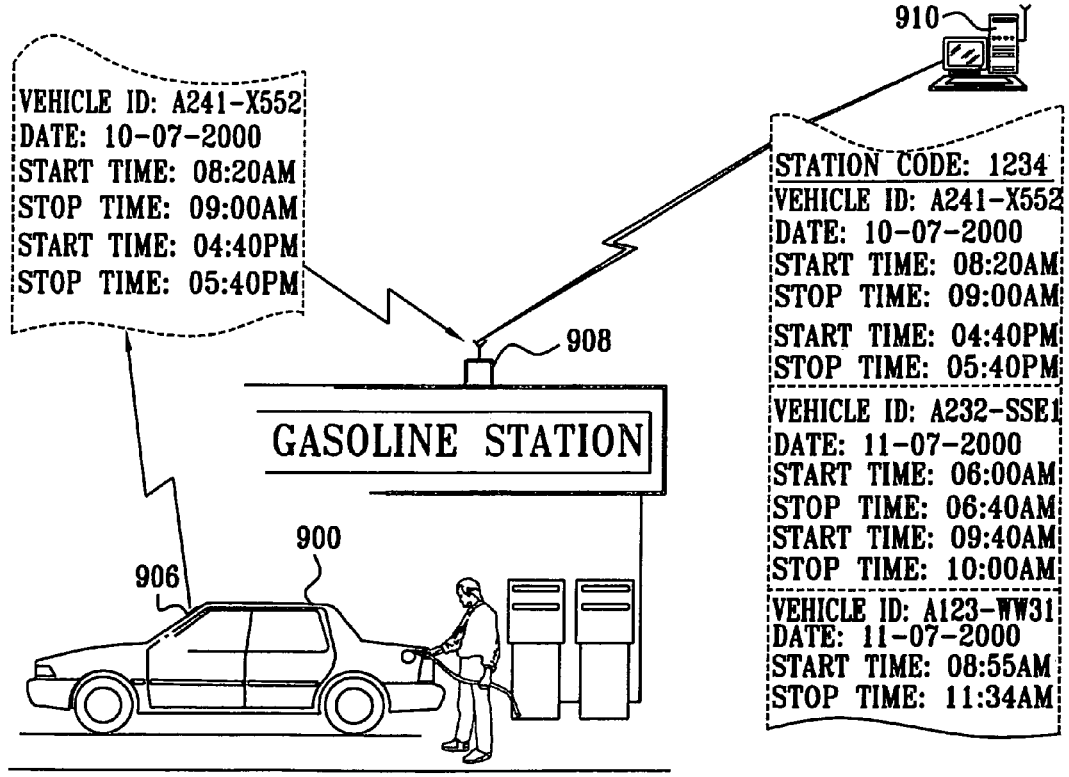
FIG. 7A

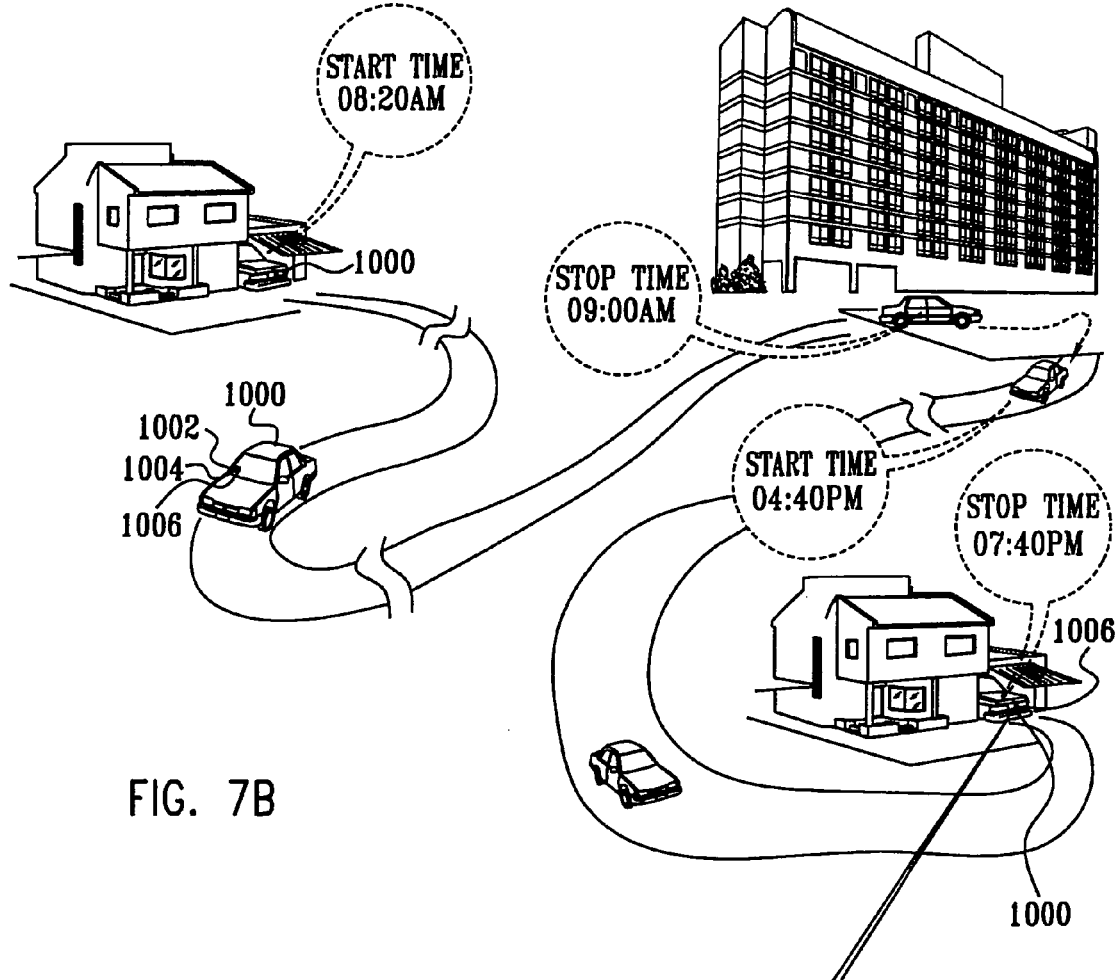
FIG. 7B
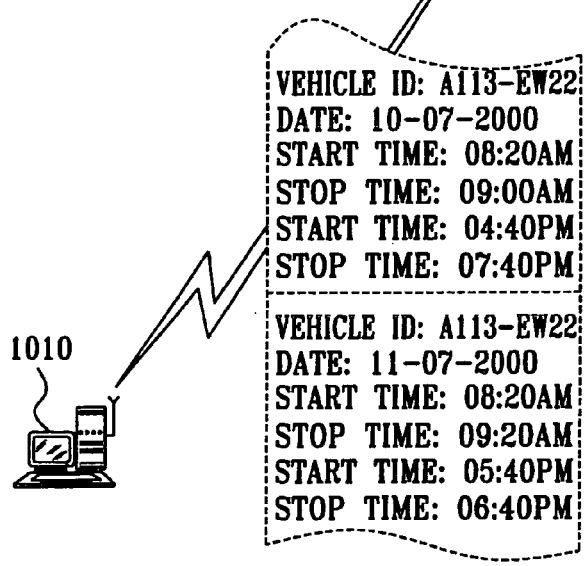

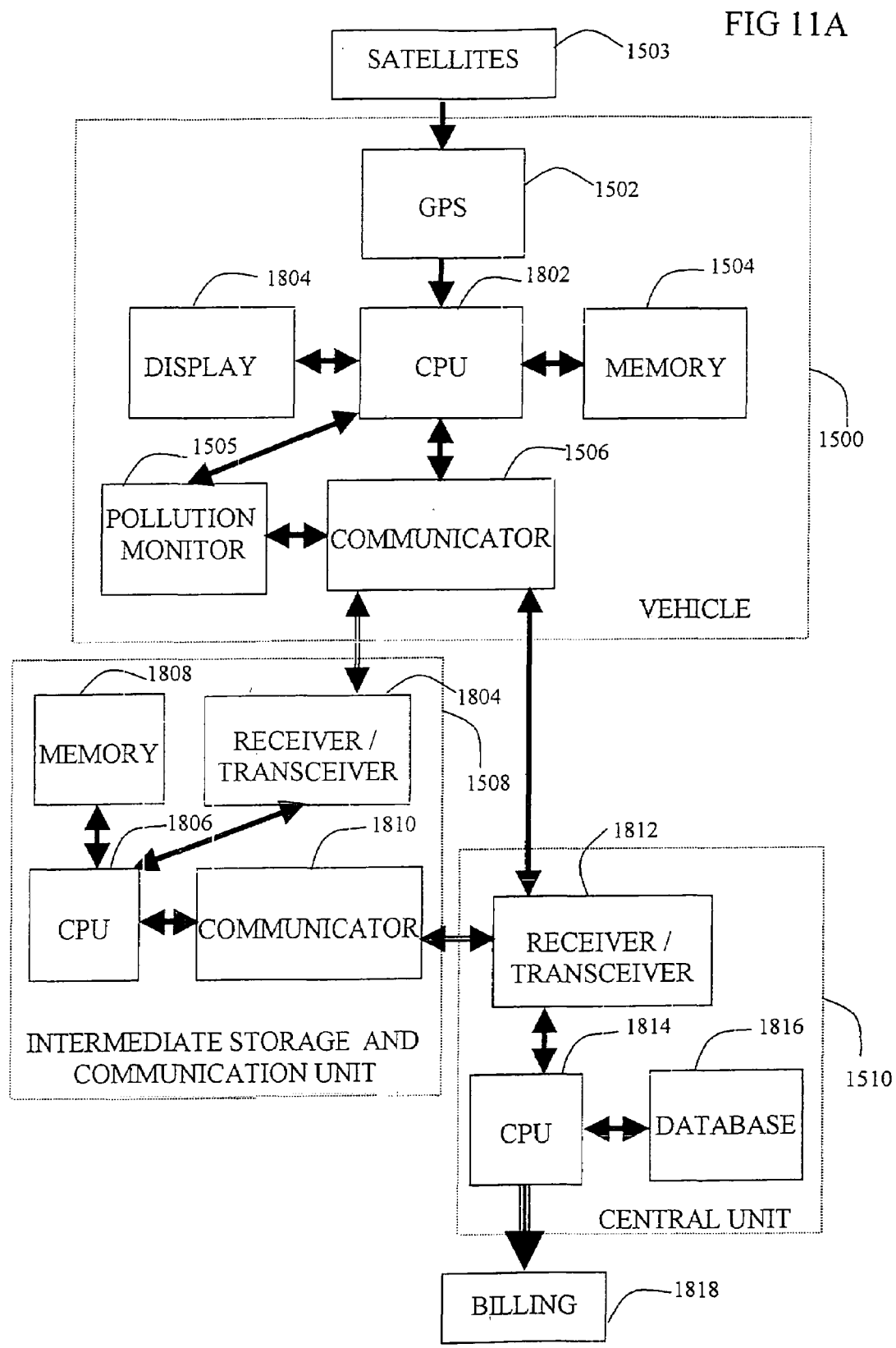

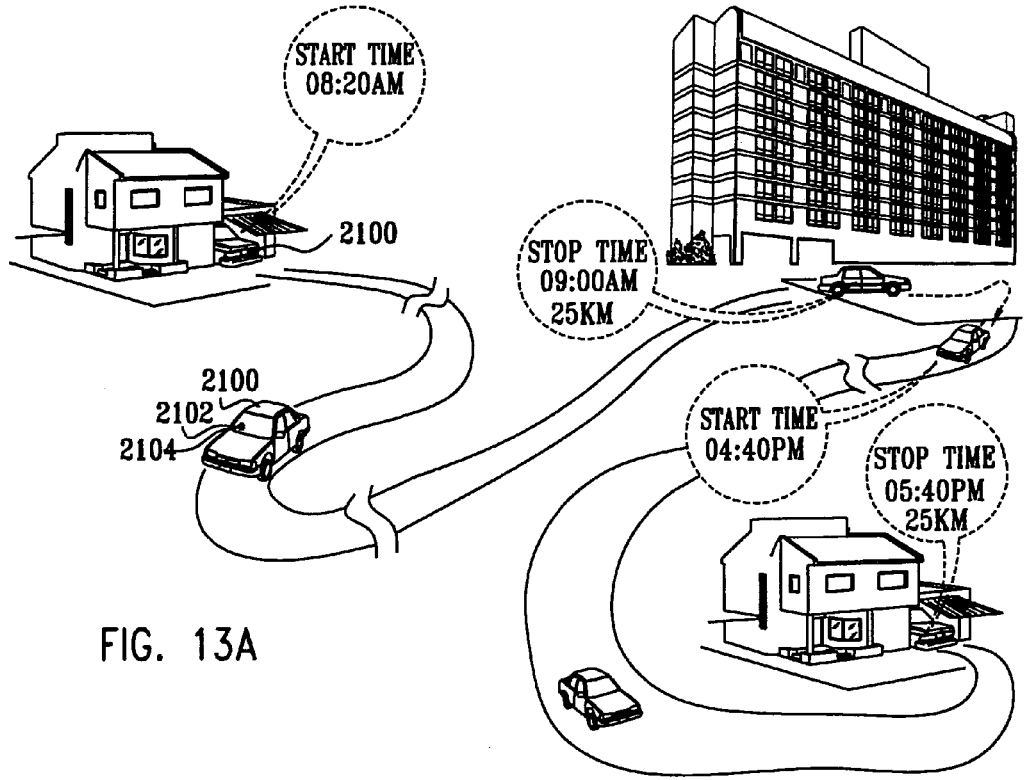
FIG. 13A
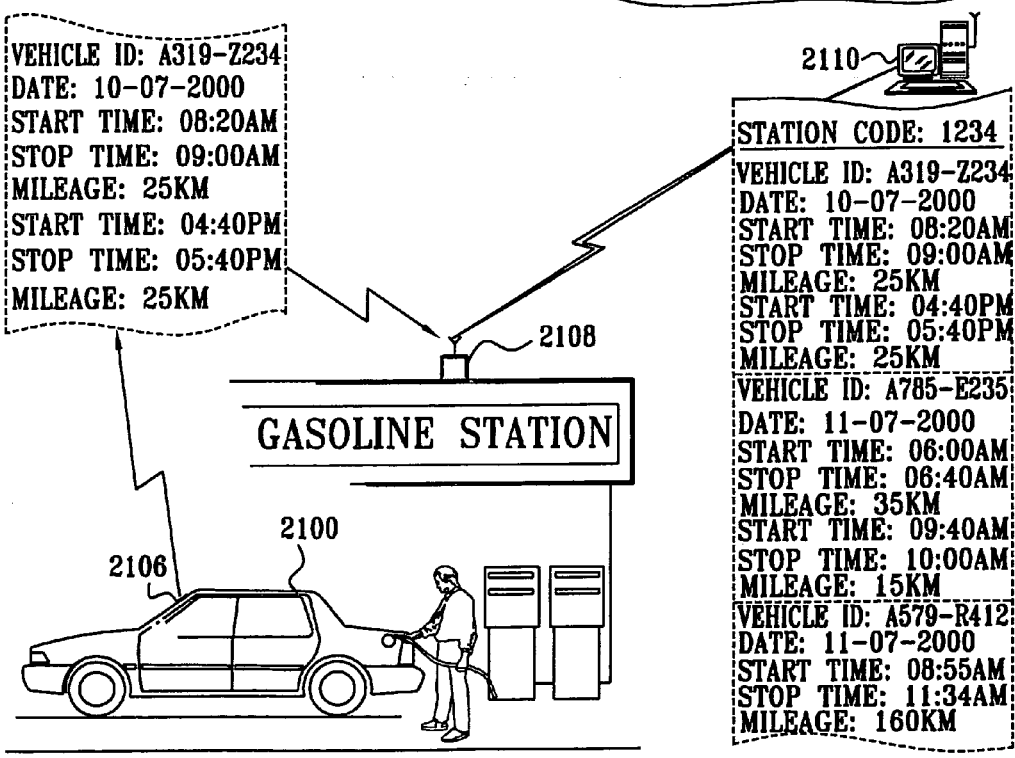

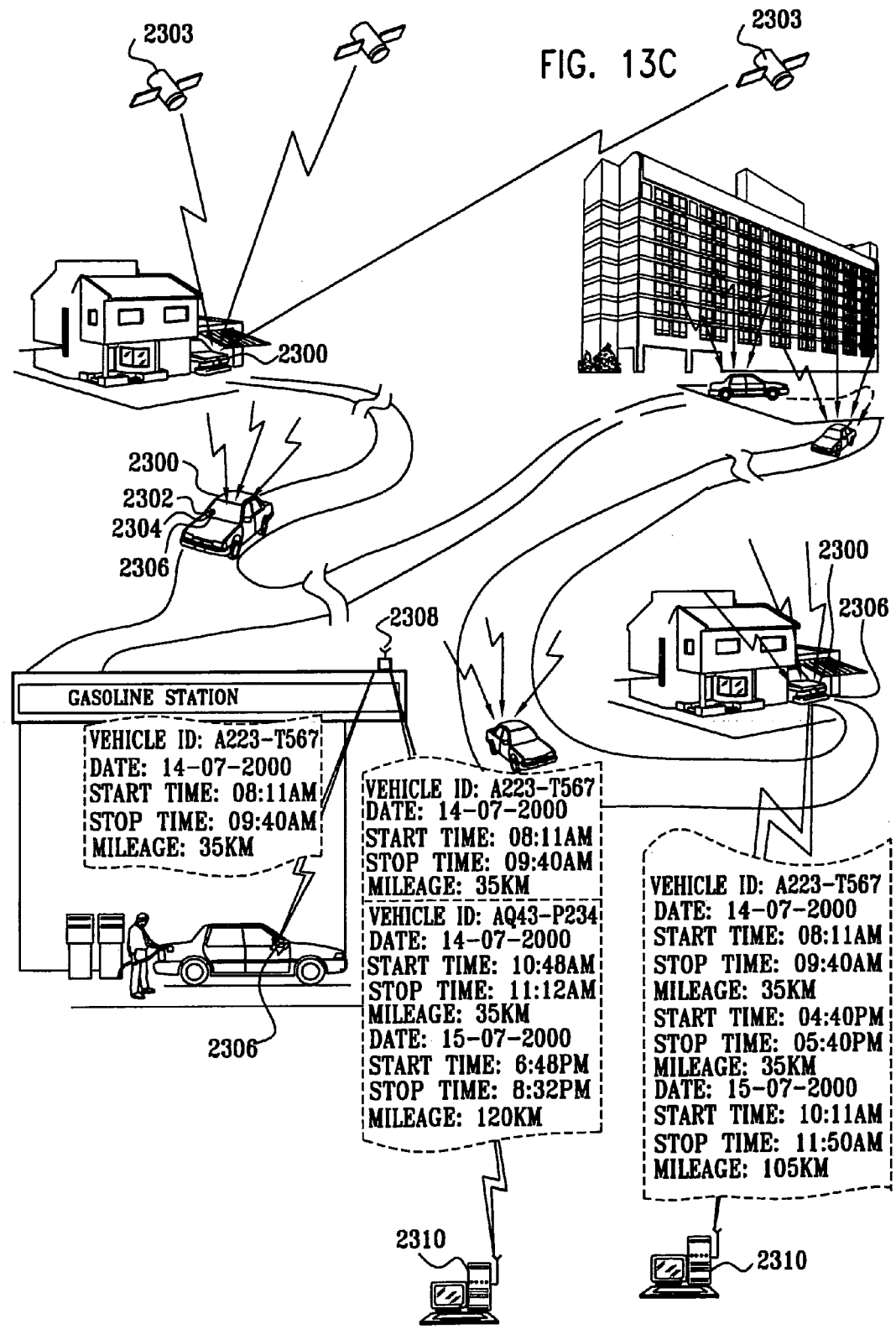

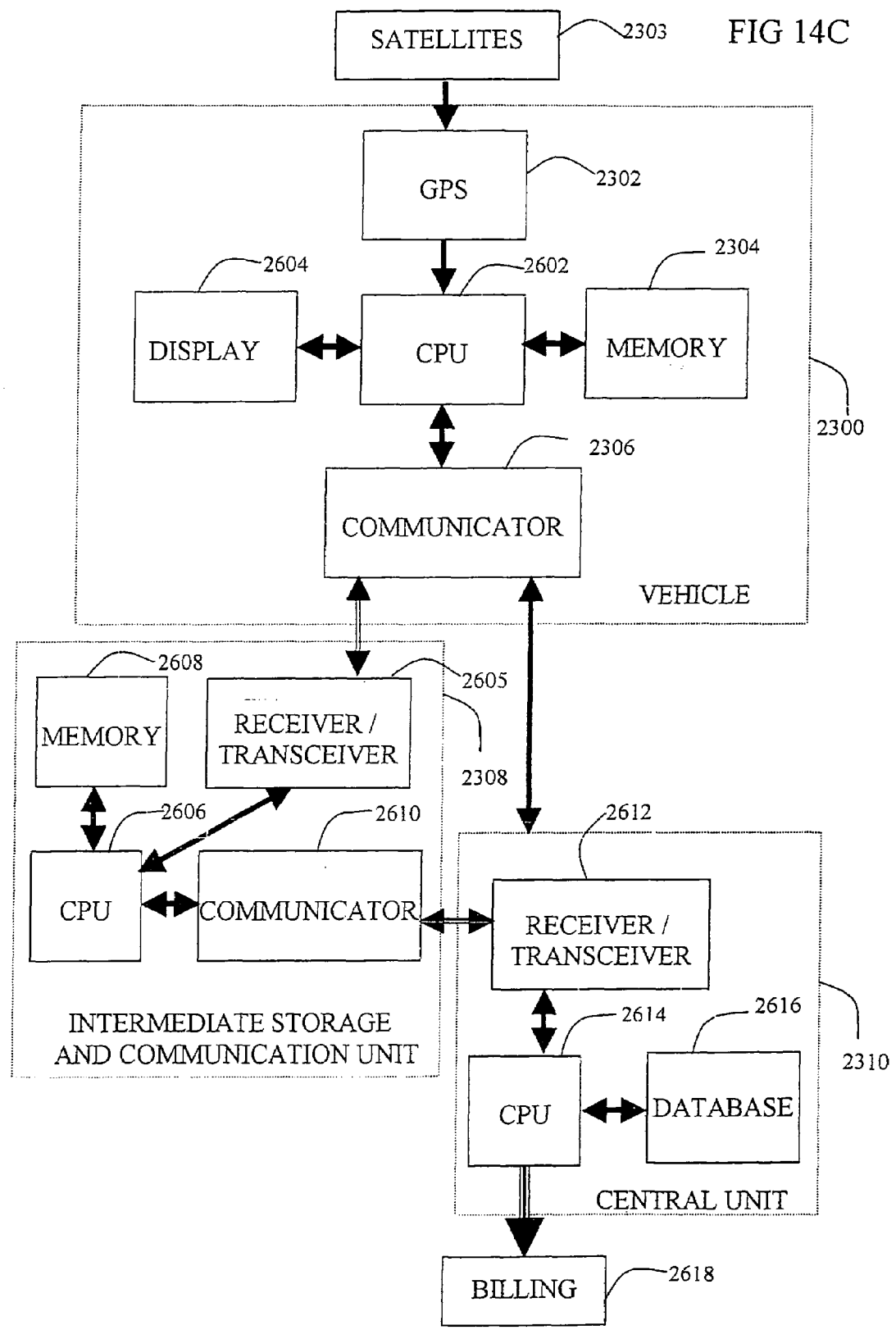

VEHICLE RELATED SERVICES SYSTEM AND METHODOLOGY

REFERENCE TO CO-PENDING APPLICATIONS

Applicants hereby claim priority of U.S. Provisional Patent Application Ser. No. 60/192,199, filed Mar. 27, 2000, entitled "Pay As You Go Fee System And Method".

FIELD OF THE INVENTION

The present invention relates to systems and methodologies for providing, and effecting payment for, vehicle-related services in general and particularly for vehicle parking services.

BACKGROUND OF THE INVENTION

The U.S. patent literature contains a great number of patents related to systems and methodologies for providing and effecting payment for vehicle-related services.

The following U.S. patents and published PCT applications are believed to represent the state of the art with regard to systems and methodologies for providing and effecting payment for vehicle parking services:

U.S. Pat. Nos. 4,555,618; 4,876,540; 4,908,500; 4,958,064; 5,029,094; 5,034,739; 5,072,380; 5,153,559; 5,173,833; 5,266,947; 5,283,622; 5,339,000; 5,351,187; 5,414,624; 5,432,508; 5,442,348; 5,659,306; 5,710,557; 5,710,743; 5,737,710; 5,745,052; 5,748,107; 5,751,973; 5,796,084; 5,809,480; 5,819,234; 5,845,268; 5,877,704; 5,905,247; 5,910,782; 5,914,654; 5,926,546; 5,940,481; 5,980,185; 5,991,749; 6,028,550; 6,037,880; 6,061,002; 6,085,124. WO 93/20539; WO 97/13222A1.

The following U.S. patents are believed to represent the state of the art with regard to systems and methodologies for providing and effecting payment for other types of vehicle-related services:

U.S. Pat. Nos. 4,533,962; 4,843,463; 5,210,702; 5,223,844; 5,319,374; 5,359,528; 5,422,624; 5,499,181; 5,499,182; 5,550,551; 5,583,765; 5,612,875; 5,621,166; 5,635,693; 5,642,484; 5,694,322; 5,717,374; 5,742,915; 5,797,134; 5,831,742; 5,862,500; 5,864,831; 5,914,654; 5,954,773; 5,963,129; 5,970,481; 5,974,356; 5,995,898; 6,006,148; 6,064,970; 6,067,008; 6,112,152.

SUMMARY OF THE INVENTION

The present invention seeks to provide improved, simplified and highly cost effective systems and methodologies for providing and effecting payment for vehicle-related services.

There is thus provided in accordance with a preferred embodiment of the present invention a vehicle-related services system including:

at least one sensor automatically sensing at least one of the time during which a vehicle is not being operated and where the vehicle is located when it is not being operated; and at least one data processor receiving information sensed by the at least one sensor, indicating at least one of the time during which the vehicle is not being operated and where the vehicle is located when it is not being operated and providing a billing data output in respect of a vehicle-related service which is dependent on at least one of the time during which the vehicle is not being operated and where the vehicle is located when it is not being operated.

The data processor may include a vehicle insurance billing data processor. In such a case, the billing data includes vehicle insurance billing data wherein the only variables, sensed by the on-board vehicle sensor, which are considered in the billing data are duration of vehicle operation and time of day or night of vehicle operation. The billing data may include vehicle insurance billing data wherein the billing data is not dependent on vehicle speed.

In accordance with a preferred embodiment of the present invention, the at least one sensor automatically senses the time during which a vehicle is not being operated and where the vehicle is located when it is not being operated and the at least one data processor receives information sensed by the sensor, indicating the time during which the vehicle is not being operated and where the vehicle is located when it is not being operated and provides a billing data output in respect of a vehicle-related service which is dependent on the time during which the vehicle is not being operated and where the vehicle is located when it is not being operated.

Preferably, the at least one sensor automatically senses the time during which a vehicle is parked and where the vehicle is located when it is parked and the at least one data processor receives information sensed by the at least one sensor, indicating the time during which the vehicle is parked and where the vehicle is parked and provides a parking data output in respect of parking, which is dependent on the time during which the vehicle is parked and where the vehicle is parked.

In accordance with a preferred embodiment of the present invention, the at least one sensor and the at least one data processor are operative without vehicle operator initiative to provide an indication of at least one of the time during which the vehicle is parked and where the vehicle is parked.

Preferably, the sensor is on-board the vehicle.

In accordance with a preferred embodiment of the present invention, the vehicle-related services system also includes:

at least one communicator on-board the vehicle providing an output indicating the time during which vehicle is parked and where the vehicle is parked; and a receiver associated with the at least one data processor for receiving a communication from the at least one communicator and employing the communication for providing the information to the at least one data processor.

Preferably, the communicator communicates with the receiver at least partially not in real time.

In accordance with a preferred embodiment of the present invention, the communicator communicates with an intermediate storage and communication unit only when a vehicle in which the communicator is located is at one of a plurality of predetermined locations.

Preferably, the intermediate storage and communication unit is located at a vehicle fueling station. In accordance with a preferred embodiment of the present invention, the information includes identification of a street parking location in which the vehicle is stationary for at least a predetermined amount of time.

Preferably, the sensor is operative to sense the time during which a vehicle is not being operated without requiring interaction with an indicating device fixed in propinquity to the location.

In accordance with a preferred embodiment of the present invention, the at least one sensor is operative using triangulation to determine where a vehicle is parked.

In accordance with a preferred embodiment of the present invention, the data processor may include a vehicle insurance billing data processor. In such a case, the billing data includes vehicle insurance billing data wherein the only variables, sensed by the at least one on-board vehicle sensor, which are considered in the billing data are duration of vehicle operation and time of day or night of vehicle operation. The billing data may include vehicle insurance billing data wherein the billing data is not dependent on vehicle speed.

Preferably, the vehicle-related services system also includes an at least one on-board vehicle potential additional parking space sensor which is operative when a vehicle is stationary at a street parking place for indicating whether at least one potential additional adjacent parking place is unoccupied.

Preferably, the at least one on-board vehicle sensor provides an output indicating the existence of at least one potential unoccupied additional adjacent parking place, the system also includes a street parking map database indicating legal street parking spaces;

a correlator receiving the output indicating existence of at least one potential unoccupied additional adjacent parking place and correlating it with the legal street parking spaces; and an available parking communicator providing information regarding unoccupied legal street parking places to at least one driver.

There is also provided in accordance with a preferred embodiment of the present invention a vehicle-related services system including:

a plurality of on-board potential additional parking space sensors located on a plurality of vehicles, which sensors each provide an output indicating existence of at least one potential unoccupied additional adjacent parking place adjacent a vehicle located in a street parking location; and an available parking communicator employing information received from the plurality of sensors and providing information regarding unoccupied street parking places to at least one driver.

Preferably, the vehicle-related services system also includes:

a street parking map database indicating legal street parking spaces; and a correlator receiving the output indicating existence of at least one potential unoccupied additional adjacent parking place and correlating it with the legal street parking spaces.

There is additionally provided in accordance with a preferred embodiment of the present invention a vehicle-related services system including:

at least one sensor on-board a vehicle and automatically sensing at least one of the time during which the vehicle is being operated and where the vehicle is located when it is being operated;

at least one communicator on-board the vehicle providing an output indicating at least one of the time during which the vehicle is being operated and where the vehicle is located when it is being operated; and at least one data processor receiving a communication from the at least one communicator, indicating at least one of the time during which the vehicle is being operated and where the vehicle is located when it is being operated and providing a billing data output in respect of a vehicle-related service which is dependent only one of the time during which the vehicle is being operated and where the vehicle is located when it is being operated.

There is further provided in accordance with a preferred embodiment of the present invention a vehicle-related services system including:

at least one sensor on-board a vehicle and automatically sensing only at least one of the time during which the vehicle is being operated and where the vehicle is located when it is being operated;

at least one communicator on-board the vehicle providing an output indicating at least one of the time during which the vehicle is being operated and where the vehicle is located when it is being operated; and at least one data processor receiving a communication from the at least one communicator, indicating at least one of the time during which the vehicle is being operated and where the vehicle is located when it is being operated and providing a billing data output in respect of a vehicle-related service which is dependent on at least one of the time during which the vehicle is being operated and where the vehicle is located when it is being operated.

Preferably, the sensor on-board a vehicle automatically sensing only at least one of the time during which the vehicle is being operated and where the vehicle is located when it is being operated.

Preferably, the data processor includes a vehicle insurance billing data processor.

In accordance with a preferred embodiment of the present invention, the communicator communicates with an intermediate storage and communication unit only when a vehicle in which the communicator is located is at one of a plurality of predetermined locations.

Preferably, the intermediate storage and communication unit is located at a vehicle fueling station.

In accordance with a preferred embodiment of the present invention, the billing data includes vehicle insurance billing data wherein the only variables, sensed by the on-board vehicle sensor, which are considered in the billing data are duration of vehicle operation and time of day or night of vehicle operation.

Alternatively, the billing data may include vehicle insurance billing data wherein the only variables, sensed by the on-board vehicle sensor, which are considered in the billing data are duration of vehicle operation and location of the vehicle during the vehicle operation.

As a further alternatively, the billing data may include vehicle insurance billing data wherein the only variables sensed by the on-board vehicle sensor, which are considered in the billing data are duration of vehicle use and time of day or night of vehicle use.

Preferably, the vehicle-related services system includes:

at least one sensor on-board a vehicle and automatically sensing at least one of the time during which the vehicle is being operated and the distance traveled by the vehicle while it is being operated;

at least one communicator on-board the vehicle providing an output indicating at least one of the time during which the vehicle is being operated and the distance traveled by the vehicle while it is being operated; and at least one data processor receiving a communication from the at least one communicator, indicating at least one of the time during which the vehicle is being operated and/or the distance traveled by the vehicle while it is being operated; and providing a billing data output in respect of a vehicle-related service which is dependent only on at least one of the time during which the vehicle is being operated and the distance traveled by the vehicle while it is being operated.

Preferably, the at least one data processor includes a vehicle insurance billing data processor.

In accordance with a preferred embodiment of the present invention, the billing data includes vehicle insurance billing data wherein the only variables, sensed by the on-board vehicle sensor, which are considered in the billing data are time of day and date of vehicle operation and distance covered during the vehicle operation.

Preferably, the communicator communicates with an intermediate storage and communication unit only when a vehicle in which the communicator is located is at one of a plurality of predetermined locations.

In accordance with a preferred embodiment of the present invention, the intermediate storage and communication unit is located at a vehicle fueling station.

Preferably, the billing data includes vehicle insurance billing data wherein the billing data is not dependent on vehicle speed.

In accordance with a preferred embodiment of the present invention, the at least one data processor includes a vehicle parking billing data processor.

Preferably, the at least one sensor and the at least one data processor are operative without vehicle operator initiative to provide an indication at least one of the time during which the vehicle is parked and where the vehicle is parked.

In accordance with a preferred embodiment of the present invention, the at least one sensor is operative to sense the time during which a vehicle is being operated without requiring interaction with an indicating device fixed in propinquity to the location.

Preferably, the communicator communicates with the at least one data processor at least partially not in real time.

There is also provided in accordance with a preferred embodiment of the present invention a vehicle-related fee payment system including:

at least one sensor on-board a vehicle and automatically sensing at least one of the time during which the vehicle is being operated and where the vehicle is located when it is being operated;

at least one communicator on-board the vehicle providing an output indicating at least one of the time during which the vehicle is being operated and where the vehicle is located when it is being operated; and at least one data processor receiving a communication from the at least one communicator, indicating at least one of the time during which the vehicle is being operated and where the vehicle is located when it is being operated and providing a billing data output in respect of a vehicle-related use fee which is dependent on the time during which the vehicle is being operated.

Preferably, the communicator communicates with the at least one data processor at least partially not in real time.

In accordance with a preferred embodiment of the present invention, the communicator communicates with an intermediate storage and communication unit only when a vehicle in which the communicator is located is at one of a plurality of predetermined locations, such as a vehicle fueling station.

In accordance with a preferred embodiment of the present invention, the data processor provides a billing data output in respect of a vehicle-related use fee which is dependent on the duration of vehicle operation and time of day of vehicle operation.

Preferably, the at least one data processor provides a billing data output in respect of a vehicle-related use fee which is also dependent on where the vehicle is located during vehicle operation.

In accordance with a preferred embodiment of the present invention, the billing data output is dependent on the time during which the vehicle is being operated and on a level of pollution being created by the vehicle.

There is additionally provided in accordance with a preferred embodiment of the present invention a vehicle-related fee payment system including:

at least one sensor for automatically sensing the passage of a vehicle along a given road;

at least one data processor receiving a communication from the at least one sensor, indicating the passage of the vehicle along a given road at a given time and providing a billing data output in respect of a vehicle-related use fee which is dependent only on the time during which the vehicle is passing along the given road.

There is further provided in accordance with a preferred embodiment of the present invention a vehicle-related fee payment system including:

at least one sensor on-board a vehicle and automatically sensing at least one of the time during which the vehicle is being operated;

at least one communicator on-board the vehicle providing an output indicating at least one of the time during which the vehicle is being operated and where the vehicle is located when it is being operated; and at least one data processor receiving a communication from the at least one communicator, indicating at least one of the time during which the vehicle is being operated and where the vehicle is located when it is being operated and providing a billing data output in respect of a vehicle-related use fee which is dependent on the region in which a vehicle is operating and the time of day during which the vehicle is being operated in the region.

There is additionally provided a vehicle-related services method including:

automatically sensing the time during which a vehicle is not being operated and where the vehicle is located when it is not being operated and receiving information indicating the time during which the vehicle is not being operated and where the vehicle is located when it is not being operated and providing a parking data output in respect of a vehicle-related service which is dependent on the time during which the vehicle is not being operated and where the vehicle is located when it is not being operated.

Preferably, the method also includes providing an indication of the time during which the vehicle is parked and where the vehicle is parked substantially without operator intervention.

The above method preferably also includes communicating an indication of the time during which the vehicle is parked and where the vehicle is parked to a receiver at least partially not in real time.

Preferably, the automatic sensing takes place without requiring interaction with an indicating device fixed in propinquity to a parking location.

There is additionally provided in accordance with a preferred embodiment of the present invention a vehicle-related services method including:

providing outputs indicating existence of at least one potential unoccupied additional adjacent parking place adjacent a plurality of vehicles located in street parking locations and employing the outputs received from the plurality of vehicles and providing information regarding unoccupied street parking places to at least one driver.

Further in accordance with a preferred embodiment of the present invention there is provided a vehicle-related services method including:

automatically sensing at least one of the time during which the vehicle is being operated and where the vehicle is located when it is being operated;

communicating an output indicating at least one of the time during which the vehicle is being operated and where the vehicle is located when it is being operated; and receiving a communication indicating at least one of the time during which the vehicle is being operated and where the vehicle is located when it is being operated and providing an insurance billing data output in respect of vehicle insurance which is dependent only on at least one of the time during which the vehicle is being operated and where the vehicle is located when it is being operated.

Preferably, communicating takes place only when a vehicle is at one of a plurality of predetermined locations.

In accordance with a preferred embodiment of the present invention, the billing data includes vehicle insurance billing data wherein the only automatically sensed variables which are considered in the billing data are duration of vehicle operation and time of day or night of vehicle operation.

There is additionally provided in accordance with a preferred embodiment of the present invention a vehicle-related fee payment method including:

automatically sensing at least one of the time during which the vehicle is being operated and where the vehicle is located when it is being operated;

providing an output indicating at least one of the time during which the vehicle is being operated and where the vehicle is located when it is being operated; and receiving the output indicating at least one of the time during which the vehicle is being operated and where the vehicle is located when it is being operated and providing a billing data output in respect of a vehicle-related use fee which is dependent on the time during which the vehicle is being operated.

Preferably, the billing data output in respect of a vehicle-related use fee is dependent on the duration of vehicle operation and time of day of vehicle operation.

In accordance with a preferred embodiment of the present invention the billing data output is dependent on the time during which the vehicle is being operated and on a level of pollution being created by the vehicle.

There is additionally provided in accordance with a preferred embodiment of the present invention a vehicle-related services method including:

automatically sensing the time during which the vehicle is being operated and the distance traveled by the vehicle while it is being operated;

communicating an output indicating the time during which the vehicle is being operated and the distance traveled by the vehicle while it is being operated; and receiving a communication indicating the time during which the vehicle is being operated and the distance traveled by the vehicle while it is being operated and providing an insurance billing data output in respect of vehicle insurance which is dependent only on the time during which the vehicle is being operated and the distance traveled by the vehicle while it is being operated.

Preferably, the billing data includes vehicle insurance billing data wherein the only automatically sensed variables which are considered in the billing data are the distance traveled by the vehicle while it is being operated and time of day or night of vehicle operation.

Preferably in all embodiments of the invention, the sensor automatically senses the time of day and date when the vehicle is not being operated.

Additionally or alternatively in all embodiments of the invention, the sensor automatically senses the time duration during which the vehicle is not being operated.

It is appreciated that the various embodiments described hereinabove may be employed individually or alternatively any suitable combination of such embodiments may be employed.

BRIEF DESCRIPTION OF THE DRAWINGS

The present invention will be understood and appreciated more fully from the following detailed description, taken in conjunction with the drawings in which:

FIGS. 1A, 1B and 1C are simplified pictorial illustrations of three alternative embodiments of parking payment systems and methodologies constructed and operative in accordance with a preferred embodiment of the present invention;

FIG. 2 is a simplified pictorial illustration of a preferred embodiment of a parking location and payment system and methodology constructed and operative in accordance with a preferred embodiment of the present invention;

FIGS. 3A, 3B and 3C are simplified block diagram illustrations of three alternative embodiments of parking payment systems and methodologies constructed and operative in accordance with a preferred embodiment of the present invention and corresponding to FIGS. 1A, 1B and 1C, respectively;

FIGS. 7A, 7B and 7C are simplified pictorial illustrations of three alternative embodiments of vehicle-related services payment systems and methodologies constructed and operative in accordance with a preferred embodiment of the present invention;

FIGS. 11A, 11B and 11C are simplified block diagram illustrations of preferred embodiments of vehicle fee payment systems and methodologies constructed and operative in accordance with a preferred embodiment of the present invention and corresponding to FIGS. 10A, 10B and 10C respectively;

FIGS. 13A, 13B and 13C are simplified pictorial illustrations of three alternative embodiments of vehicle-related services payment systems and methodologies constructed and operative in accordance with another preferred embodiment of the present invention;

FIGS. 14A, 14B and 14C are simplified block diagram illustrations of three alternative embodiments of payment systems and methodologies constructed and operative in accordance with another preferred embodiment of the present invention and corresponding to FIGS. 13A, 13B & 13C respectively.

DETAILED DESCRIPTION OF PREFERRED EMBODIMENTS

Figure 1B:
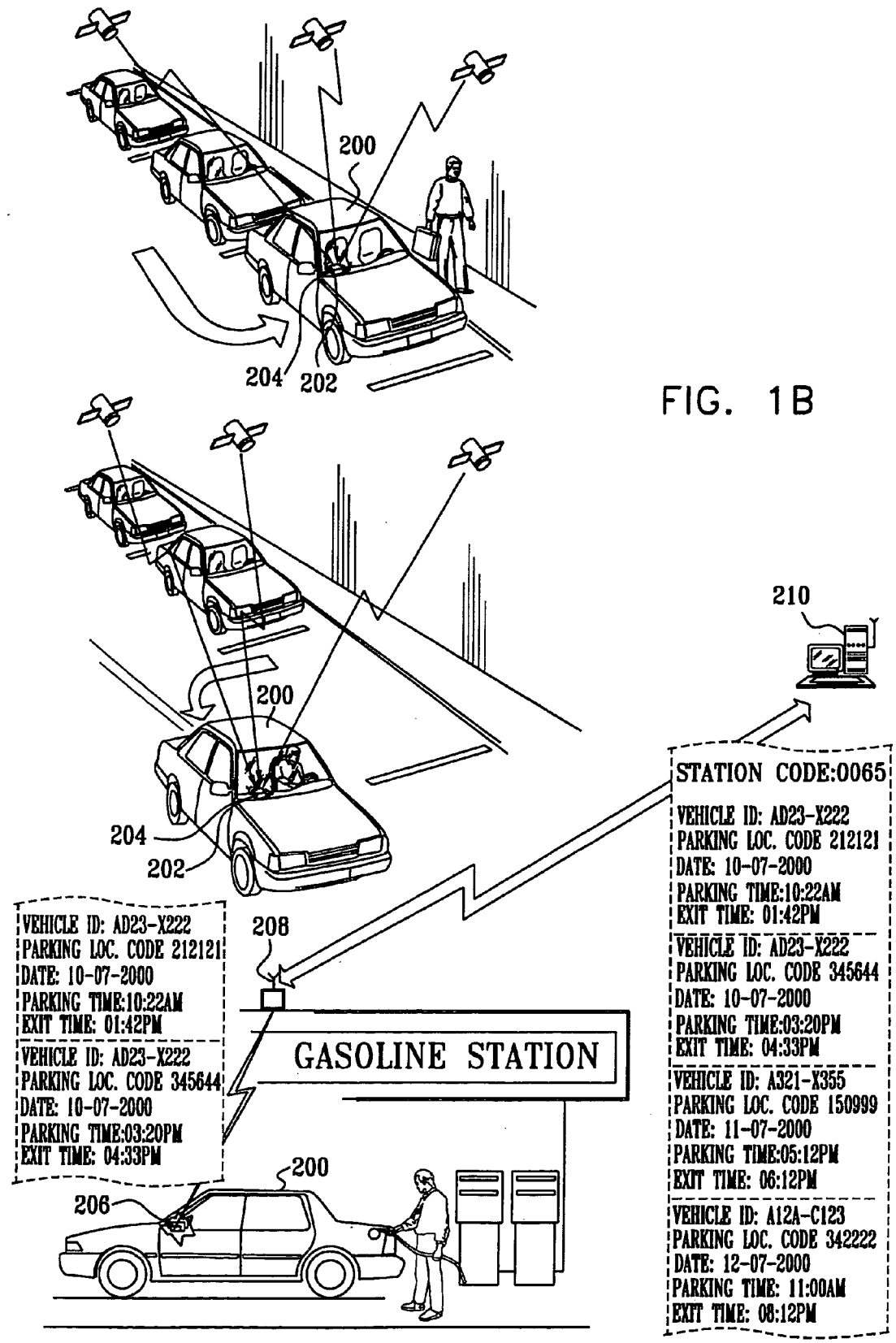

Reference is now made to FIGS. 1A, 1B and 1C, which are simplified pictorial illustrations of three alternative embodiments of parking payment systems and methodologies constructed and operative in accordance with a preferred embodiment of the present invention.

FIG. 1A illustrates a GPS-based system for effecting payment for parking without requiring any driver intervention. As shown in FIG. 1A, a vehicle 100 equipped with a GPS receiver 102 or similar location determining device is parked by a driver. Without requiring any intervention by the driver, a parking communicator 104, receiving a location input from GPS receiver 102, transmits a message in a wireless manner to a central unit 106, which in turn provides data used for effecting payment for parking.

The message typically includes data relating to the identity of the vehicle parked, the parking location, the date and the start time of parking.

In the illustrated embodiment, when the driver removes the vehicle 100 from the parking location, the parking communicator 104 transmits a further message in a wireless manner to central unit 106. This message typically includes data relating to the identity of the vehicle parked, the parking location, the date, the start time of parking and the finish time of parking, i.e. the time that the vehicle 100 exits the parking location.

As illustrated in FIG. 1A, additionally or alternatively to transmittal of a message when the vehicle enters and/or exits the parking location, a composite message may be transmitted at any time from the vehicle 100 to the central unit 106. Such a composite message may include messages relating to a plurality of parking events. In respect of each parking event, the message typically includes data relating to the identity of the vehicle parked, the parking location, the date, the start time of parking and the finish time of parking.

Composite messages may be transmitted, for example, at predetermined times or upon accumulation of data relating to a predetermined number of parking events or based on any other suitable criterion or combination of criteria.

It is appreciated that no message need be sent at the time of parking or at the termination of parking. It is also appreciated that when a message is sent at the time of parking, the message sent at the termination of parking need not include data relating to the start time of parking.

In the embodiment of FIG. 1A, wireless communication is preferably effected via a cellular communication system, but may alternatively be effected by any other suitable wireless communication facility.

FIG. 1B also illustrates a GPS-based system for effecting payment for parking without requiring any driver intervention. As shown in FIG. 1B, a vehicle 200 equipped with a GPS receiver 202 or similar location determining device is parked by a driver. Without requiring any intervention by the driver, a parking recorder 204, receiving a location input from GPS receiver 202, records data relating to the parking location, the date and the start time of parking.

In the illustrated embodiment, when the driver removes the vehicle 200 from the parking location, the parking recorder 204 records data relating to the parking location, the date, the finish time of parking.

As illustrated in FIG. 1B, when the vehicle 200 is located at one of a multiplicity of predetermined download locations, such as a suitably equipped filling station, for example, a gasoline station or an electric vehicle recharging station, the parking recorder 204 downloads data relating to a plurality of parking events over a time period extending from the preceding download, via a suitable communicator 206, typically in a wireless manner, to an intermediate storage and communication unit 208, typically located at the filling station. The intermediate storage and communication unit 208 preferably receives and stores data relating to a plurality of parking events in respect of a multiplicity of vehicles and communicates this data, in a composite message, preferably in a wireless manner, to a central unit 210. Alternatively or additionally, download locations may be found at other places, such as road intersections, parking lots and malls.

Typically, the composite message may be transmitted at any time from the intermediate storage and communication unit 208 to the central unit 210. Such a composite message typically includes messages relating to a plurality of parking events for a multiplicity of different vehicles. In respect of each parking event, the message typically includes data relating to the identity of the vehicle parked, the parking location, the date, the start time of parking and the finish time of parking.

Composite messages may be transmitted at predetermined times or upon accumulation of data relating to a predetermined number of parking events or based on any other suitable criterion or combination of criteria.

FIG. 1C illustrates a further alternative embodiment of a system for effecting payment for parking without requiring any driver intervention. As shown in FIG. 1C, a vehicle 300, equipped with a transmitter 302, which transmits a wireless coded signal identifying the vehicle, is parked. Without requiring any intervention by the driver, the coded signal transmitted by transmitter 302 is received by at least two and preferably three angular sensitive receivers 304, which are located in general propinquity to the parking location of the vehicle 300 and communicate with a central unit 306.

Typically, the receipt of outputs from the receivers 304 enables the location of the vehicle 300 to be determined using conventional triangulation technology. The timing of receipt of the coded signals as well as sensed change or lack of change in the vehicle location provides an indication of the parking start time and parking finish time, which, when received by the central unit 306, together with vehicle identification data, enable payment for parking to be effected.

Preferably communication between the various receivers 304 and the central unit 306 takes place intermittently rather than continuously, for enhanced economy. Such communication preferably includes composite messages including messages relating to a plurality of parking events for a multiplicity of different vehicles. In respect of each parking event, the message typically includes data relating to the identity of the vehicle parked, parking location triangulation information, the date, the start time of parking and the finish time of parking.

Reference is now made to FIG. 2, which is a simplified pictorial illustration of a preferred embodiment of a parking location and payment system and methodology constructed and operative in accordance with a preferred embodiment of the present invention.

FIG. 2 illustrates a GPS-based system for finding available parking locations and for effecting payment for parking without requiring any driver intervention. Similarly to the system shown in FIG. 1A, a vehicle 400, equipped with a GPS receiver 402 or similar location determining device, is parked by a driver. Without requiring any intervention by the driver, a parking communicator 404, receiving a location input from GPS receiver 402, transmits a message in a wireless manner to a central unit 406, which in turn provides data used for effecting payment for parking.

The message typically includes data relating to the identity of the vehicle parked, the parking location, the date and the start time of parking. As described hereinabove with reference to FIG. 1A, messages are sent thereafter indicating parking finish time in one of a number of alternative manners.

In the embodiment of FIG. 2, in addition to the functionality described hereinabove with reference to FIG. 1A, the vehicle is preferably provided with at least one sensor 408 indicating existence of at least one potential unoccupied additional adjacent parking place. The sensor 408 is typically a laser, radar or ultrasonic range finder and is typically mounted so as to be either front facing or rearward facing so as to identify the existence of an empty parking space. The output of sensor 408 is communicated while the vehicle is parked, preferably in a wireless manner, to a parking location center 410, which may integrated with the central unit 406 or may employ all or part of the same computer hardware.

The parking location center 410 typically maintains a street parking map database indicating legal street parking spaces and includes functionality providing a correlator. The correlator receives an output from sensor 408 indicating the existence of at least one potential unoccupied additional adjacent parking place and correlates it with legal street parking spaces, using the database. An available parking communicator 412, associated with the parking location center 410, provides information regarding unoccupied legal street parking places to at least one driver, preferably in a wireless manner. Preferably communicator 412 broadcasts data indicating the availability of parking spaces at given locations either by direct wireless communication, wireless broadcast or via the Internet.

In the embodiment of FIG. 2, wireless communication from sensors 408 to parking location center 410 is preferably effected via communicator 404 and a cellular communication system, but may alternatively be effected by any other suitable wireless communication facility. Wireless communication from parking communicator 404 to central unit 406 may also be effected via a cellular communication facility. The communication from sensors 408 is preferably immediate upon a change of status from a status of availability to a status of unavailability and vice versa, while the communication from parking communicator 404 is normally intermittent, for reasons of economy.

It is appreciated that although the vehicle location functionality of FIG. 2 is shown in combination with a parking payment system, it is also possible that the vehicle location functionality be provided in a stand-alone form, such as without a parking payment system or with a parking payment system other than that of the type described hereinabove with reference to FIG. 1A. For example the vehicle location functionality of FIG. 2 may be provided in association with a parking payment system of the type described hereinabove with reference to either of FIGS. 1B and 1C.

Figure 3A:
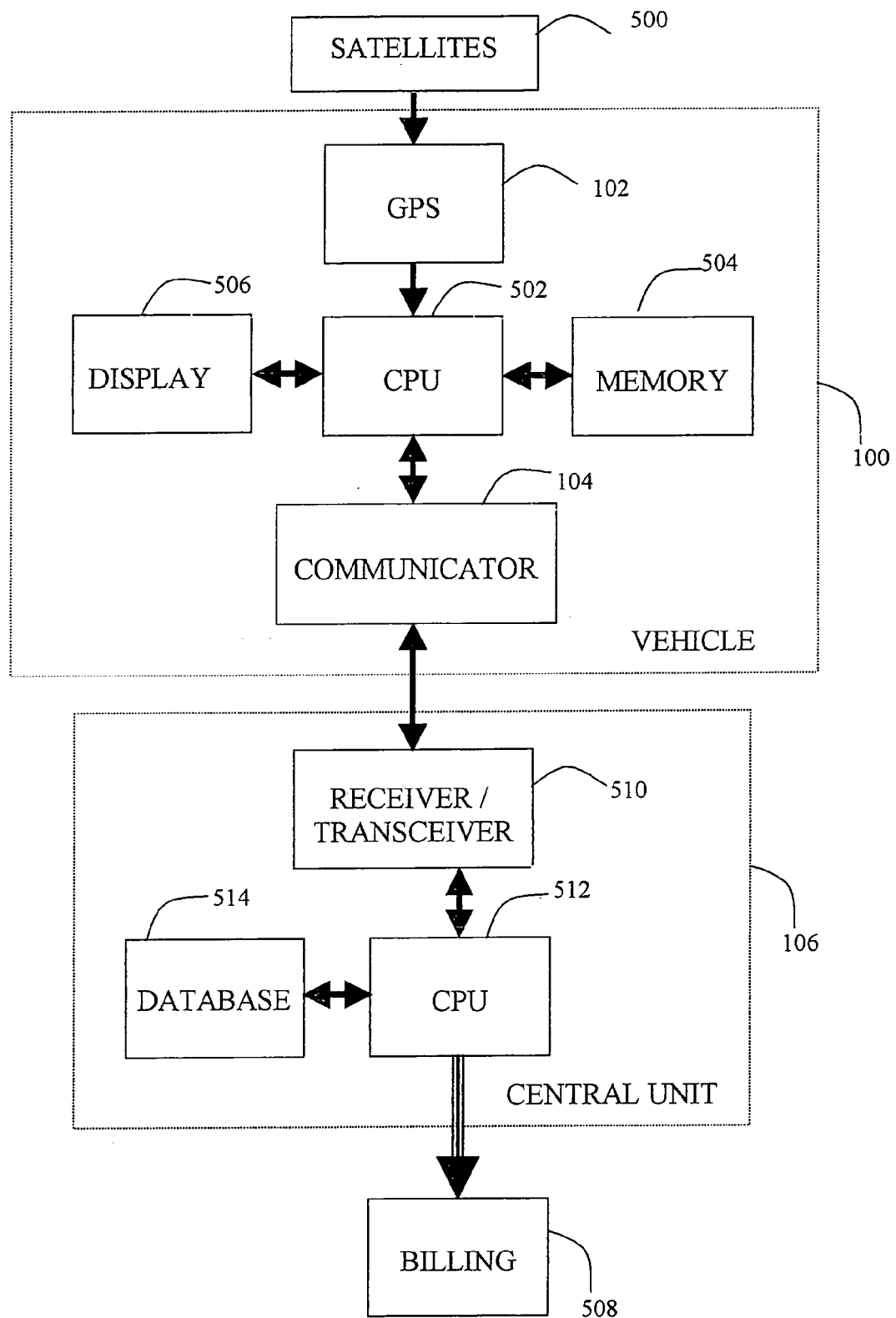
Figure 3C:
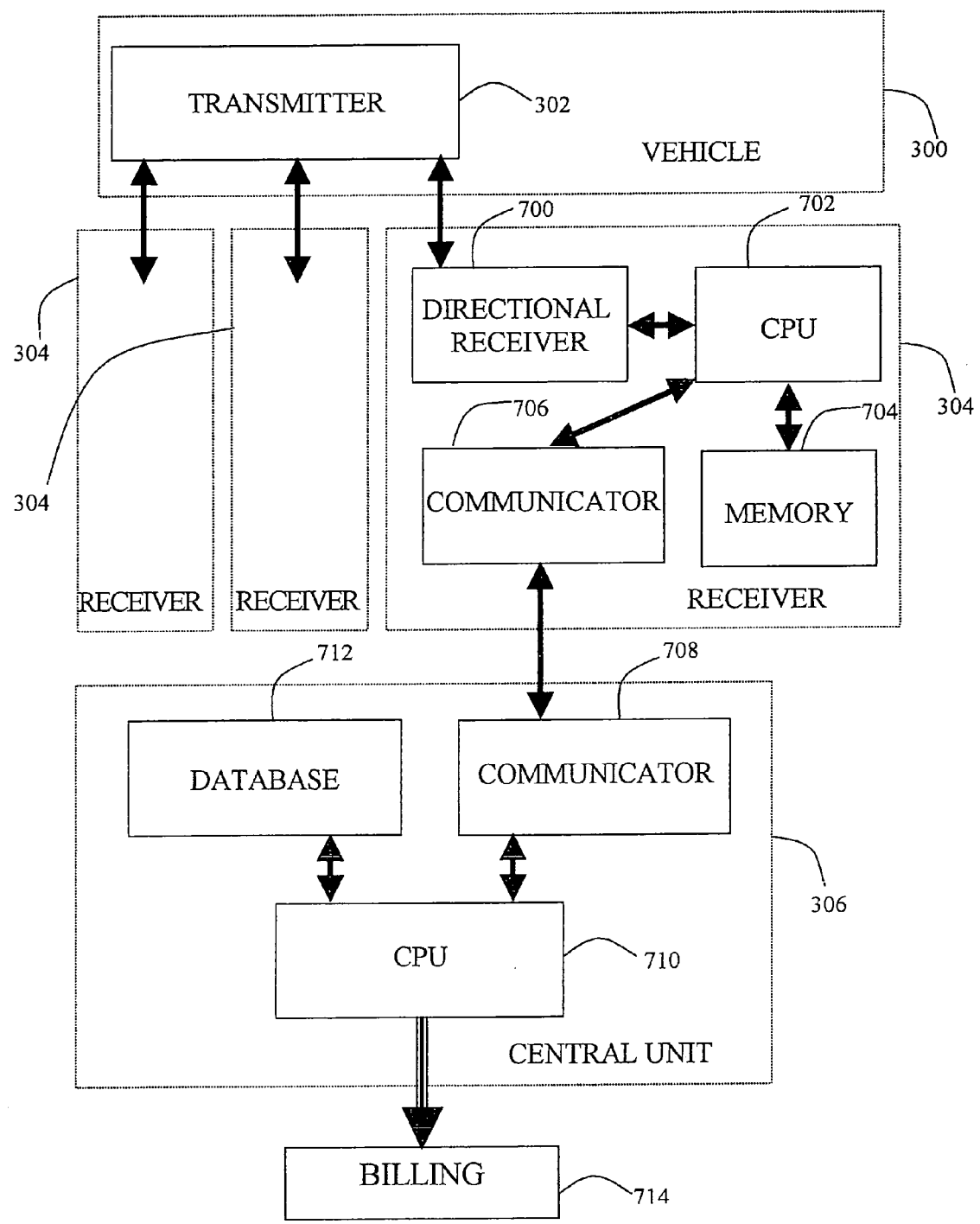

Reference is now made to FIGS. 3A, 3B and 3C, which are simplified block diagram illustrations of three alternative embodiments of parking payment systems and methodologies constructed and operative in accordance with a preferred embodiment of the present invention and corresponding to FIGS. 1A, 1B and 1C respectively.

FIG. 3A illustrates, in block diagram form, the GPS-based system for effecting payment for parking shown in FIG. 1A. Vehicle 100 is equipped with GPS receiver 102, which receives inputs from GPS satellites 500. GPS receiver 102 outputs vehicle location data to a CPU 502, which preferably but not necessarily interfaces with a memory 504 and a display 506. Parking communicator 104 receives the location input from GPS receiver 102 via CPU 502 and transmits a message in a wireless manner to central unit 106, which in turn provides data used for effecting payment for parking to a billing system 508. It is appreciated that the billing system may employ various criteria in addition to the data received from central unit 106.

The central unit 106 typically includes a wireless receiver or transceiver 510, which interfaces with a CPU 512. CPU 512 preferably interfaces with a database 514. The CPU 512 and the database 514 preferably cooperate for processing the data received from the vehicle 100 into a form useful by the billing system 508.

FIG. 3B illustrates, in block diagram form, the GPS-based system for effecting payment for parking shown in FIG. 1B. Vehicle 200 is equipped with GPS receiver 202, which receives inputs from GPS satellites 600. GPS receiver 202 outputs vehicle location data to parking recorder 204, which typically includes a CPU 602 which interfaces with a memory 604 and optionally with a display 606. Communicator 206 receives all relevant parking information, stored in memory 604, for each parking event via CPU 602 and transmits a message including this information in a wireless manner to intermediate storage and communication unit 208, typically including a wireless receiver or transceiver 608, which outputs to a memory 610 via a CPU 611.

Intermediate storage and communication unit 208 also includes a communicator 612 which typically transmits a composite message in respect of multiple parking events of multiple vehicles to central unit 210.

Additionally, a facility optionally may be provided for enabling direct communication between vehicle mounted communicator 206 and central unit 210.

The central unit 210 typically includes a wireless receiver or transceiver 613, which interfaces with a CPU 614. Alternatively, communication between communicator 612 and receiver 613 may be wired rather than wireless. CPU 614 preferably interfaces with a database 616. The CPU 614 and the database 616 preferably cooperate for processing the data received from a multiplicity of vehicles 200 into a form useful by a billing system 618.

FIG. 3C illustrates, in block diagram form, the triangulation-based system for effecting payment for parking shown in FIG. 1C. Vehicle 300 includes transmitter 302, which transmits a wireless coded signal identifying the vehicle, without requiring any intervention by the driver.

The coded signal transmitted by transmitter 302 is received by at least two and preferably three receivers 304 which are located in general propinquity to the parking location of the vehicle 300 and communicate with a central unit 306.

Each receiver 304 preferably includes a directional receiver 700 which interfaces with a CPU 702. CPU 702 interfaces with a memory 704 and with a communicator 706.

Central unit 306 typically includes a communicator 708 which interfaces with a CPU 710. CPU preferably interfaces with a database 712 and outputs to a billing system 714. Communication between communicators 706 and 708 may be wired or wireless.

Each receiver 304 intermittently provides outputs indicating the start time and the finish time for each parking event of each identified vehicle, as well as the angular direction from which it was received.

As noted above with reference to FIG. 1C, using conventional triangulation technology, the receipt of the outputs of the receivers 304 enables the location of the vehicle 300 to be determined by central unit 306. The timing of receipt of the coded signals by receivers 304 as well as sensed change or lack of change in the vehicle location provides an indication of the parking start time and parking finish time, which, when received by the central unit 306 together with vehicle identification data, enable payment for parking to be effected.

Figure 4A:
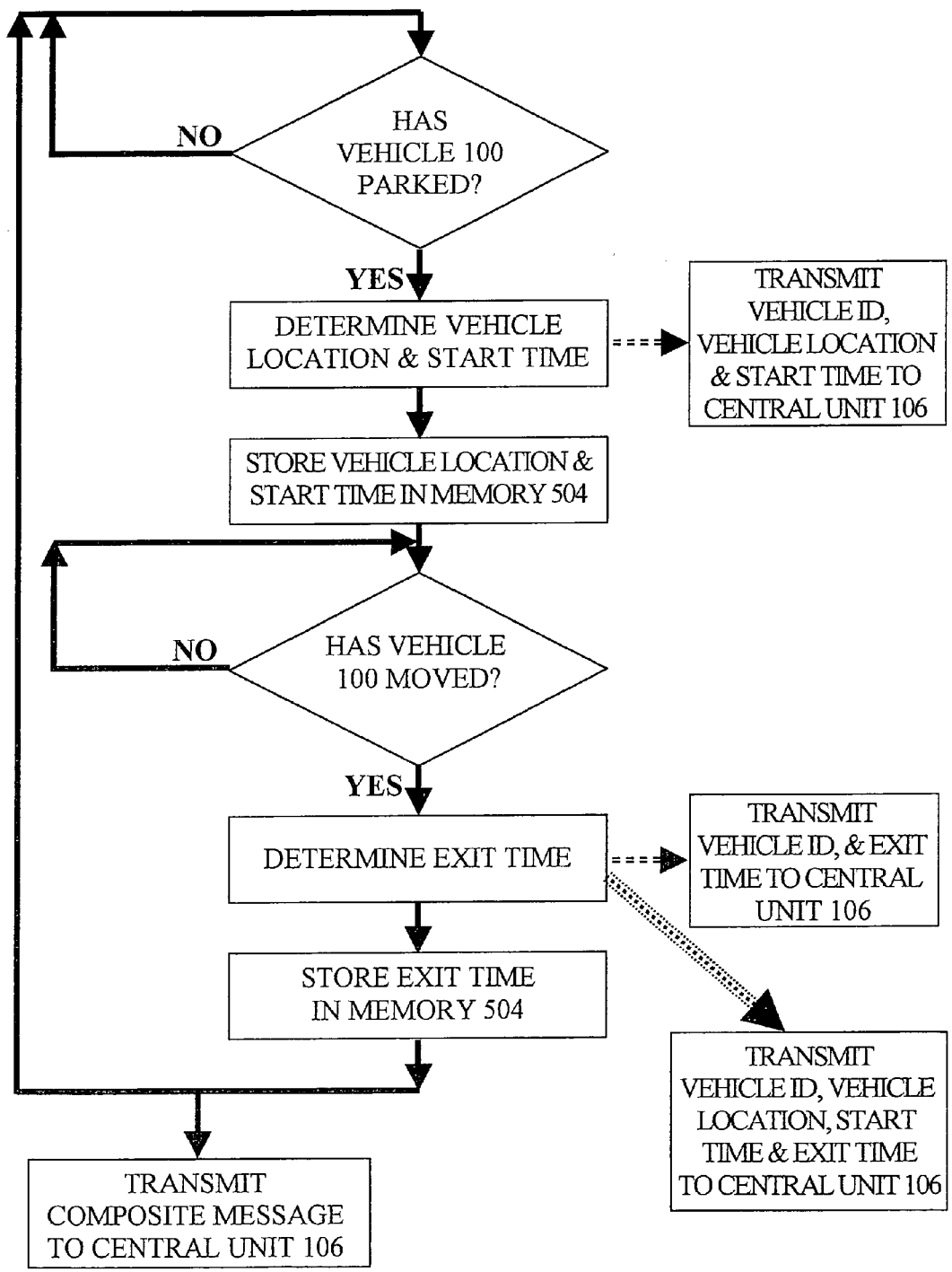
FIGS. 4A, 4B and 4C are simplified flow charts illustrating the operation of the three alternative embodiments of parking payment systems and methodologies of FIGS. 1A & 3A, 1B & 3B and 1C & 3C respectively.
Figure 4B:
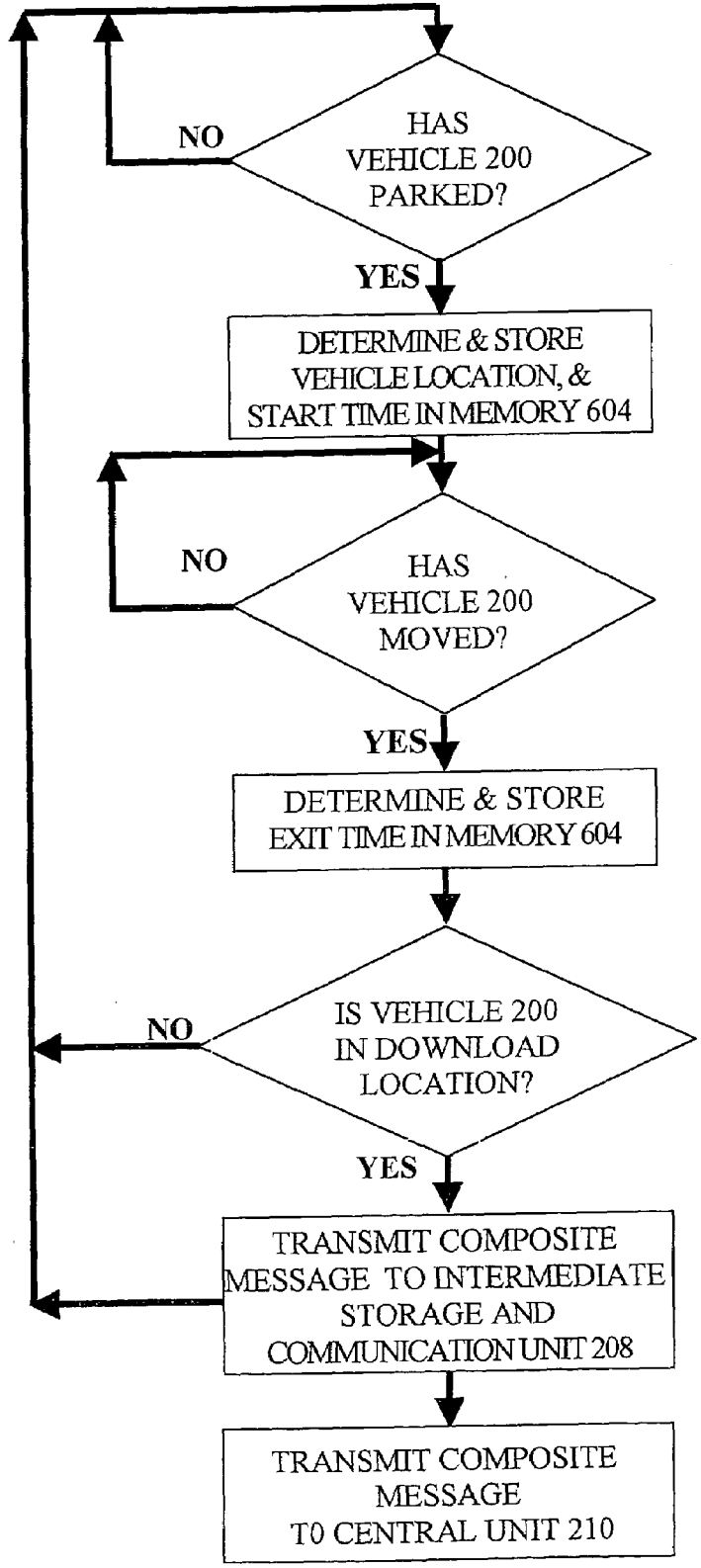
Figure 4C:
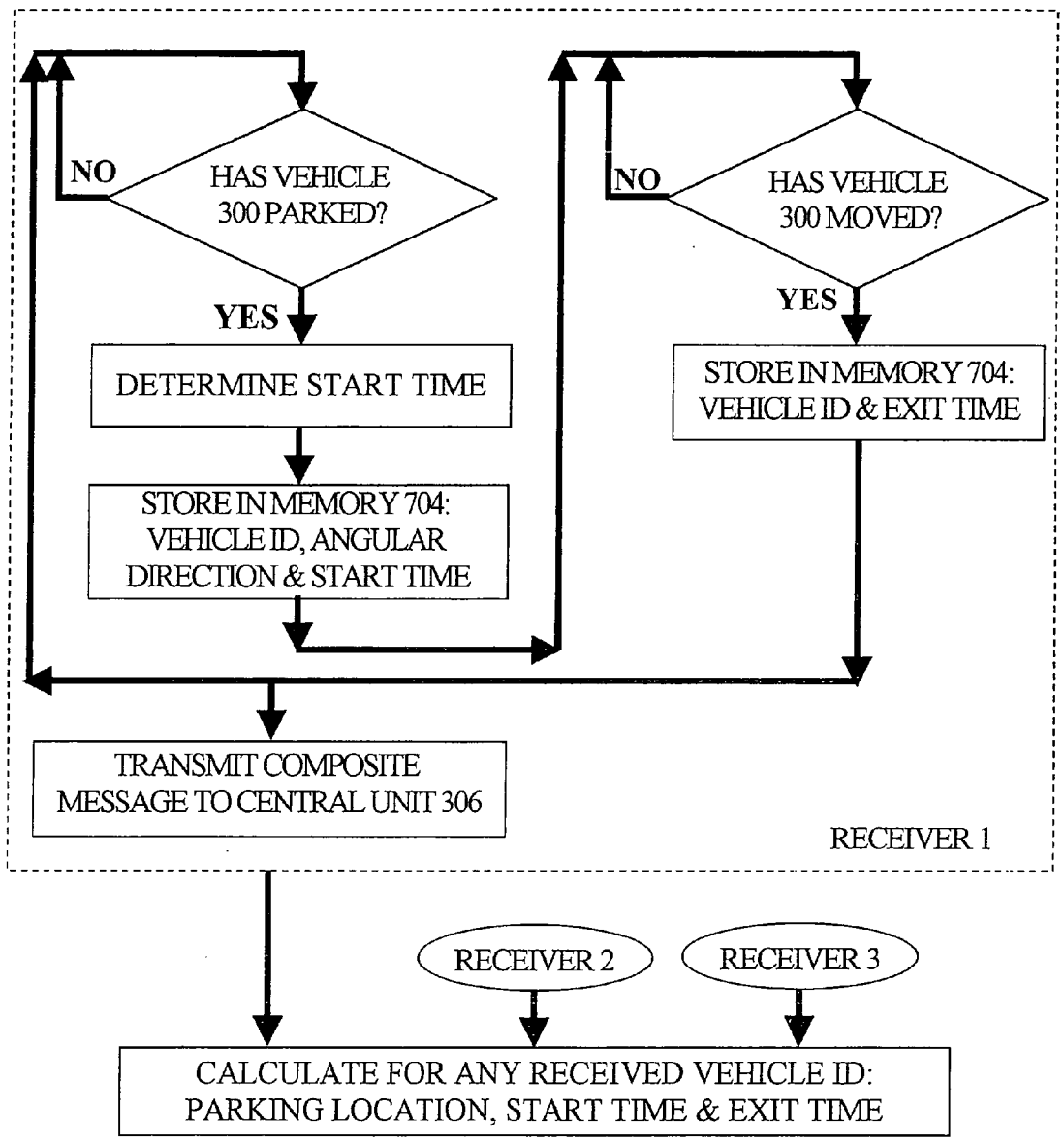

Reference is now made to FIGS. 4A, 4B and 4C, which are simplified flow charts illustrating the operation of the three alternative embodiments of parking payment systems and methodologies of FIGS. 3A, 3B and 3C respectively.

Referring now to FIG. 4A, it is seen that an initial determination is made retroactively as to whether a vehicle has parked. This determination is typically made by sensing whether a vehicle has been motionless for at least a predetermined time, such as, for example five minutes. If a vehicle is determined to have been parked, the start time of parking is determined. The start time normally is earlier than the time that the determination was made. The system may or may not send a start parking message to central unit 106 at this stage.

The start time of parking is typically stored in memory 504 (FIG. 3A).

A determination is made of when the vehicle first moves from its parking location. Once such movement is sensed, the exit time of parking is determined. The exit time may be communicated to the central unit 106 upon exit. If the start time has not yet been communicated to the central unit 106, both the start time and exit time may be communicated together. As a further alternative, the start and exit time of each parking event may be stored in memory 504 for later transmittal to the central unit 106.

Referring now to FIG. 4B, which describes the system of FIGS. 1B and 3B, it is seen that an initial determination is also made retroactively as to whether a vehicle has parked. This determination is typically made by sensing whether a vehicle has been motionless for at least a predetermined time, such as, for example five minutes. If a vehicle is determined to have been parked, the start time of parking is determined. The start time normally is earlier than the time that the determination was made.

The start time of parking is typically stored in memory 604 (FIG. 3B).

A determination is made of when the vehicle first moves from its parking location. Once such movement is sensed, the exit time of parking is determined. The start and exit time of each parking event are stored in memory 604 for later transmittal to the intermediate storage and communication unit 208.

When the vehicle reaches a download location, such as a filling station, the contents of memory 604 are preferably downloaded in a composite message to intermediate storage and communication unit 208.

Communicator 612 of intermediate storage and communication unit 208 typically transmits a composite message in respect of multiple parking events of multiple vehicles to central unit 210.

Optionally direct communication between vehicle mounted communicator 206 and central unit 210 may be provided.

Referring now to FIG. 4C, which describes the operation of the embodiment of FIGS. 1C and 3C, it is seen that an initial determination is made by each receiver 304 retroactively as to whether a vehicle has parked. This determination is typically made by sensing whether a vehicle has been motionless for at least a predetermined time, such as, for example five minutes. If a vehicle is determined to have been parked, the start time of parking is determined. The start time normally is earlier than the time that the determination was made.

The start time of parking is typically stored in memory 704 (FIG. 3C) of each receiver.

A determination is made by each receiver of when the vehicle first moves from its parking location. Once such movement is sensed, the exit time of parking is determined. The start and exit time of each parking event are stored in memory 704.

Intermittently the start and exit times of a plurality of vehicles are transmitted to central unit 306 by receivers 304. The central unit, by employing triangulation techniques, determines the location of each vehicle and associates it with the corresponding start and exit times for each parking event.

Figure 5:
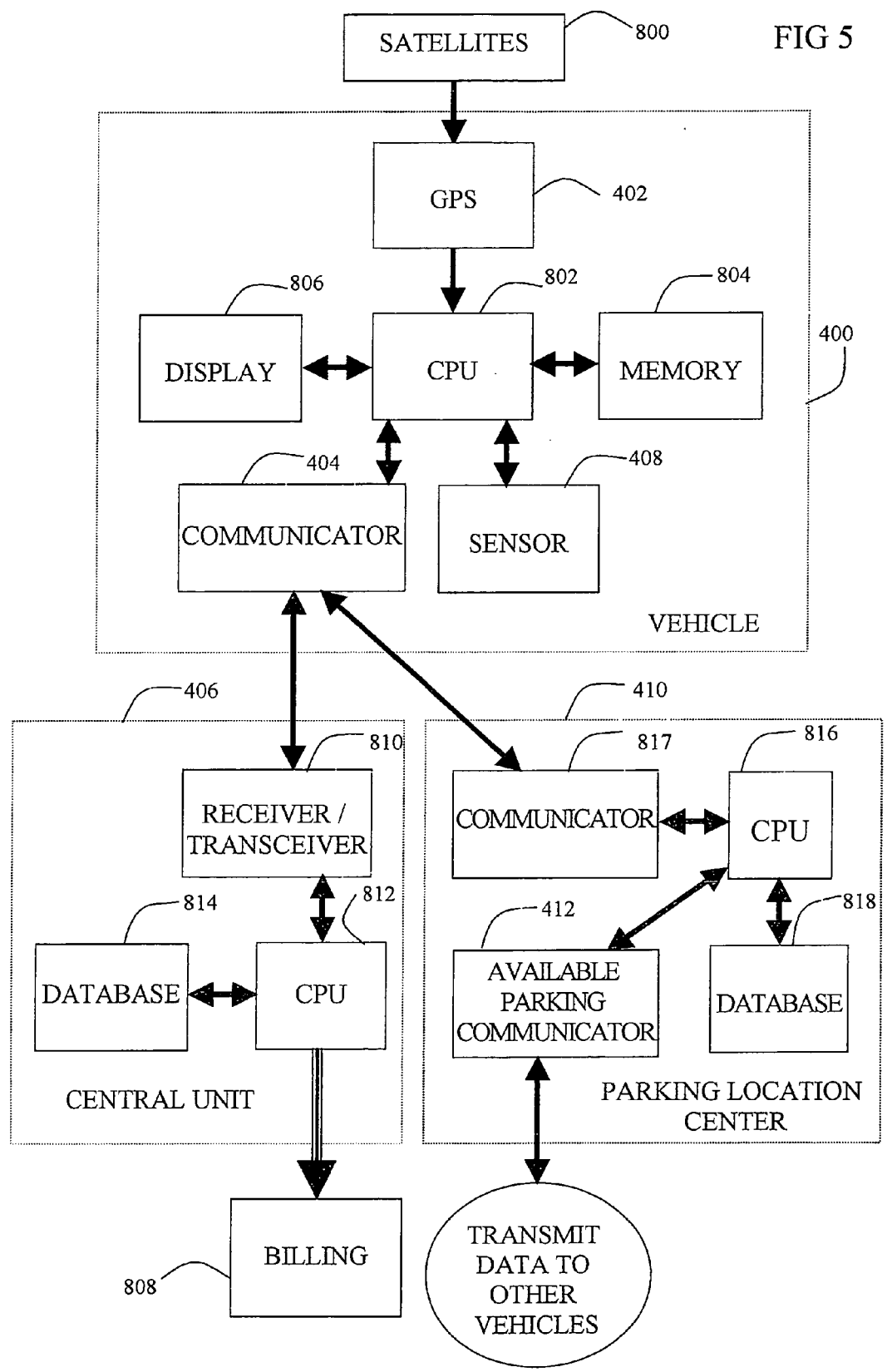
FIG. 5 is a simplified block diagram illustration of an embodiment of a parking location and payment system and methodology constructed and operative in accordance with a preferred embodiment of the present invention and corresponding to FIG. 2.

Reference is now made to FIG. 5, which is a simplified block diagram illustration of an embodiment of a parking location and payment system and methodology constructed and operative in accordance with a preferred embodiment of the present invention and corresponding to FIG. 2.

FIG. 5 illustrates, in block diagram form, the GPS-based system for finding available parking locations and for effecting payment for parking without requiring any driver intervention shown in FIG. 2.

Vehicle 400 is equipped with GPS receiver 402, which receives inputs from GPS satellites 800. GPS receiver 402 outputs vehicle location data to a CPU 802, which preferably but not necessarily interfaces with a memory 804 and a display 806. Parking communicator 404 receives the location input from GPS receiver 402 via CPU 802 and transmits a message in a wireless manner to central unit 406, which in turn provides data used for effecting payment for parking to a billing system 808.

In the embodiment of FIGS. 2 and 5, in addition to the functionality described hereinabove, the vehicle is preferably provided with at least one sensor 408 indicating existence of at least one potential unoccupied additional adjacent parking place. As noted hereinabove with reference to FIG. 2, the sensor 408 is typically a laser range finder, a radar device or an ultrasonic range finder and is typically mounted so as to be either front facing or rearward facing so as to identify the existence of an empty parking space.

The output of sensor 408 is communicated while the vehicle is parked, preferably in a wireless manner, preferably via communicator 404 to parking location center 410, which may be identical to central unit 406 or may employ all or part of the same computer hardware.

The central unit 406 typically includes a wireless receiver or transceiver 810, which interfaces with a CPU 812. CPU 812 preferably interfaces with a database 814. The CPU 812 and the database 814 preferably cooperate for processing the data received from the vehicle 400 into a form useful by the billing system 808.

As noted hereinabove with reference to FIG. 2, parking location center 410 typically maintains a street parking map database indicating legal street parking spaces and includes functionality providing a correlator. The correlator, here embodied in a CPU 816 receives an output from sensor 408 via communicator 817, indicating the existence of at least one potential unoccupied additional adjacent parking place and correlates it with legal street parking spaces, using a central database 818.

An available parking communicator 412, associated with the parking location center 410, provides information regarding unoccupied legal street parking places to at least one driver, preferably in a wireless manner. Preferably communicator 412 broadcasts data indicating the availability of parking spaces at given locations either by direct wireless communication, wireless broadcast or via the Internet.

It is appreciated that although the vehicle location functionality of FIGS. 2 & 5 is shown in combination with a parking payment system, it is also possible that the vehicle location functionality be provided in a stand-alone form, such as without a parking payment system or with a parking payment system other than that of the type described hereinabove with reference to FIGS. 1A, 3A & 4A. For example, the vehicle location functionality of FIGS. 2 & 5 may be provided in association with a parking payment system of the type described hereinabove with reference to either of FIGS. 1B and 1C.

Figure 6:
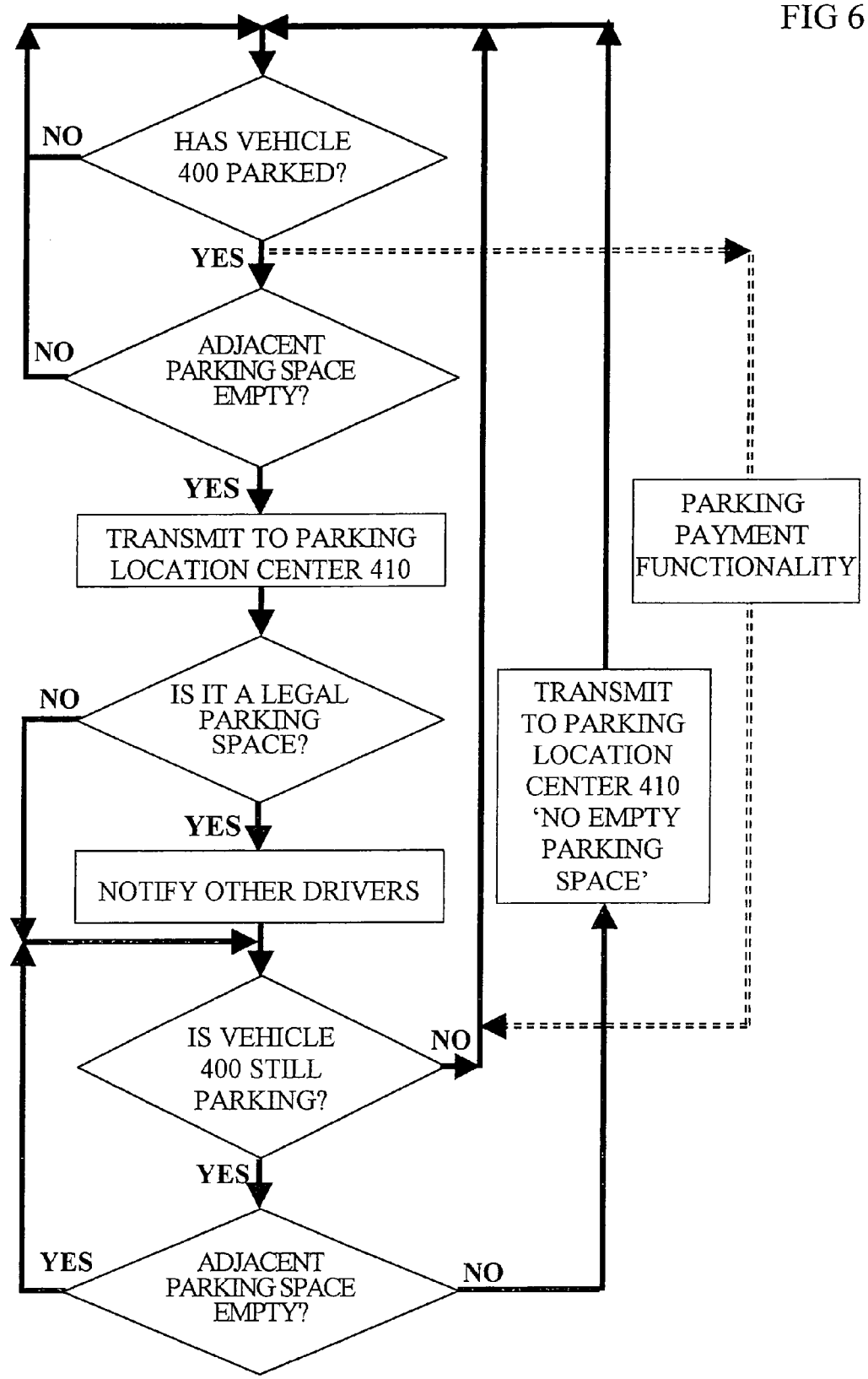
FIG. 6 is a simplified flow chart illustrating an embodiment of the parking location and payment system and methodology of FIGS. 2 & 5.

Reference is now made to FIG. 6, which is a simplified flow chart illustrating an embodiment of the parking location and payment system and methodology of FIGS. 2 & 5. As seen in FIG. 6, the embodiment of FIGS. 2 & 5 provides parking payment functionality, which may be identical to that of FIG. 4A. In addition to the parking payment functionality, the embodiment of FIGS. 2 & 5 provides parking location functionality as described hereinbelow:

A determination is made whether vehicle 400 has parked. If so, a determination is made, using sensor 408, whether an adjacent parking space is empty. If so, a message is transmitted forthwith to parking location center 410. The parking space center 410, makes a determination as to whether the sensed empty parking space is a legal parking space. If so, it notifies other drivers by any suitable technique.

Thereafter, if the vehicle remains parked and the sensed empty parking space remains empty, no further message is transmitted to parking location center 410. If, however, the previously empty parking space is subsequently filled, a suitable message is sent to parking location center 410, preferably causing an appropriate notification to be broadcast thereby to other vehicles.

Figure 7C:
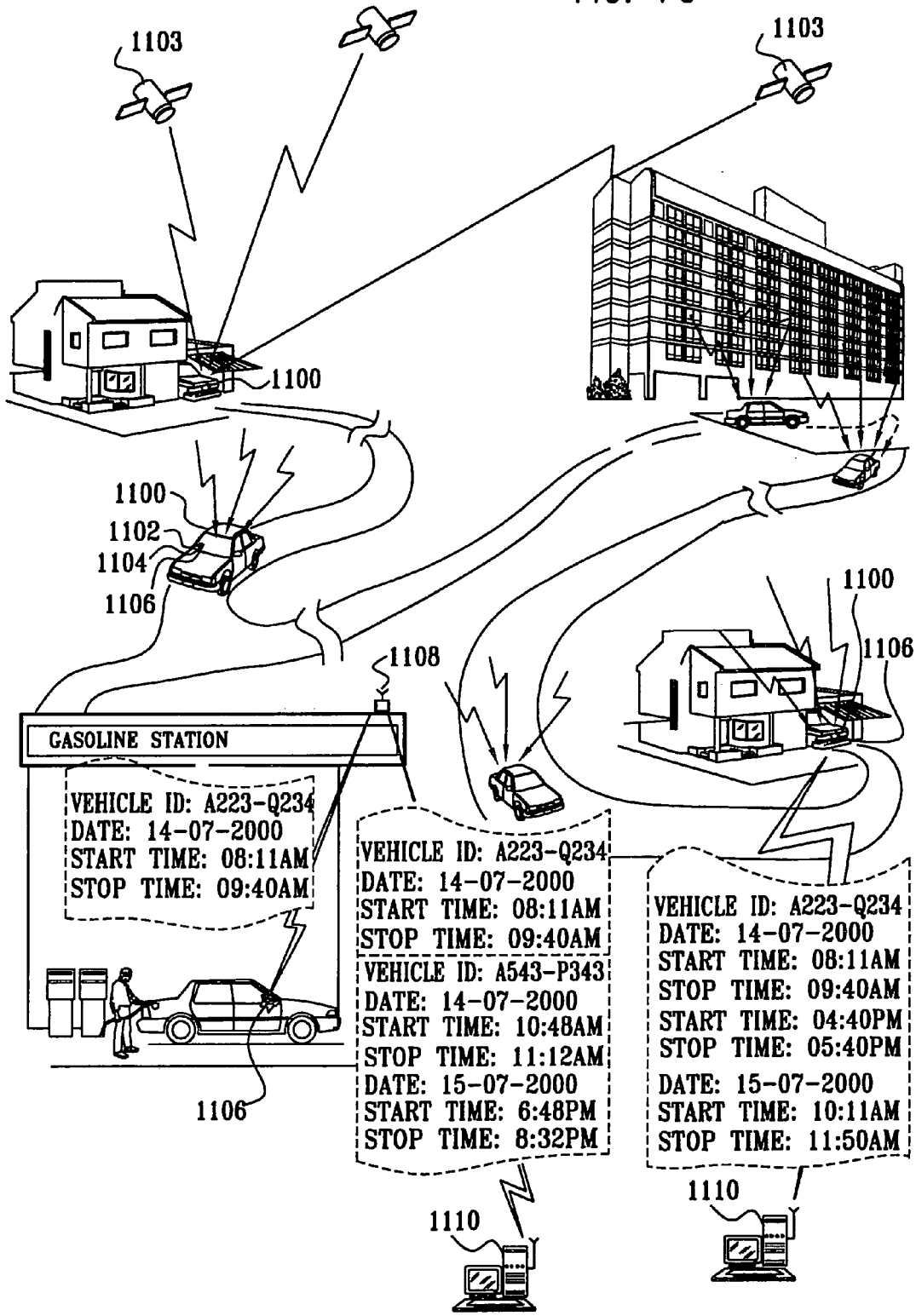

Reference is now made to FIGS. 7A, 7B and 7C, which are simplified pictorial illustrations of three alternative embodiments of vehicle-related services payment systems and methodologies constructed and operative in accordance with a preferred embodiment of the present invention and which preferably are characterized in that the payment in respect of a vehicle-related service is dependent on at least one of whether and when the vehicle is being operated.

Important examples of such systems and methodologies include vehicle insurance billing and vehicle fee payment systems wherein the only variables sensed by an on-board vehicle sensor, which are considered in the billing data are duration of vehicle use and time of day or night of vehicle use. Other types of such systems and methodologies are also within the scope of the present invention.

Turning now to FIG. 7A, there is seen a vehicle 900 equipped with a vehicle movement or other vehicle operation determining sensor 902. Sensor 902 is typically a vibration sensor, an electrical or acoustic motor operation sensor or a driver presence sensor. Sensor 902 need not necessarily be connected to the electrical system of the vehicle 900.

Without requiring any intervention by the driver, the times when a driver moves the vehicle 900 and subsequently parks the vehicle 900 are recorded in a memory 904, which may store a series of vehicle operation start and stop records.

As illustrated in FIG. 7A, when the vehicle 900 is located at one of a multiplicity of predetermined download locations, such as a suitably equipped filling station, an on-board communicator 906 downloads data stored in memory 904 and relating to a plurality of vehicle operation start and stop events, typically in a wireless manner, to an intermediate storage and communication unit 908, typically located at the filling station. The intermediate storage and communication unit 908 preferably receives and stores data relating to a plurality of vehicle operation start and stop events in respect of a multiplicity of vehicles and communicates this data, in a composite message, preferably in a wireless manner, to a central unit 910. Alternatively or additionally, download locations may be found at other locations, such as road intersections, parking lots and malls.

Typically, the composite message may be transmitted at any time from the intermediate storage and communication unit 908 to the central unit 910. Such a composite message typically includes messages relating to a plurality of vehicle operation start and stop events for a multiplicity of different vehicles. In respect of each such event, the message typically includes data relating to the identity of the vehicle, the date, the start time of vehicle operation and the stop time of vehicle operation.

Composite messages may be transmitted at predetermined times or upon accumulation of data relating to a predetermined number of events or based on any other suitable criterion or combination of criteria.

Turning now to FIG. 7B, there is seen a vehicle 1000 equipped with a movement or operation determining sensor 1002. Sensor 1002 is typically a vibration sensor, an electrical or acoustic motor operation sensor or a driver presence sensor. Sensor 1002 need not necessarily be connected to the electrical system of the vehicle 1000.

Without requiring any intervention by the driver, the times when a driver moves the vehicle 1000 and subsequently parks the vehicle 1000 are recorded in a memory 1004, which may store a series of vehicle operation start and stop records.

As illustrated in FIG. 7B, an on-board communicator 1006 downloads data stored in memory 1004 and relating to a plurality of vehicle operation start and stop events, in a composite message, preferably in a wireless manner to a central unit 1010.

Typically, the composite message may be transmitted at any time from the communicator 1006 to the central unit 1010. Such a composite message typically includes messages relating to a plurality of vehicle operation start and stop events. In respect of each such event, the message typically includes data relating to the identity of the vehicle, the date, the start time of vehicle operation and the stop time of vehicle operation.

Composite messages may be transmitted at predetermined times or upon accumulation of data relating to a predetermined number of events or based on any other suitable criterion or combination of criteria.

Turning now to FIG. 7C, there is seen a vehicle 1100 equipped with a GPS receiver 1102 receiving inputs from satellites 1103 or a similar location determining devices. The GPS receiver 1102 senses when the location of the vehicle changes.

Without requiring any intervention by the driver, the times when a driver moves the vehicle 1100 and subsequently parks the vehicle 1100 are recorded in a memory 1104, which may store a series of vehicle operation start and stop records.

As illustrated in FIG. 7C, an on-board communicator 1106 downloads data stored in memory 1104 and relating to a plurality of vehicle operation start and stop events, in a composite message, preferably in a wireless manner to a central unit 1110.

Typically, the composite message may be transmitted at any time from the communicator 1106 to the central unit 110. Such a composite message typically includes messages relating to a plurality of vehicle operation start and stop events. In respect of each such event, the message typically includes data relating to the identity of the vehicle, the date, the start time of vehicle operation and the stop time of vehicle operation.

Composite messages may be transmitted at predetermined times or upon accumulation of data relating to a predetermined number of events or based on any other suitable criterion or combination of criteria.

Additionally or alternatively, communicator 1106 may communicate with the central unit 1110 via an intermediate storage and communication unit 1108, much in the same way as described hereinabove with reference to FIG. 7A.

Figure 8A:
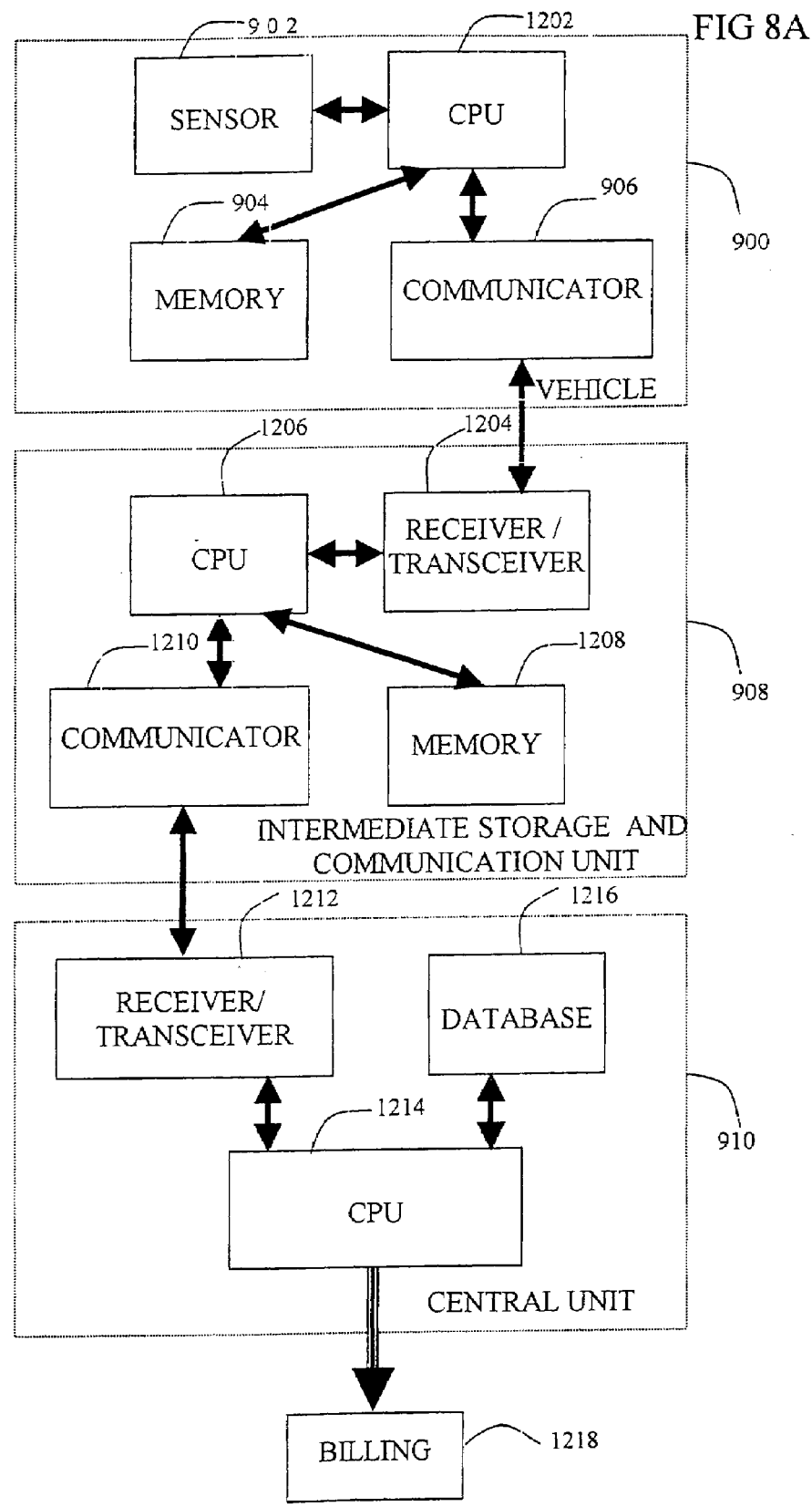
FIGS. 8A, 8B and 8C are simplified block diagram illustrations of three alternative embodiments of payment systems and methodologies constructed and operative in accordance with a preferred embodiment of the present invention and corresponding to FIGS. 7A, 7B & 7C respectively.
Figure 8B:
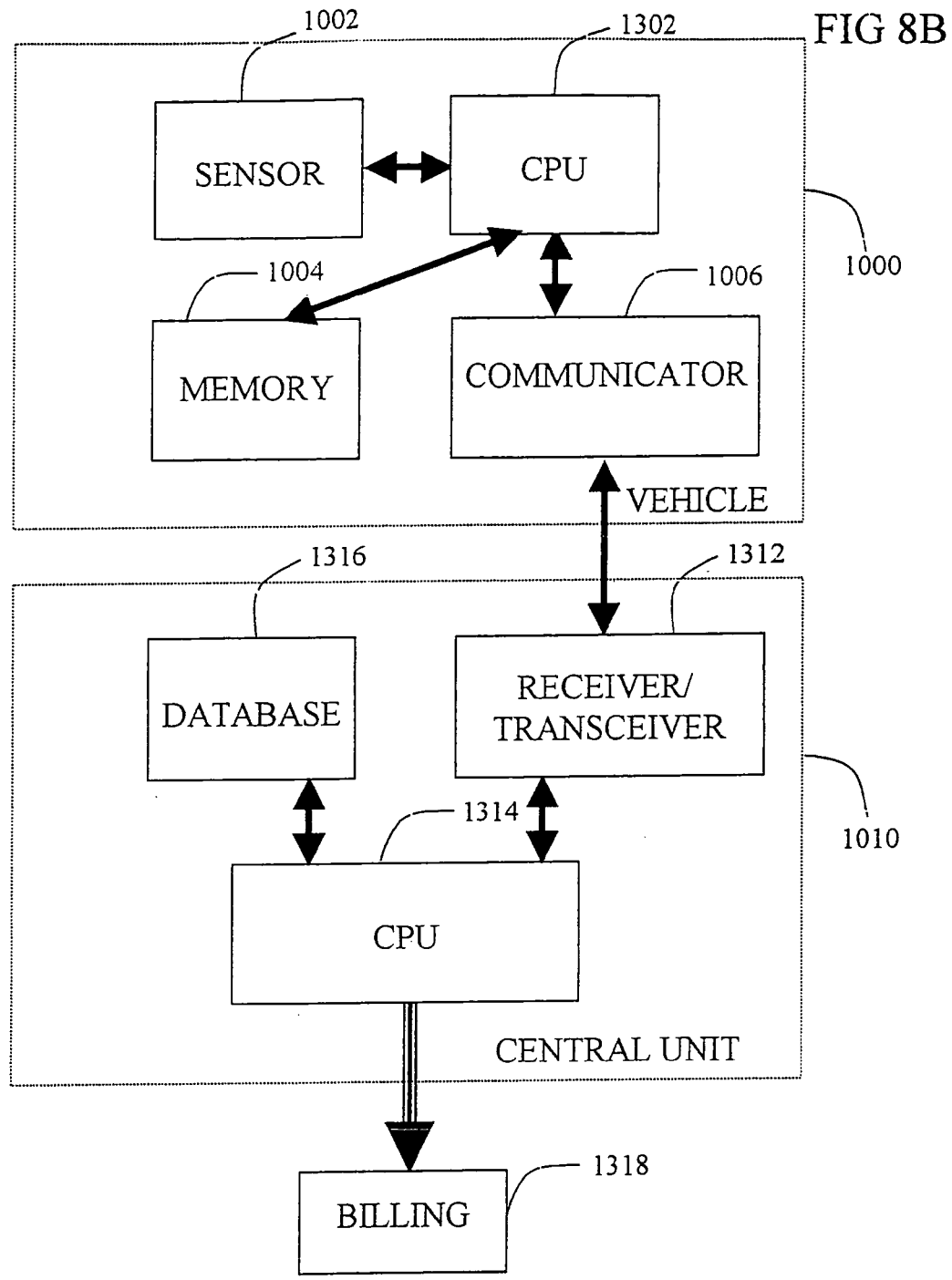
Figure 8C:
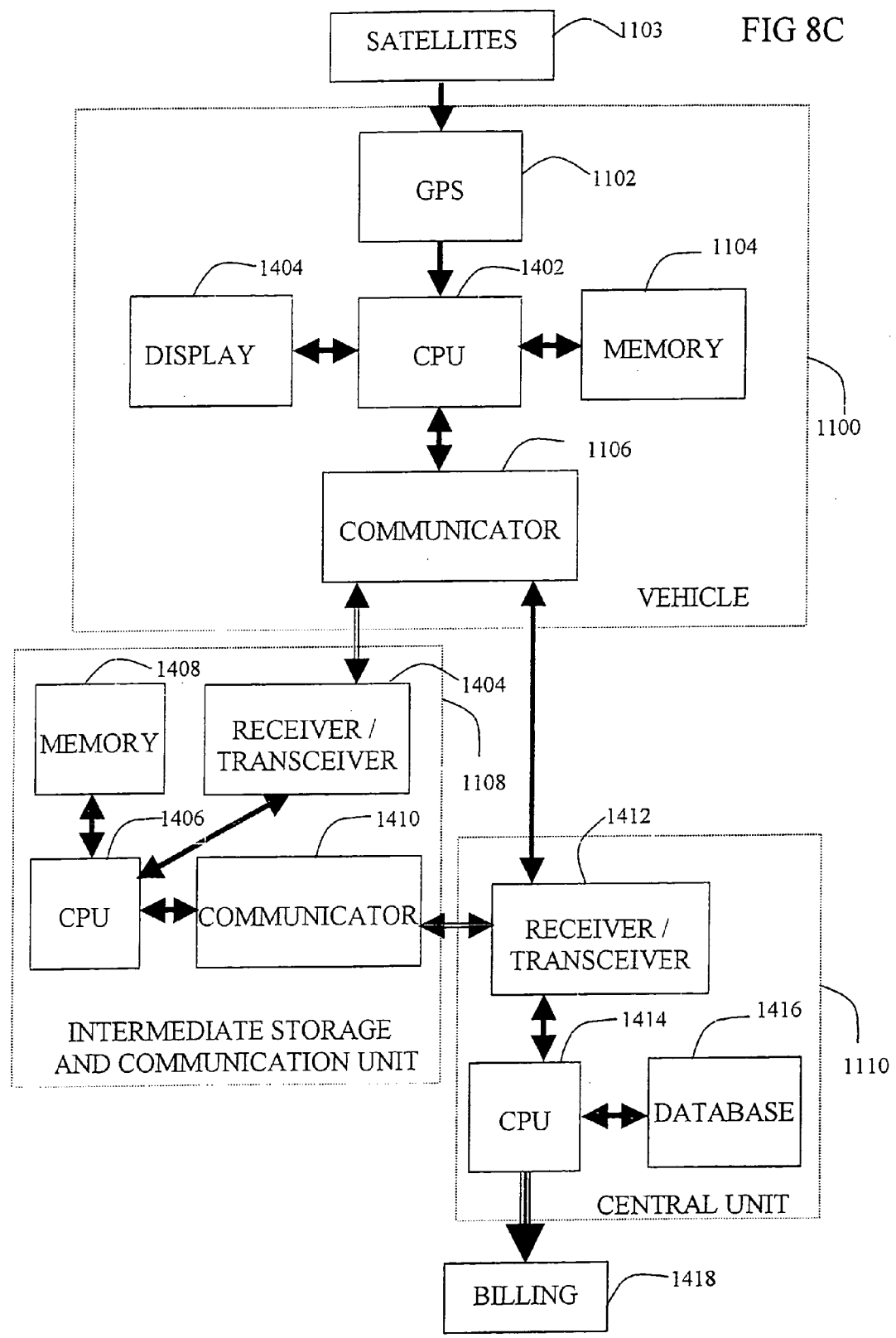

Reference is now made to FIGS. 8A, 8B and 8C, which are simplified block diagram illustrations of three alternative embodiments of vehicle-related services payment systems and methodologies constructed and operative in accordance with a preferred embodiment of the present invention and corresponding to FIGS. 7A, 7B & 7C respectively.

Turning now to FIG. 8A, it is seen that vehicle 900 includes a CPU 1202, which interfaces with movement or operation determining sensor 902, memory 904 and on-board communicator 906.

As illustrated in FIG. 8A, when the vehicle 900 is located at one of a multiplicity of predetermined download locations, such as a suitably equipped filling station, on-board communicator 906 downloads data stored in memory 904 relating to a plurality of vehicle operation start and stop events, typically in a wireless manner, to intermediate storage and communication unit 908. The intermediate storage and communication unit 908 includes a receiver or transceiver 1204 which interfaces with a CPU 1206. The CPU 1206 interfaces with a memory 1208 which stores data relating to a plurality of vehicle operation start and stop events in respect of a multiplicity of vehicles and with a communicator 1210, which communicates this data, in a composite message, preferably in a wireless manner to central unit 910.

Central unit 910 preferably includes a receiver or transceiver 1212 which interfaces with a CPU 1214. The CPU 1214 in turn interfaces with a database 1216. The database 1216 accumulates the content of the composite messages received by the central unit 910 and supplies this content in an appropriate form to a billing system 1218. The billing system 1218 may take into account appropriate additional criteria, such as, for example in the case of insurance, the age and driving experience of a driver and various characteristics of the vehicle or in the case of vehicle-related fees, the type and weight of the vehicle.

Turning now to FIG. 8B, it is seen that vehicle 1000 includes a CPU 1302, which interfaces with movement or operation determining sensor 1002, memory 1004 and on-board communicator 1006.

As illustrated in FIG. 8B, on-board communicator 1006 downloads data stored in memory 1004 and relating to one or more vehicle operation start and stop events, typically in a wireless manner, to central unit 1010. Central unit 1010 preferably includes a receiver or transceiver 1312 which interfaces with a CPU 1314. The CPU 1314 in turn interfaces with a database 1316. The database 1316 accumulates the content of the composite messages received by the central unit 1010 and supplies this content in an appropriate form to a billing system 1318.

Turning now to FIG. 5C, it is seen that vehicle 1100 includes a GPS receiver 1102 receiving inputs from satellites 1103. GPS receiver 1102 outputs to a CPU 1402 which interfaces with memory 1104 and with an optional display 1404. CPU also interfaces with on-board communicator 1106.

As illustrated in FIG. 8C, when the vehicle 1100 is located at one of a multiplicity of predetermined download locations, such as a suitably equipped filling station, on-board communicator 1106 downloads data stored in memory 1104 and relating to a plurality of vehicle operation start and stop events, typically in a wireless manner, to intermediate storage and communication unit 1108. The intermediate storage and communication unit 1108 includes a receiver or transceiver 1404 which interfaces with a CPU 1406. The CPU 1406 interfaces with a memory 1408 which stores data relating to a plurality of vehicle operation start and stop events in respect of a multiplicity of vehicles and with a communicator 1410, which communicates this data, in a composite message, preferably in a wireless manner to central unit 1110.

Central unit 1110 preferably includes a receiver or transceiver 1412 which interfaces with a CPU 1414. The CPU 1414 in turn interfaces with a database 1416. The database accumulates the content of the composite messages received by the central unit 1110 and supplies this content in an appropriate form to a billing system 1418.

Additionally or alternatively, communicator 1106 may communicate directly with the central unit 1110, bypassing the intermediate storage and communication unit 1108. In such a case, units 1108 may be obviated.

Figure 9A:
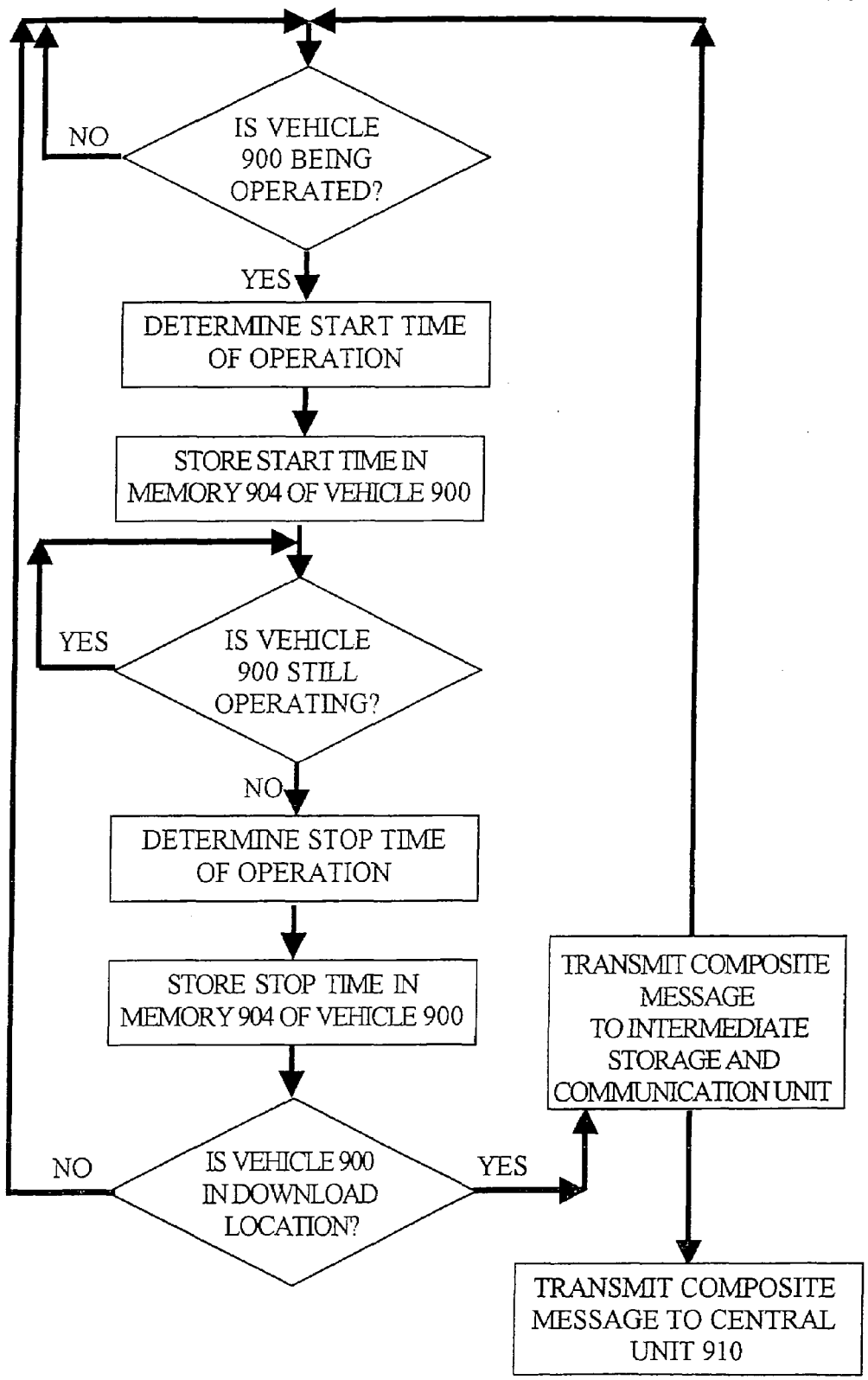
FIGS. 9A, 9B and 9C are simplified flow charts illustrating the operation of the three alternative embodiments of payment systems and methodologies of FIGS. 7A & 8A, 7B & 8B and 7C & 8C respectively.
Figure 9B:
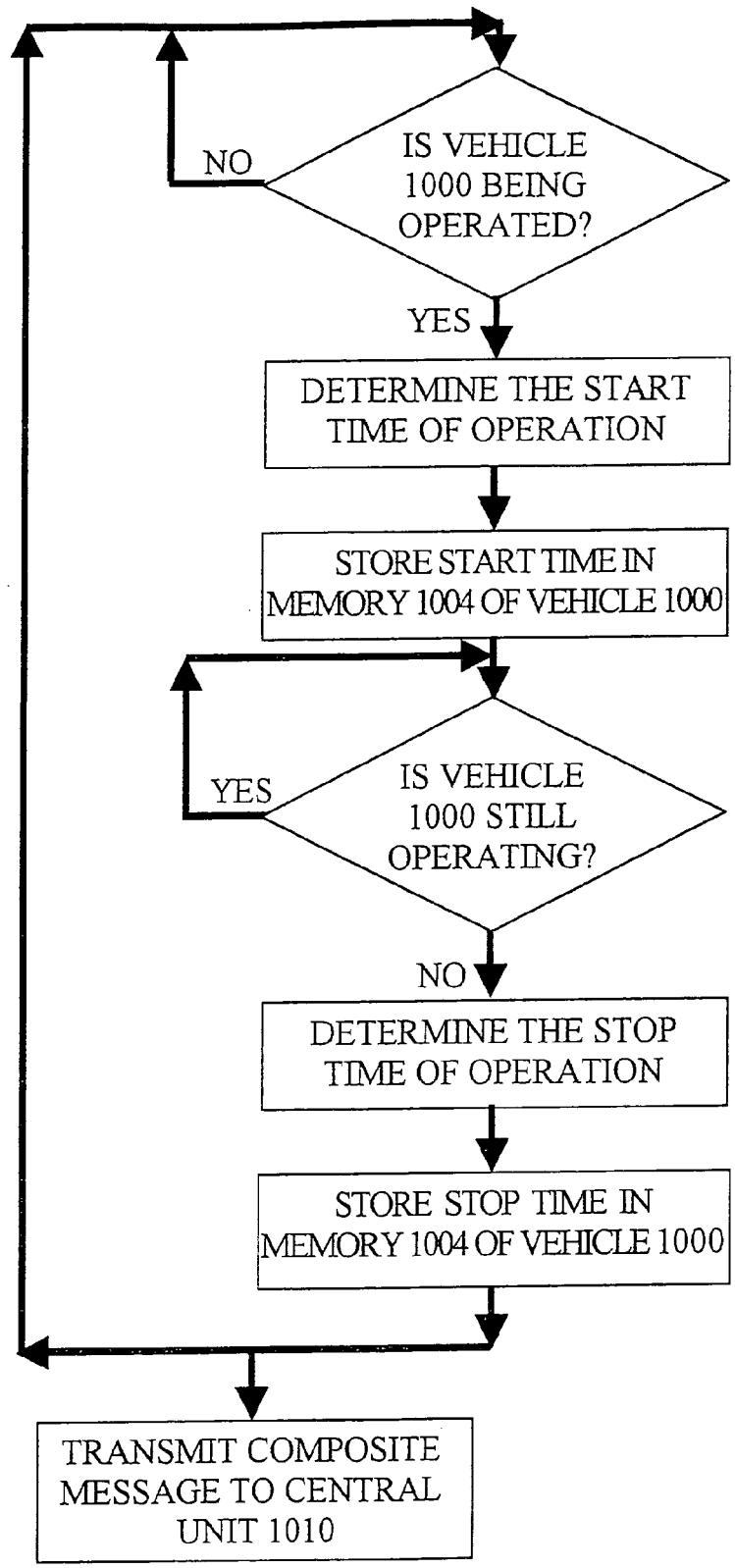
Figure 9C:
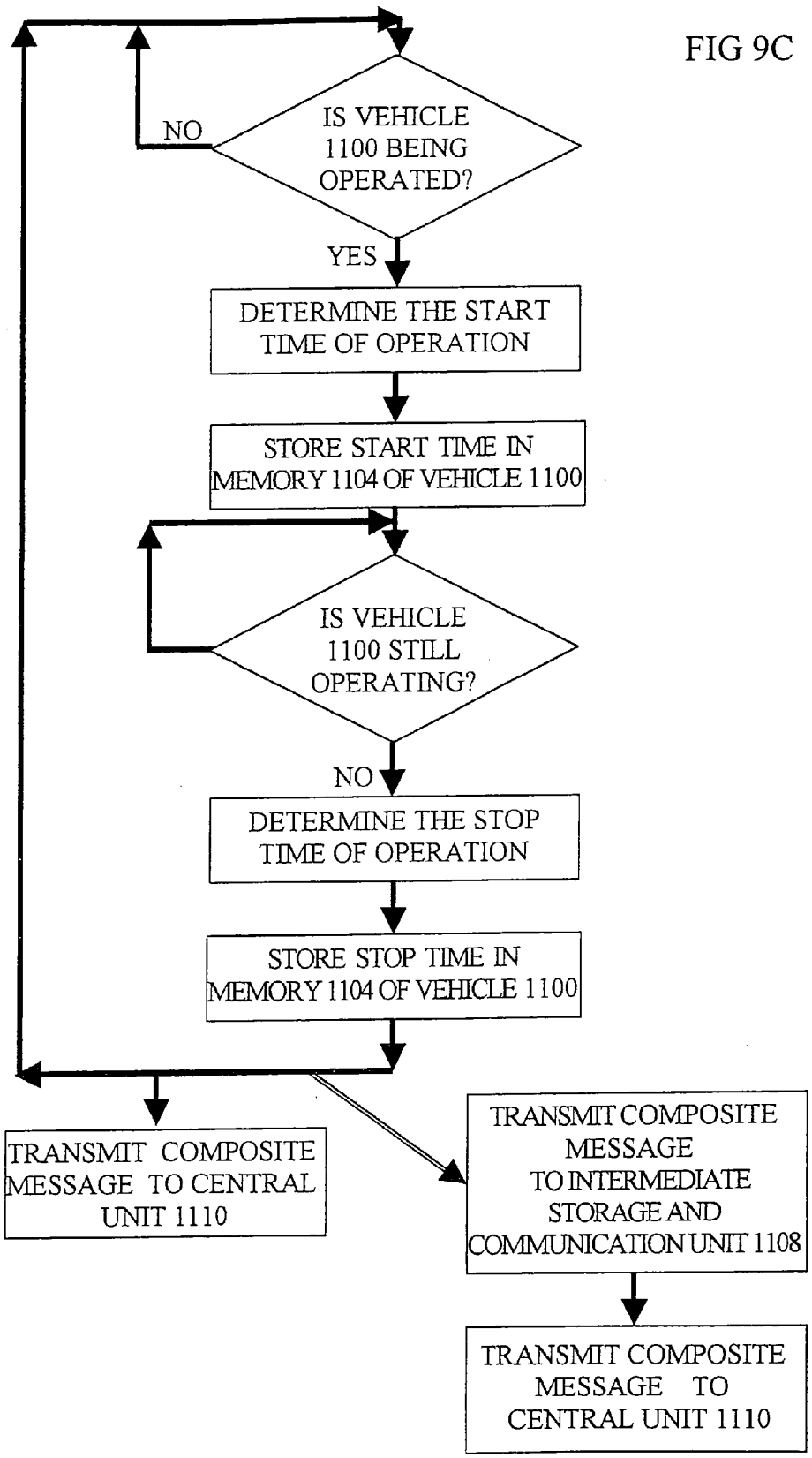

Reference is now made to FIGS. 9A, 9B and 9C, which are simplified flow charts illustrating the operation of the three alternative embodiments of payment systems and methodologies of FIGS. 7A & 8A, 7B & 8B and 7C & 8C, respectively.

Turning now to FIG. 9A, it is seen that a determination of whether vehicle 900 is being operated is made repeatedly. If the vehicle is being operated, a determination of the start time of vehicle operation is made and the start time is stored in memory 904.

While the vehicle is operating, a determination of whether vehicle 900 is still being operated is made repeatedly. If the vehicle ceases operation for at least a predetermined time, typically 5 minutes, a determination of the stop time of vehicle operation is made and the stop time is stored in memory 904, At any suitable time when the vehicle is located at a suitable download location, whether the vehicle is operating or not operating, the contents of the memory 904 may be downloaded to the intermediate storage and communication unit 908 and thence to the central unit 910.

Turning now to FIG. 9B, it is seen that a determination of whether vehicle 1000 is being operated is made repeatedly. If the vehicle is being operated, a determination of the start time of vehicle operation is made and the start time is stored in memory 1004.

While the vehicle is operating, a determination of whether vehicle 1000 is still being operated is made repeatedly. If the vehicle ceases operation for at least a predetermined time, typically 5 minutes, a determination of the stop time of vehicle operation is made and the stop time is stored in memory 1004.

At any suitable time, whether the vehicle is operating or not operating, the contents of the memory 1004 may be downloaded to the central unit 1010.

Turning now to FIG. 9C, it is seen that a determination of whether vehicle 1100 is being operated is made repeatedly. If the vehicle is being operated, a determination of the start time of vehicle operation is made and the start time is stored in memory 1104.

While the vehicle is operating, a determination of whether vehicle 1100 is still being operated is made repeatedly. If the vehicle ceases operation for at least a predetermined time, typically 5 minutes, a determination of the stop time of vehicle operation is made and the stop time is stored in memory 1104.

At any suitable time, whether the vehicle is operating or not operating, the contents of the memory 1104 may be downloaded directly to central unit 1110. Alternatively, the contents of memory 1104 may be downloaded via the intermediate storage and communication unit 1108 to the central unit 1110 when the vehicle is at a suitable download location.

Figure 10A:
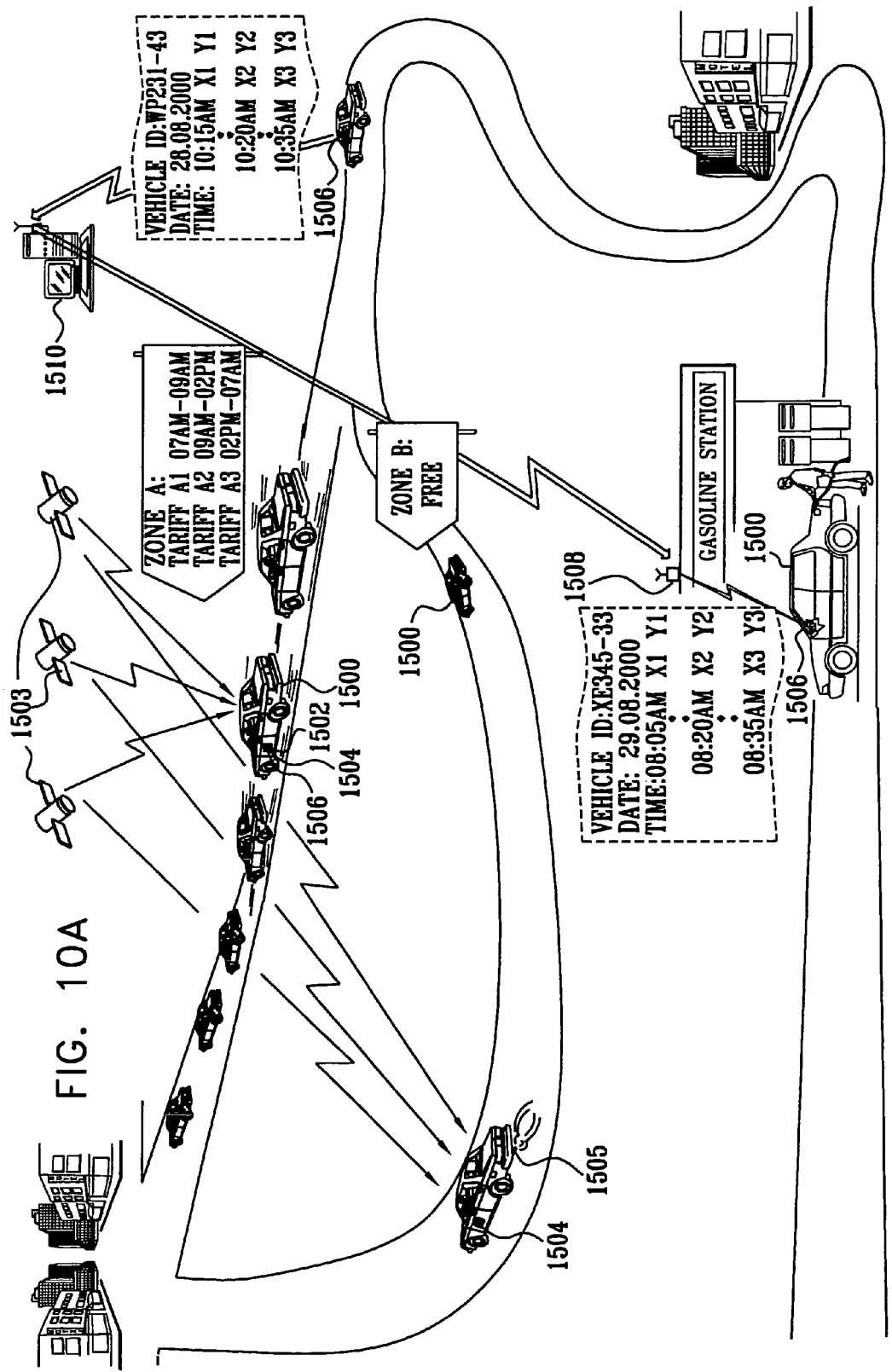
FIGS. 10A, 10B and 10C are simplified pictorial illustrations of preferred embodiments of vehicle fee payment systems and methodologies constructed and operative in accordance with three alternative preferred embodiments of the present invention.
Figure 10B:
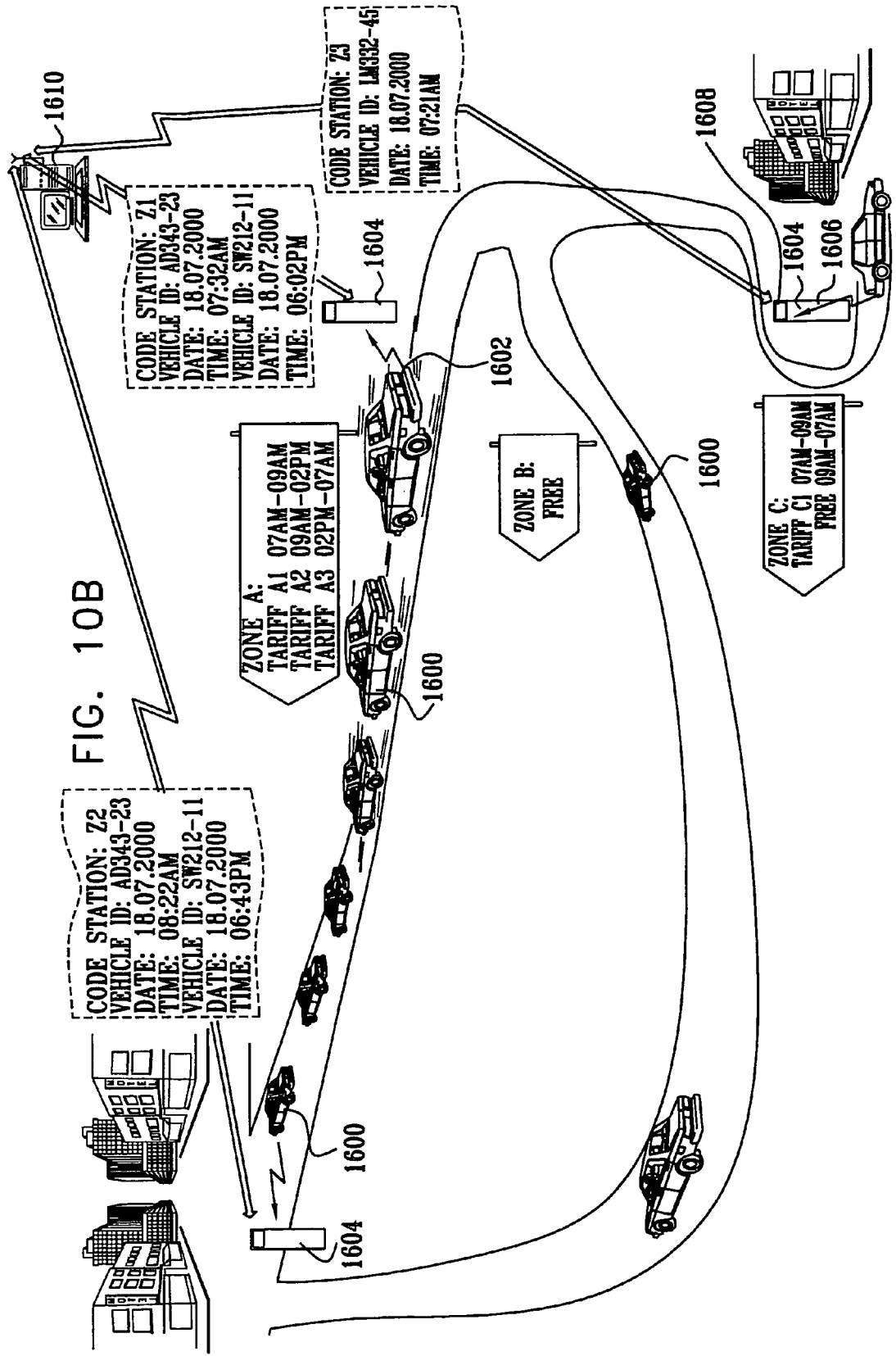
Figure 10C:
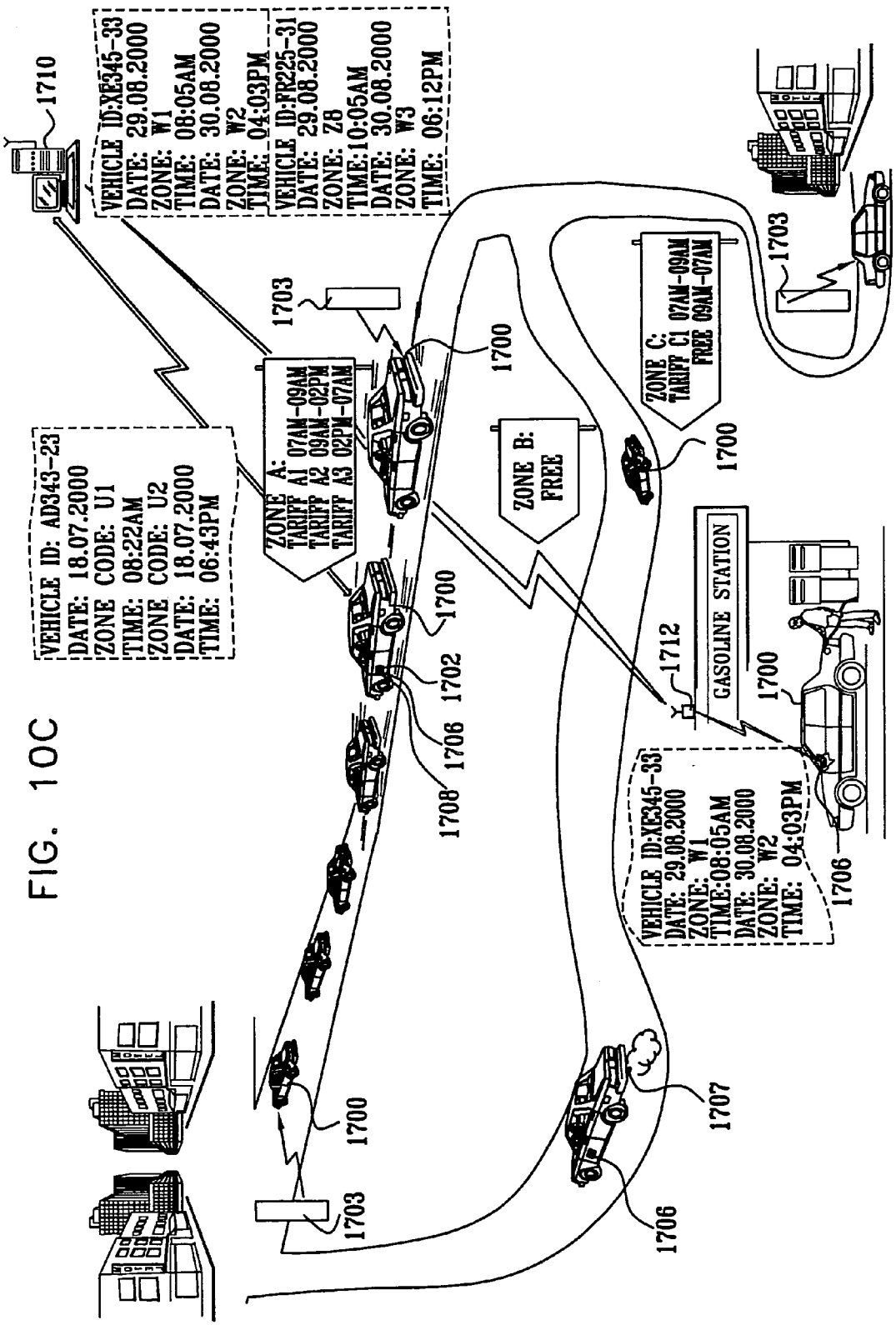

Reference is now made to FIGS. 10A, 10B & 10C, which are simplified pictorial illustrations of preferred embodiments of vehicle fee payment systems and methodologies constructed and operative in accordance with three alternative preferred embodiments of the present invention.

The embodiment of FIGS. 10A–10C may be employed for modulating traffic over given roads at given times or on given days. Thus, as appropriate, travel over certain routes may require payment of a fee, whereas travel over other alternative routes may require payment of a lesser fee or no fee at all.

It will be appreciated that the embodiment of FIGS. 10A–10C may also be employed for collecting user fees on toll roads. The embodiment of FIGS. 10A–10C may additionally be employed for collecting fees for entry into certain regions, such as areas of a city. Such fees may apply only at certain times or days and may vary from time to time or day to day.

Additionally in accordance with a preferred embodiment of the present invention, the embodiment of FIGS. 10A–10C may be employed for collecting fees that are duration-based solely or in combination with other time, date and/or location criteria. Thus, for example the fees payable may be a function not only of the time of day or date of entry, but also of the time duration that the vehicle is operating within a restricted area.

FIG. 10A shows a GPS based system wherein vehicles 1500 are each equipped with a GPS receiver 1502 which receives location inputs from satellites 1503. GPS receiver 1502 senses the location of each vehicle 1500 over time and provides an output indication of vehicle location as a function of time, which is preferably stored in a memory 1504 located in the vehicle 1500. The contents of the memory 1504 thus provide a record of whether the vehicle is being operated and where it has been traveling, without requiring or permitting driver intervention.

One or more of vehicles 1500 may also include vehicle operation monitors, such as a pollution monitor 1505. The output of the vehicle operation monitor, such as pollution monitor 1505 may also be stored in memory 1504.

As illustrated in FIG. 10A, an on-board communicator 1506 downloads data stored in memory 1504 and relating to vehicle operations over a time period extending from the preceding download, in a composite message, preferably in a wireless manner to a central unit 1510.

Typically, the composite message may be transmitted at any time from the communicator 1506 to the central unit 1510. The message typically includes data relating to the identity of the vehicle and the location of the vehicle during vehicle operation.

Composite messages may be transmitted at predetermined times or upon accumulation of data relating to a predetermined number of events or based on any other suitable criterion or combination of criteria.

Additionally or alternatively, communicator 1506 may communicate with the central unit 1510 via an intermediate storage and communication unit 1508, much in the same way as described hereinabove with reference to FIG. 7A.

It is appreciated that the functionality of FIG. 10A may also be applicable in vehicle insurance payment systems.

FIG. 10B shows a fixed infrastructure based system wherein vehicles 1600 are each equipped with a transmitter 1602, which transmits a wireless coded signal identifying the vehicle. Without requiring any intervention by the driver, the coded signal transmitted by transmitter 1602 is received by suitably located travel monitors 1604 which are preferably located in general propinquity to entrances and exits from restricted or fee bearing locations. Such locations may be, for example, roads as shown in FIG. 10B or alternatively regions of a city where access is restricted or requires the payment of a fee.

The travel monitor 1604 senses the identity of each vehicle 1600 in suitable propinquity thereto and provides an output indication of the sensed vehicle presence at a given time, which is preferably stored in a memory 1606, preferably located at the travel monitor 1604. The combined contents of memories 1606 at suitably located travel monitors 1604 thus provide a record of where and when a vehicle has been or is traveling in a monitored travel space, without requiring or permitting driver intervention.

It may be appreciated that suitable location of travel monitors 1604 at the entrances and exits of roads may enable accurate and efficient collection of fees on roads and suitable location of travel monitors 1604 on access arteries to given regions may enable accurate and efficient collection of fees for access to such restricted or fee bearing areas.

As illustrated in FIG. 10B, a communicator 1608 associated with each travel monitor 1604 downloads data stored in memory 1606 and relating to vehicle operations over a time period extending from the preceding download, in a composite message, preferably in a wireless manner to a central unit 1610.

Typically, the composite message may be transmitted at any time from the communicator 1608 to the central unit 1610. The message typically includes data relating to the identity of the vehicle, the date and the time vehicle presence is sensed as well as the identity of the travel monitor 1604, which, of course, indicates its location.

Composite messages may be transmitted at predetermined times or upon accumulation of data relating to a predetermined number of events or based on any other suitable criterion or combination of criteria.

The central unit 1610 preferably employs the information contained in the composite messages received by it from various travel monitors 1604 to compute fees chargeable to individual vehicles, which are based, inter alia, on time duration of vehicle presence within given regions.

FIG. 10C shows a system wherein vehicles 1700 are each equipped with a receiver 1702 which receives coded location input signals from fixed local transmitters 1703. Receivers 1702 thus sense the presence of the vehicle 1700 at a given location at a given time.

The coded signals are transmitted by transmitters 1703 which are preferably located in general propinquity to entrances and exits from restricted or fee bearing locations. Such locations may be, for example, roads as shown in FIG. 10C or alternatively regions of a city where access is restricted or requires the payment of a fee.

The receiver 1702 senses the identity of each transmitter 1703 as the vehicle 1700 passes in suitable propinquity thereto and provides an output indication of the sensed vehicle presence at a given location at a given time, which is preferably stored in a memory 1706, located on-board the vehicle 1700. The contents of memory 1706 thus provide a record of where and when a vehicle has been or is traveling in a monitored travel space, without requiring or permitting driver intervention.

One or more of vehicles 1700 may also include vehicle operation monitors, such as a pollution monitor 1707. The output of the vehicle operation monitor, such as pollution monitor 1707 may also be stored in memory 1706. Vehicle operation monitors may be any suitable vehicle operation monitors, such as, for example, an on-board vehicle pollution monitor such as that described in U.S. Pat. No. 5,583,765, the disclosure of which is hereby incorporated by reference. It is appreciated that vehicle pollution over a given level may involve payment of a fee, which may be collected automatically by means of the system of FIGS. 10A & 10C.

As illustrated in FIG. 10C, an on-board communicator 1708 downloads data stored in memory 1706 and relating to vehicle operations over a time period extending from the preceding download, in a composite message, preferably in a wireless manner to a central unit 1710.

Typically, the composite message may be transmitted at any time from the communicator 1708 to the central unit 1710. The message typically includes data relating to the identity of the vehicle, the date and the time that the vehicle 1700 passes within predetermined propinquity of each of transmitters 1703.

Composite messages may be transmitted at predetermined times or upon accumulation of data relating to a predetermined number of events or based on any other suitable criterion or combination of criteria.

Additionally or alternatively, communicator 1706 may communicate with the central unit 1710 via an intermediate storage and communication unit 1712, much in the same way as described hereinabove with reference to FIG. 7A.

Figure 11B:
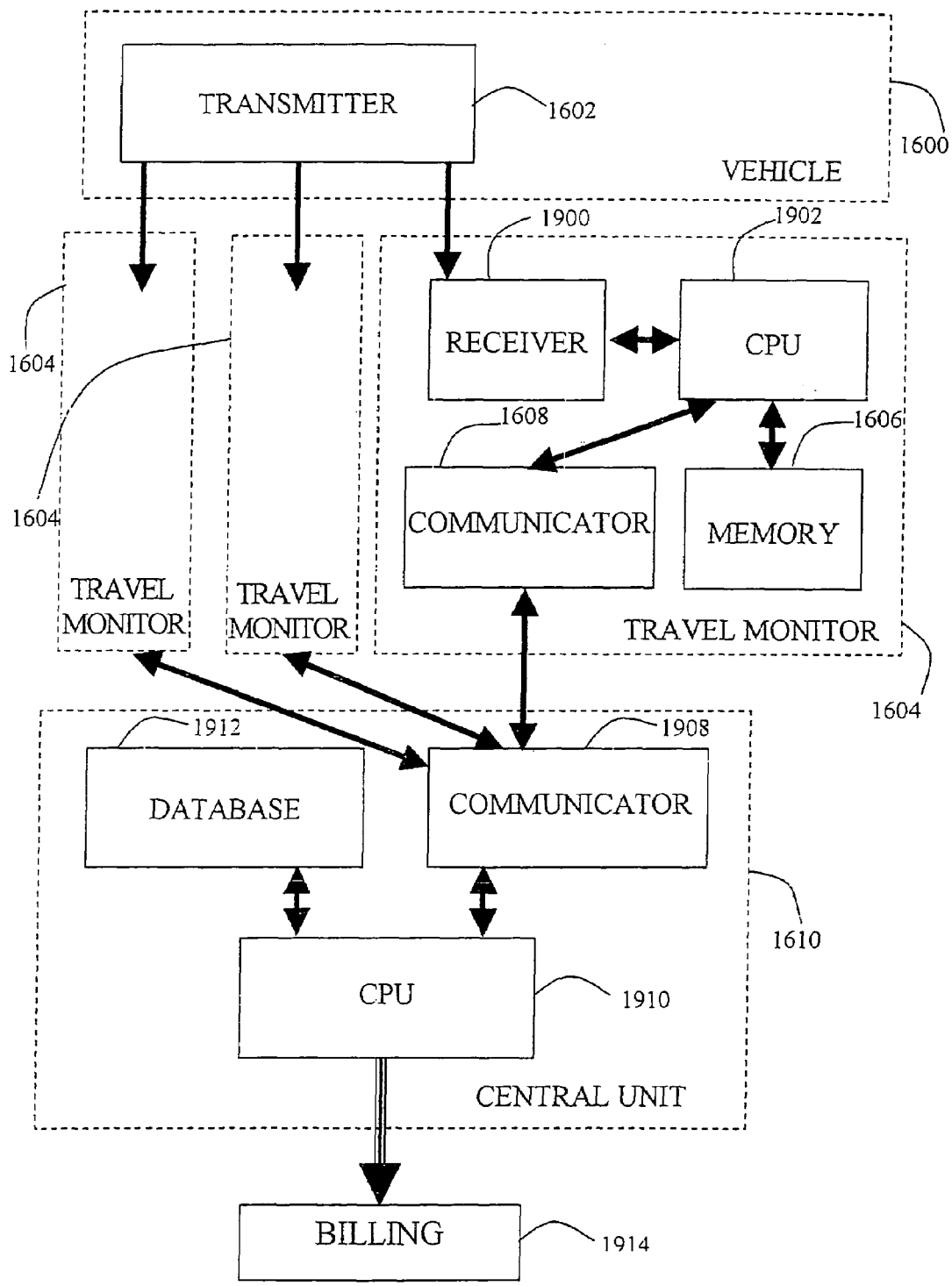
Figure 11C:
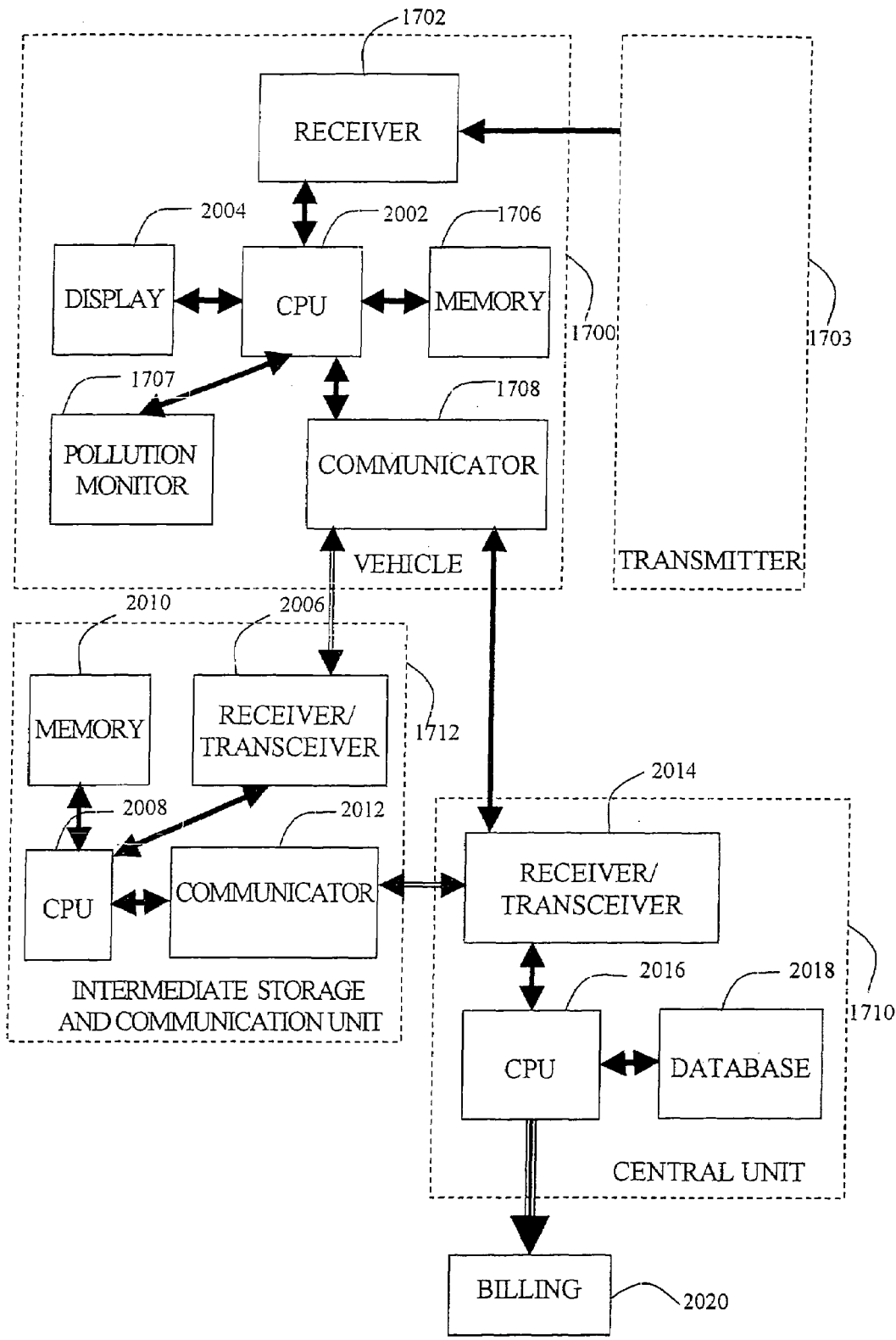

Reference is now made to FIGS. 11A, 11B and 11C which are simplified block diagram illustrations of preferred embodiments of vehicle fee payment systems and methodologies constructed and operative in accordance with a preferred embodiment of the present invention and corresponding to FIGS. 10A, 10B & 10C respectively.

Turning now to FIG. 11A, it is seen that vehicle 1500 includes a GPS receiver 1502 receiving inputs from satellites 1503. GPS receiver 1502 outputs to a CPU 1802 which interfaces with memory 1504 and with an optional display 1804. CPU also interfaces with on-board communicator 1506 and with a vehicle operation monitor, such as pollution monitor 1505.

As illustrated in FIG. 11A, when the vehicle 1500 is located at one of a multiplicity of predetermined download locations, such as a suitably equipped filling station, on-board communicator 1506 downloads data stored in memory 1504 and relating to vehicle operations over a time preferably extending since a previous download, typically in a wireless manner, to intermediate storage and communication unit 1508. The intermediate storage and communication unit 1508 includes a receiver or transceiver 1804 which interfaces with a CPU 1806. The CPU interfaces with a memory 1808 which stores data relating to vehicle operations in respect of a multiplicity of vehicles and with a communicator 1810, which communicates this data, in a composite message, preferably in a wireless manner, to central unit 1510.

Central unit 1510 preferably includes a receiver or transceiver 1812 which interfaces with a CPU 1814. The CPU 1814 in turn interfaces with a database 1816. The database accumulates the content of the composite messages received by the central unit 1510 and supplies this content in an appropriate form to a billing system 1818.

Additionally or alternatively, communicator 1506 may communicate directly with the central unit 1510, bypassing the intermediate storage and communication unit 1508. In such a case, units 1508 may be obviated.

FIG. 11B shows that vehicle 1600 includes transmitter 1602, which transmits a wireless coded signal identifying the vehicle, without requiring any intervention by the driver.

The coded signal transmitted by transmitter 1602 is received by travel monitors 1604 which are located in general propinquity to entrances and exits from restricted or fee bearing locations. Such locations may be, for example, roads as shown in FIG. 10B or alternatively regions of a city where access is restricted or requires the payment of a fee.

Each travel monitor 1604 preferably includes a receiver 1900 which interfaces with a CPU 1902. CPU 1902 interfaces with memory 1606 and with communicator 1608.

As illustrated in FIG. 11B, communicator 1608 associated with each travel monitor 1604 downloads data stored in memory 1606 and relating to vehicle operations over a time period extending from the preceding download, in a composite message, preferably in a wireless manner, to central unit 1610.

Typically, the composite message may be transmitted at any time from the communicator 1608 to the central unit 1610. The message typically includes data relating to the identity of the vehicle, the date and the time vehicle presence is sensed as well as the identity of the travel monitor 1604, which, of course, indicates its location.

Composite messages may be transmitted at predetermined times or upon accumulation of data relating to a predetermined number of events or based on any other suitable criterion or combination of criteria.

The central unit 1610 preferably employs the information contained in the composite messages received by it from various travel monitors 1604 to compute fees chargeable to individual vehicles, which are based, inter alia, on time duration of vehicle presence within given regions.

Central unit 1610 typically includes a communicator 1908 which interfaces with a CPU 1910. CPU 1910 preferably interfaces with a database 1912 and outputs to a billing system 1914. Communication between communicators 1608 and 1908 may be wired or wireless.

Turning now to FIG. 11C, it is seen that vehicle 1700 includes a receiver 1702 receiving inputs from transmitters 1703. Receiver 1702 outputs to a CPU 2002 which interfaces with memory 1706 and with an optional display 2004. CPU 2002 also interfaces with on-board communicator 1708 and with a vehicle operation monitor, such as pollution monitor 1707.

As illustrated in FIG. 10C, when the vehicle 1700 is located at one of a multiplicity of predetermined download locations, such as a suitably equipped filling station, on-board communicator 1708 downloads data stored in memory 1706 relating to vehicle operations over a time preferably extending since a previous download, typically in a wireless manner, to intermediate storage and communication unit 1712. The intermediate storage and communication unit 1712 includes a receiver or transceiver 2006 which interfaces with a CPU 2008. The CPU 2008 interfaces with a memory 2010 which stores data relating to vehicle operations in respect of a multiplicity of vehicles and with a communicator 2012, which communicates this data, in a composite message, preferably in a wireless manner to central unit 1710.

Central unit 1710 preferably includes a receiver or transceiver 2014 which interfaces with a CPU 2016. The CPU 2016 in turn interfaces with a database 2018. The database accumulates the content of the composite messages received by the central unit 1710 and supplies this content in an appropriate form to a billing system 2020.

Additionally or alternatively, communicator 1708 may communicate directly with the central unit 1710, by passing the intermediate storage and communication unit 1712. In such a case, units 1712 may be obviated.

Figure 12A:
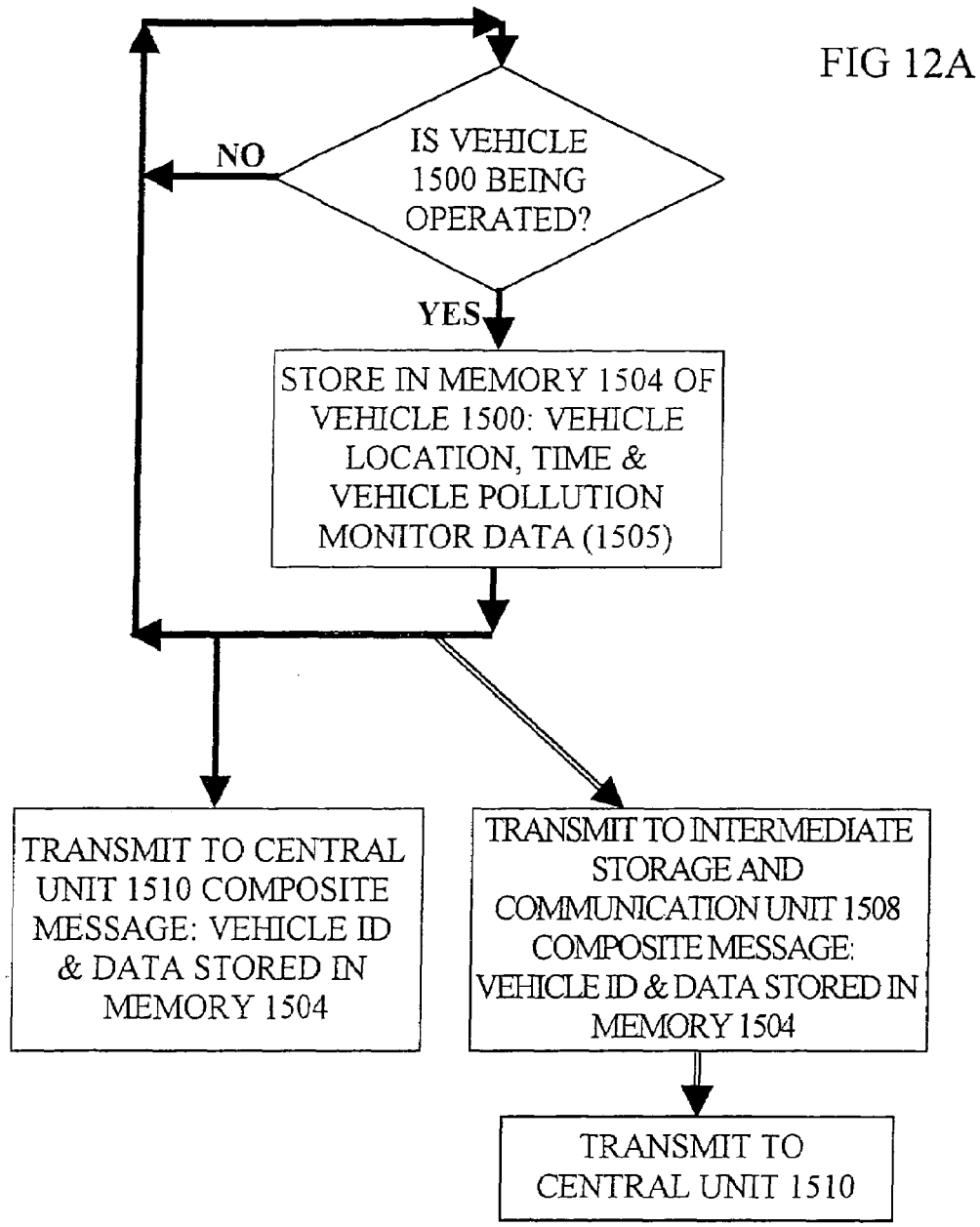
FIGS. 12A, 12B and 12C are simplified flow charts illustrating the operation of preferred embodiments of vehicle fee payment systems and methodologies of FIGS. 10A & 11A, 10B & 11B and 10C & 11C respectively.
Figure 12B:
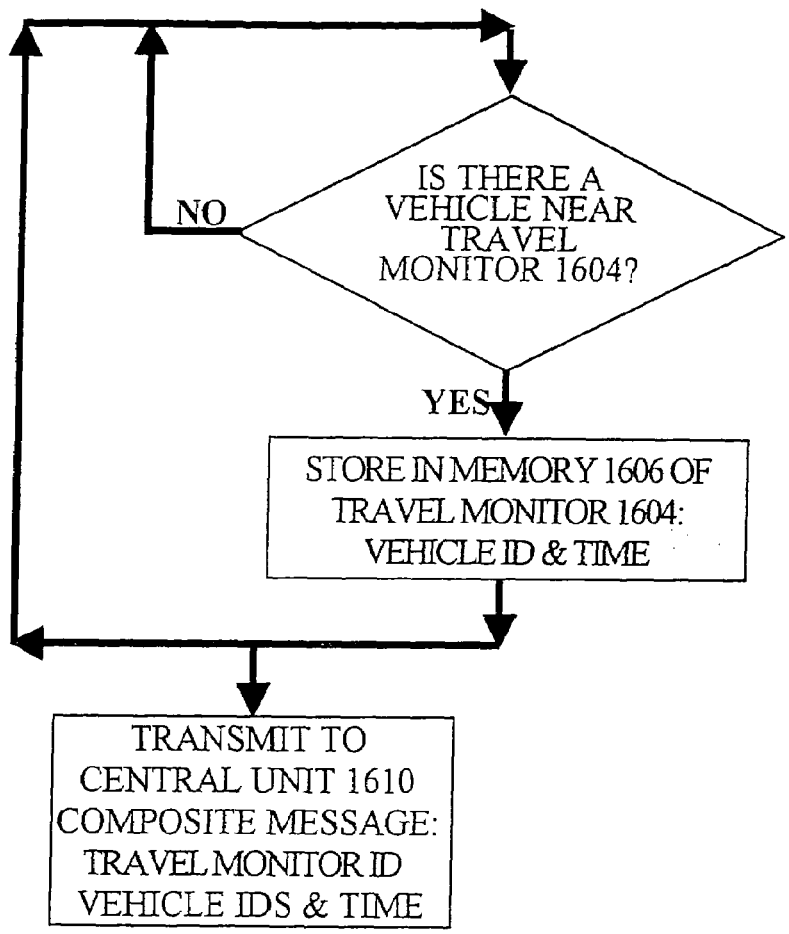
Figure 12C:
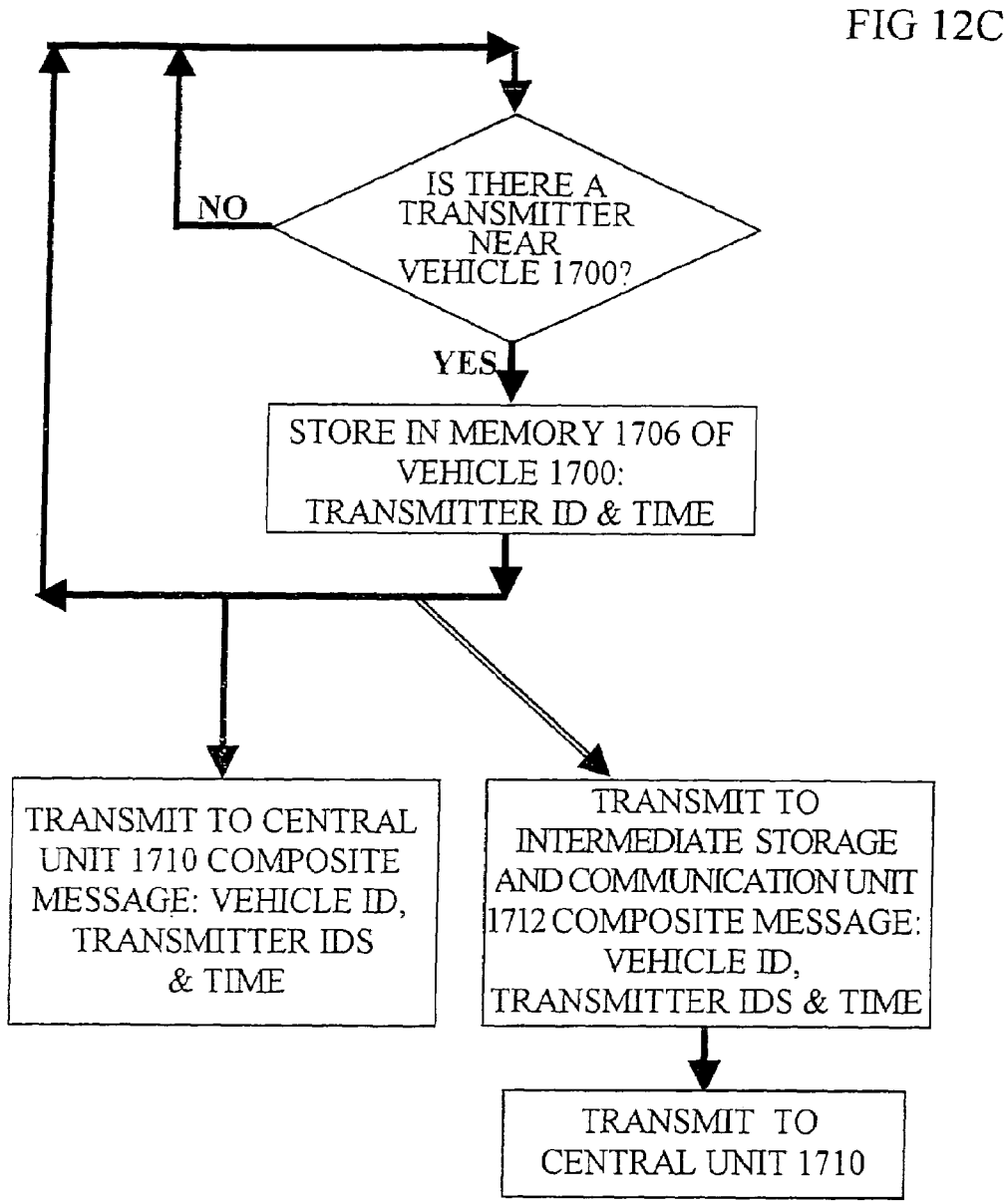

Reference is now made to FIGS. 12A, 12B & 12C which are simplified flow charts illustrating the operation of preferred embodiments of vehicle fee payment systems and methodologies of FIGS. 10A & 11A, 10B & 11B and 10C & 11C.

Turning now to FIG. 12A, it is seen that a determination of the location of vehicle 1500 is made repeatedly and the location of the vehicle 1500 as a function of time is stored in memory 1504 for such times as the vehicle 1500 is being operated. Preferably, an output from a vehicle operation monitor such as pollution monitor 1505 is also stored in the memory.

At any suitable time when the vehicle is located at a suitable download location, whether the vehicle is operating or not operating, the contents of the memory 1504 may be downloaded to the intermediate storage and communication unit 1508 and thence to the central unit 1510. Alternatively or additionally, the contents of memory 1504 may be downloaded directly to the central unit 1510.

Turning now to FIG. 12B, it is seen that the travel monitors 1604 continuously record the identity of vehicles in predetermined propinquity thereto as well as the time of such propinquity. This information is stored in memories 1606 of monitors 1604.

At any suitable time, the contents of the memories 1606 may be downloaded to the central unit 1610, which processes them into vehicle specific information useful for billing functionality and supplies the contents of memory 1604 to billing system 1914.

Turning now to FIG. 12C, it is seen that receiver 1702 records instances when vehicle 1700 is in predetermined propinquity to a transmitter 1703 as well as the time of such propinquity. This information is stored in memory 1706.

At any suitable time, the contents of the memories 1706 of vehicles 1700 may be downloaded to the intermediate storage and communication unit 1712 and thence to the central unit 1710. Alternatively or additionally, the contents of memory 1706 may be downloaded directly to the central unit 1710.

Figure 13B:
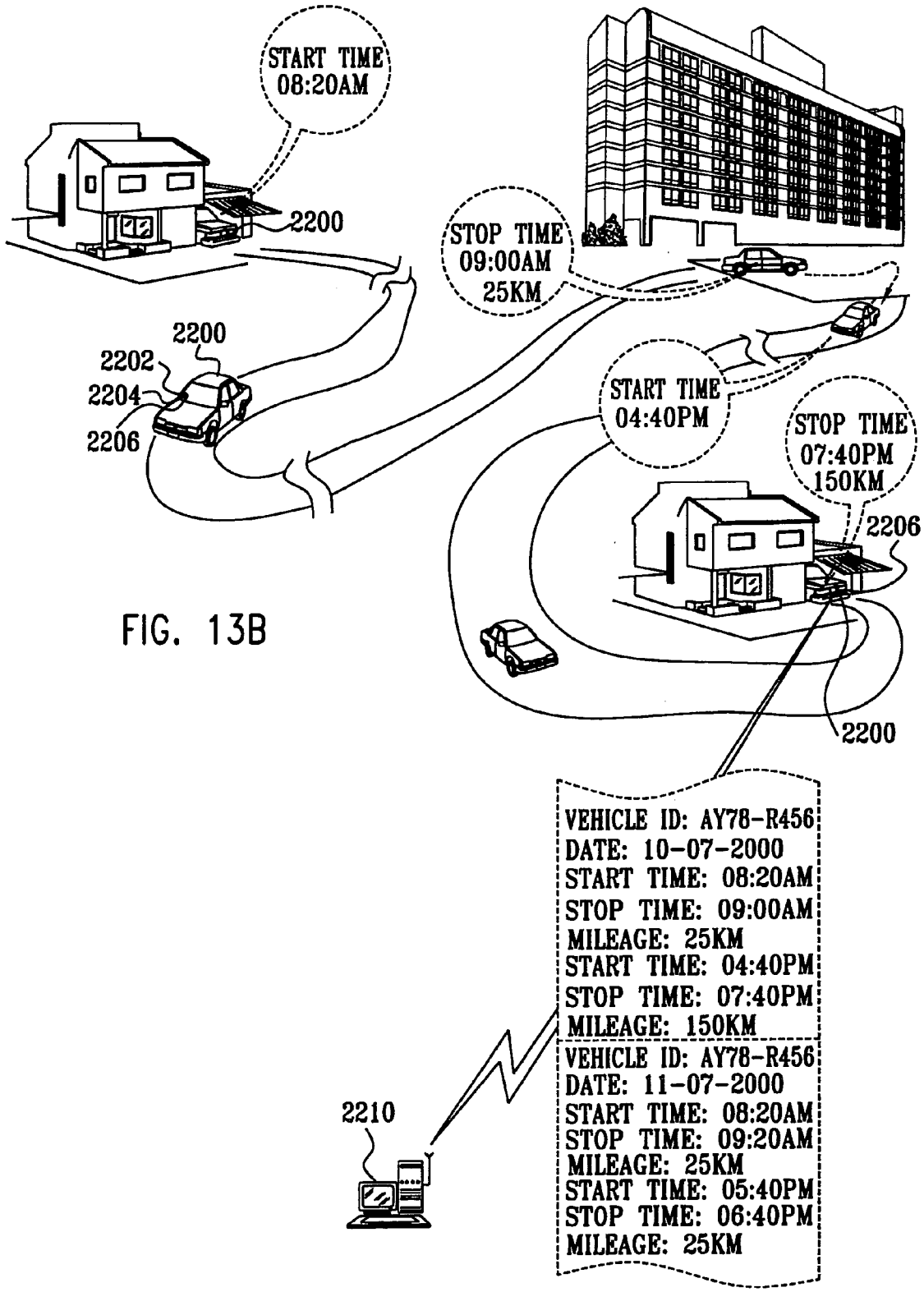

Reference is now made to FIGS. 13A, 13B and 13C, which are simplified pictorial illustrations of three alternative embodiments of vehicle-related services payment systems and methodologies constructed and operative in accordance with another preferred embodiment of the present invention and which preferably are characterized in that the payment in respect of a vehicle-related service is dependent on at least one of the mileage traveled by a vehicle and the time of day that the vehicle is being operated and preferably is dependent on both.

Important examples of such systems and methodologies include vehicle insurance billing and vehicle fee payment systems wherein the only variables, sensed by an on-board vehicle sensor, which are considered in the billing data are vehicle mileage and time of day or night of vehicle use. Other types of such systems and methodologies are also within the scope of the present invention.

Turning now to FIG. 13A, there is seen a vehicle 2100 equipped with a vehicle movement or other vehicle operation determining sensor 2102. Sensor 2102 is typically a mileage sensor of any suitable design or principle of operation. Sensor 2102 need not necessarily be connected to the electrical system of the vehicle 2100.

Without requiring any intervention by the driver, the times when a driver moves the vehicle 2100 and subsequently parks the vehicle 2100 as well as the accrued mileage are recorded in a memory 2104, which may store a series of vehicle operation start and stop records as well as mileage records.

As illustrated in FIG. 13A, when the vehicle 2100 is located at one of a multiplicity of predetermined download locations, such as a suitably equipped filling station, an on-board communicator 2106 downloads data stored in memory 2104 and relating to a plurality of vehicle operation start and stop events as well as mileage records, typically in a wireless manner, to an intermediate storage and communication unit 2108, typically located at the filling station. The intermediate storage and communication unit 2108 preferably receives and stores data relating to a plurality of vehicle operation start and stop events as well as mileage records in respect of a multiplicity of vehicles and communicates this data, in a composite message, preferably in a wireless manner to a central unit 2110. Alternatively or additionally, download locations may be found at other locations, such as road intersections, parking lots and malls.

Typically, the composite message may be transmitted at any time from the intermediate storage and communication unit 2108 to the central unit 2110. Such a composite message typically includes messages relating to a plurality of vehicle operation start and stop events and corresponding mileage records for a multiplicity of different vehicles. In respect of each such event, the message typically includes data relating to the identity of the vehicle, the date, the start time of vehicle operation, the stop time of vehicle operation and the mileage.

Composite messages may be transmitted at predetermined times or upon accumulation of data relating to a predetermined number of events or based on any other suitable criterion or combination of criteria.

Turning now to FIG. 13B, there is seen a vehicle 2200 equipped with a movement or operation determining sensor 2202. Sensor 2202 is typically a mileage sensor of any suitable design or principle of operation. Sensor 2202 need not necessarily be connected to the electrical system of the vehicle 2200.

Without requiring any intervention by the driver, the times when a driver moves the vehicle 2200 and subsequently parks the vehicle 2200 as well as the accrued mileage are recorded in a memory 2204, which may store a series of vehicle operation start and stop records as well as mileage records.

As illustrated in FIG. 13B, an on-board communicator 2206 downloads data stored in memory 2204 and relating to a plurality of vehicle operation start and stop events and corresponding mileage records, in a composite message, preferably in a wireless manner to a central unit 2210.

Typically, the composite message may be transmitted at any time from the communicator 2206 to the central unit 2210. Such a composite message typically includes messages relating to a plurality of vehicle operation start and stop events and corresponding mileage records. In respect of each such event, the message typically includes data relating to the identity of the vehicle, the date, the start time of vehicle operation and the stop time of vehicle operation as well as mileage records.

Composite messages may be transmitted at predetermined times or upon accumulation of data relating to a predetermined number of events or based on any other suitable criterion or combination of criteria.

Turning now to FIG. 13C, there is seen a vehicle 2300 equipped with a GPS receiver 2302 receiving inputs from satellites 2303 or similar location determining device. The GPS receiver 2302 senses when the location of the vehicle changes.

Without requiring any intervention by the driver, the times when a driver moves the vehicle 2300 and subsequently parks the vehicle 2300 as well as the corresponding accrued mileage are recorded in a memory 2304, which may store a series of vehicle operation start and stop records as well as mileage records.

As illustrated in FIG. 13C, an on-board communicator 2306 downloads data stored in memory 2304 and relating to a plurality of vehicle operation start and stop events and accrued mileage, in a composite message, preferably in a wireless manner to a central unit 2310.

Typically, the composite message may be transmitted at any time from the communicator 2306 to the central unit 2310. Such a composite message typically includes messages relating to a plurality of vehicle operation start and stop events and accrued mileage. In respect of each such event, the message typically includes data relating to the identity of the vehicle, the date, the start time of vehicle operation and the stop time of vehicle operation as well as the accrued mileage.

Composite messages may be transmitted at predetermined times or upon accumulation of data relating to a predetermined number of events or based on any other suitable criterion or combination of criteria.

Additionally or alternatively, communicator 2306 may communicate with the central unit 2310 via an intermediate storage and communication unit 2308, much in the same way as described hereinabove with reference to FIG. 13A.

Figure 14A:
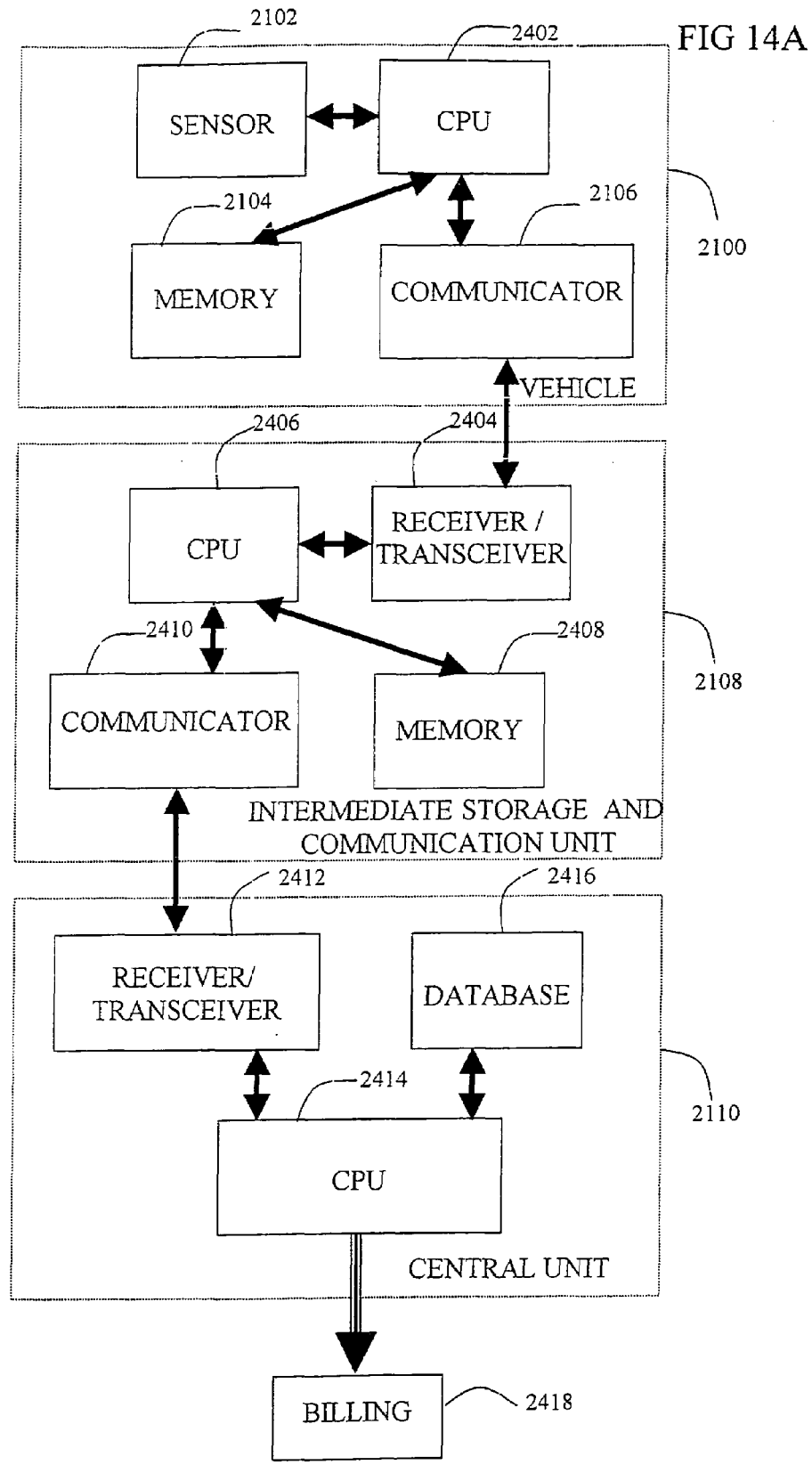
Figure 14B:
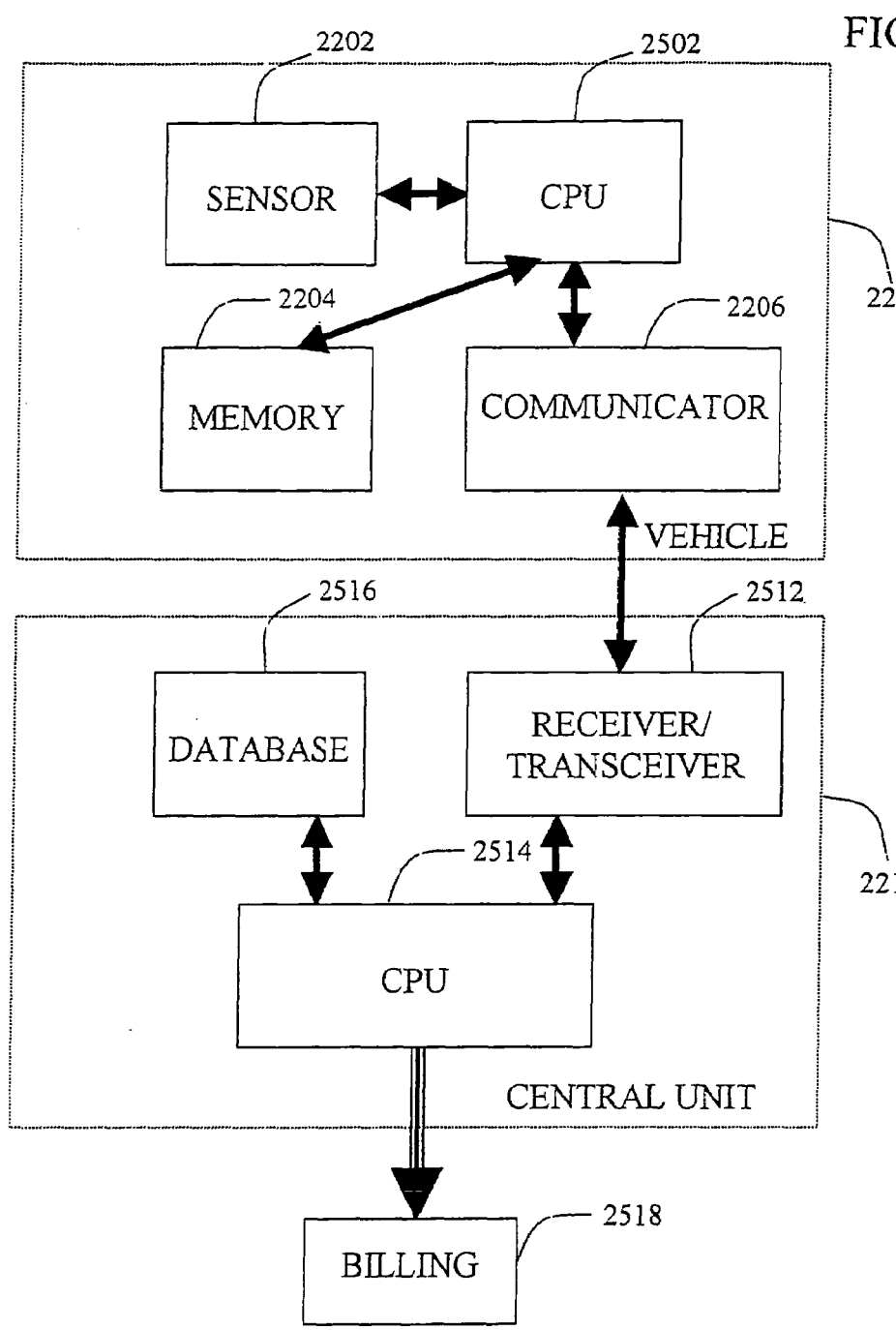

Reference is now made to FIGS. 14A, 14B and 14C, which are simplified block diagram illustrations of three alternative embodiments of vehicle-related services payment systems and methodologies constructed and operative in accordance with a preferred embodiment of the present invention and corresponding to FIGS. 13A, 13B & 13C respectively.

Turning now to FIG. 14A, it is seen that vehicle 2100 includes a CPU 2402, which interfaces with sensor 2102, memory 2104 and on-board communicator 2106.

As illustrated in FIG. 14A, when the vehicle 2100 is located at one of a multiplicity of predetermined download locations, such as a suitably equipped filling station, on-board communicator 2106 downloads data stored in memory 2104 and relating to a plurality of vehicle operation start and stop events and corresponding mileage records, typically in a wireless manner, to intermediate storage and communication unit 2108. The intermediate storage and communication unit 2108 includes a receiver or transceiver 2404 which interfaces with a CPU 2406. The CPU interfaces with a memory 2408 which stores data relating to a plurality of vehicle operation start and stop events and corresponding accrued mileage in respect of a multiplicity of vehicles and with a communicator 2410, which communicates this data, in a composite message, preferably in a wireless manner, to central unit 2110.

Central unit 2110 preferably includes a receiver or transceiver 2412 which interfaces with a CPU 2414. The CPU 2414 in turn interfaces with a database 2416. The database accumulates the content of the composite messages received by the central unit 2110 and supplies this content in an appropriate form to a billing system 2418. The billing system 2418 may take into account appropriate additional criteria, such as, for example in the case of insurance, the age and driving experience of a driver and various characteristics of the vehicle or in the case of vehicle-related fees, the type and weight of the vehicle.

Turning now to FIG. 14B, it is seen that vehicle 2200 includes a CPU 2502, which interfaces with sensor 2202, memory 2204 and on-board communicator 2206.

As illustrated in FIG. 14B, on-board communicator 2206 downloads data stored in memory 2204 and relating to one or more vehicle operation start and stop events and accrued mileage records, typically in a wireless manner, to central unit 2210. Central unit 2210 preferably includes a receiver or transceiver 2512 which interfaces with a CPU 2514. The CPU 2514 in turn interfaces with a database 2516. The database accumulates the content of the composite messages received by the central unit 2210 and supplies this content in an appropriate form to a billing system 2518.

Turning now to FIG. 14C, it is seen that vehicle 2300 includes a GPS receiver 2302 receiving inputs from satellites 2303. GPS receiver 2302 outputs to a CPU 2602 which interfaces with memory 2304 and with an optional display 2604. CPU 2602 also interfaces with on-board communicator 2306.

As illustrated in FIG. 14C, when the vehicle 2300 is located at one of a multiplicity of predetermined download locations, such as a suitably equipped filling station, on-board communicator 2306 downloads data stored in memory 2304 and relating to a plurality of vehicle operation start and stop events as well as accrued mileage, typically in a wireless manner, to intermediate storage and communication unit 2308. The intermediate storage and communication unit 2308 includes a receiver or transceiver 2605 which interfaces with a CPU 2606. The CPU interfaces with a memory 2608 which stores data relating to a plurality of vehicle operation start and stop events as well as accrued mileage in respect of a multiplicity of vehicles and with a communicator 2610, which communicates this data, in a composite message, preferably in a wireless manner to central unit 2310.

Central unit 2310 preferably includes a receiver or transceiver 2612 which interfaces with a CPU 2614. The CPU 2614 in turn interfaces with a database 2616. The database accumulates the content of the composite messages received by the central unit 2310 and supplies this content in an appropriate form to a billing system 2618.

Additionally or alternatively, communicator 2306 may communicate directly with the central unit 2310, bypassing the intermediate storage and communication unit 2308. In such a case, units 2308 may be obviated.

Figure 15A:
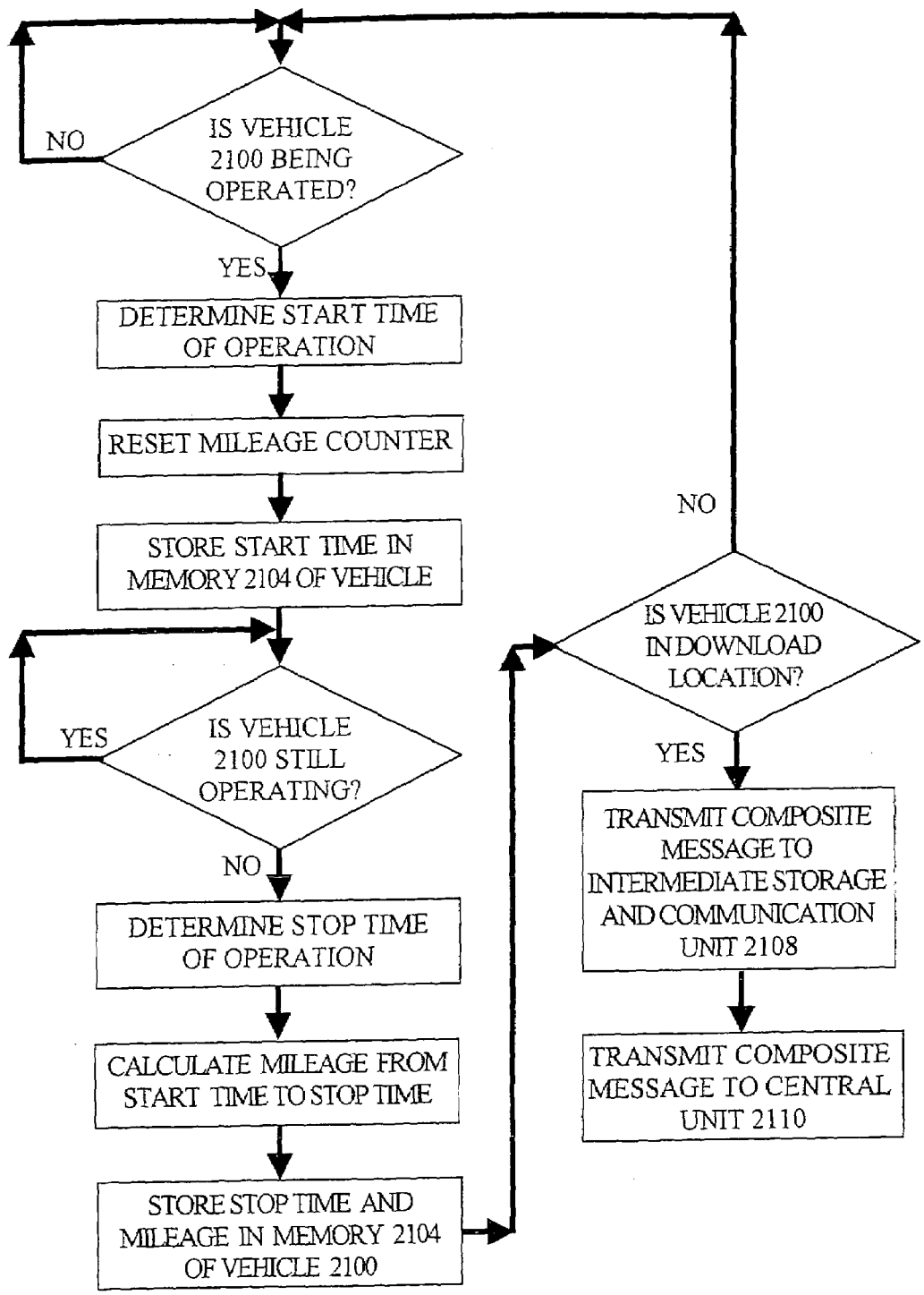
FIGS. 15A, 15B and 15C are simplified flow charts illustrating the operation of the three alternative embodiments of payment systems and methodologies of FIGS. 13A & 14A, 13B & 14B and 13C & 14C respectively.
Figure 15B:
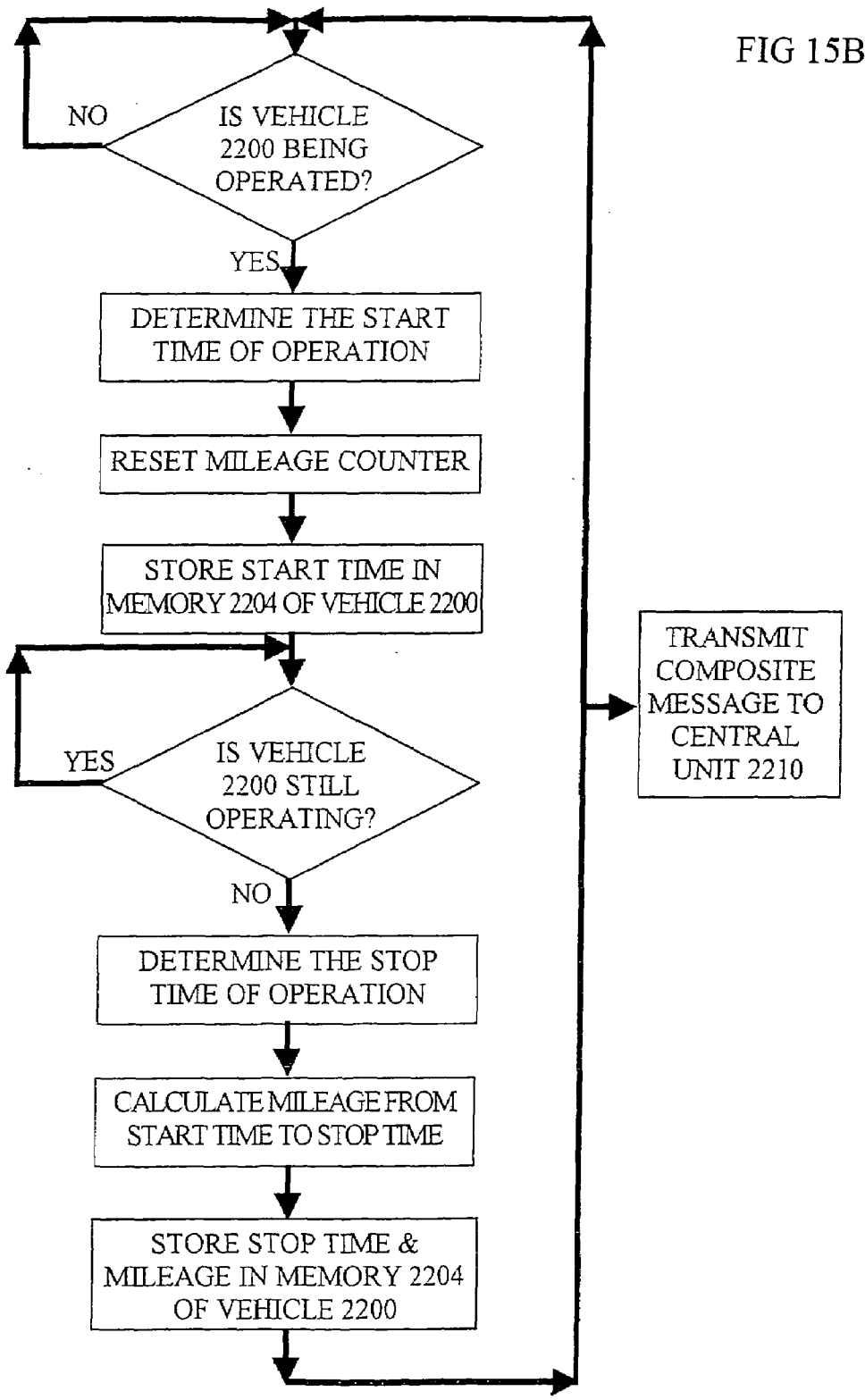
Figure 15C:
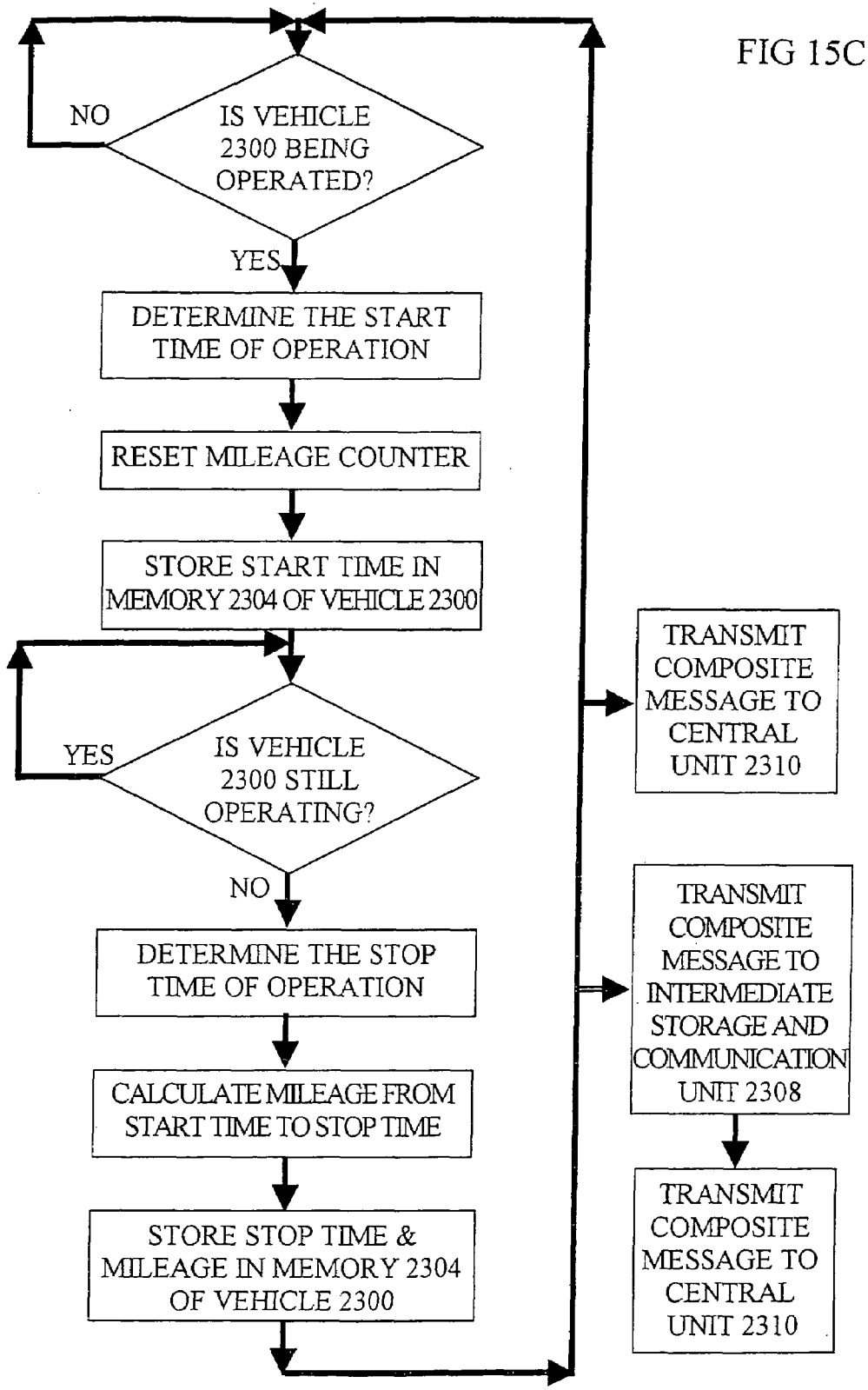

Reference is now made to FIGS. 15A, 15B and 15C, which are simplified flow charts illustrating the operation of the three alternative embodiments of payment systems and methodologies of FIGS. 13A & 14A, 13B & 14B and 13C & 14C, respectively.

Turning now to FIG. 15A, it is seen that a determination of whether vehicle 2100 is being operated is made repeatedly. If the vehicle is being operated, a determination of the start time of vehicle operation is made, a mileage count is started and the start time is stored in memory 2104.

While the vehicle is operating, a determination of whether vehicle 2100 is still being operated is made repeatedly. If the vehicle ceases operation for at least a predetermined time, typically 5 minutes, a determination of the stop time of vehicle operation is made and the stop time and accrued mileage are stored in memory 2104.

At any suitable time when the vehicle is located at a suitable download location, whether the vehicle is operating or not operating, the contents of the memory 2104 may be downloaded to the intermediate storage and communication unit 2108 and thence to the central unit 2110.

Turning now to FIG. 15B, it is seen that a determination of whether vehicle 2200 is being operated is made repeatedly. If the vehicle is being operated, a mileage count is started, a determination of the start time of vehicle operation is made and the start time is stored in memory 2204.

While the vehicle is operating, a determination of whether vehicle 2200 is still being operated is made repeatedly. If the vehicle ceases operation for at least a predetermined time, typically 5 minutes, a determination of the stop time of vehicle operation is made and the stop time and accrued mileage are stored in memory 2204.

At any suitable time, whether the vehicle is operating or not operating, the contents of the memory 2204 may be downloaded to the central unit 2210.

Turning now to FIG. 15C, it is seen that a determination of whether vehicle 2300 is being operated is made repeatedly. If the vehicle is being operated, a mileage count is started, a determination of the start time of vehicle operation is made and the start time is stored in memory 2304.

While the vehicle is operating, a determination of whether vehicle 2300 is still being operated is made repeatedly. If the vehicle ceases operation for at least a predetermined time, typically 5 minutes, a determination of the stop time of vehicle operation is made and the stop time and accrued mileage are stored in memory 2304.

At any suitable time, whether the vehicle is operating or not operating, the contents of the memory 2304 may be downloaded directly to central unit 2310. Alternatively, the contents of memory 2304 may be downloaded via the intermediate storage and communication unit 2308 to the central unit 2310 when the vehicle is at a suitable download location.

It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

The invention claimed is:

1. A vehicle-related services system comprising:
    at least one sensor on board a vehicle and automatically sensing the time during which said vehicle is being operated;
    at least one communicator on board said vehicle providing an output indicating the time during which said vehicle is being operated;
    at least one data processor receiving a communication from said at least one communicator, indicating the time during which said vehicle, is being operated and providing a billing data output in respect of a vehicle-related service which is dependent on the time during which said vehicle is being operated and is not dependent on any other input received from a vehicle-mounted sensor; and
    at least one intermediate storage and communication unit operative to receive said output from said communicator when a vehicle in which said communicator is located is at one of a plurality of predetermined locations, said at least one intermediate storage and communication unit being operative to retransmit said output to said data processor.

2. A vehicle-related services system according to claim 1 and wherein said intermediate storage and communication unit is located at a vehicle fueling station.

3. A vehicle-related services system according to claim 1 and wherein said communicator communicates with said at least one data processor at least partially not in real time.

4. A vehicle-related services system according to claim 1 and wherein said time during which said vehicle is being operated comprises at least one of:
    the time duration when the vehicle is being operated; and
    the time of day or night when the vehicle is being operated.

5. A vehicle-related services system according to claim 1 and wherein at least one of said at least one intermediate storage and communication units is operative to receive said output data from a plurality of said communicators on board a corresponding plurality of said vehicles and to communicate said output in at least one composite message to said data processor.

6. A vehicle-related services system according to claim 1 and wherein said at least one sensor is not connected to an electical system of said vehicle.

7. A vehicle-related services system according to claim 1 and wherein said at least one data processor comprises a vehicle fee payment data processor.

8. A vehicle-related services system according to claim 1 and wherein said at least one data processor comprises a vehicle insurance billing data processor.

9. A vehicle-related services system comprising:
    a sensor on board a vehicle and automatically sensing only the time during which said vehicle is being operated;
    at least one communicator on board said vehicle providing an output indicating the time during which said vehicle is being operated;

at least one data processor receiving a communication from said at least one communicator, indicating the time during which said vehicle is being operated and providing a billing data output in respect of a vehicle-related service which is dependent on the time during which said vehicle is being operated; and at least one intermediate storage and communication unit operative to receive said output from said communicator when a vehicle in which said communicator is located is at one of a plurality of predetermined locations, said at least one intermediate storage and communication unit being operative to retransmit said output to said data processor.

10. A vehicle-related services system according to claim 9 and wherein said intermediate storage and communication unit is located at a vehicle fueling station.

11. A vehicle-related services system according to claim 9 and wherein said time during which said vehicle is being operated comprises at least one of:

the time duration when the vehicle is being operated; and the time of day or night when the vehicle is being operated.

12. A vehicle-related services system according to claim 9 and wherein at least one of said at least one intermediate storage and communication units is operative to receive said output data from a plurality of said communicators on board a corresponding plurality of said vehicles and to communicate said output in at least one composite message to said data processor.

13. A vehicle-related services system according to claim 9 and wherein said sensor is not connected to an electrical system of said vehicle.

14. A vehicle-related services system according to claim 9 and wherein said at least one data processor comprises a vehicle fee payment data processor.

15. A vehicle-related services system according to claim 9 and wherein said at least one data processor comprises a vehicle insurance billing data processor.

16. A vehicle-related services system comprising:

at least one sensor on board a vehicle and automatically sensing the time during said vehicle is being operated;

a communicator on board said vehicle providing an output indicating only the time during which said vehicle is being operated;

at least one data processor receiving a communication from said communicator, indicating the time during which said vehicle is being operated and providing a billing data output in respect of a vehicle-related service which is dependent on the time during which said vehicle is being operated; and at least one intermediate storage and communication unit operative to receive said output from said communicator when a vehicle in which said communicator is located is at one of a plurality of predetermined locations, said at least one intermediate storage and communication unit being operative to retransmit said output to said data processor.

17. A vehicle-related services system according to claim 16 and wherein said time during which said vehicle is being operated comprises at least one of:

the time duration when the vehicle is being operated; and the time of day or night when the vehicle is being operated.

18. A vehicle-related services system according to claim 16 and wherein said intermediate storage arid communication unit is located at a vehicle fueling station.

19. A vehicle-related services system according to claim 16 and wherein at least one of said at least one intermediate storage and communication unit is operative to receive said output data from a plurality of said communicators on board a corresponding plurality of said vehicles and to communicate said output in at least one composite message to said data processor.

20. A vehicle-related services system according to claim 16 and wherein said at least one sensor is not connected to an electrical system of said vehicle.

21. A vehicle-related services system according to claim 16 and wherein said at least one data processor comprises a vehicle fee payment data processor.

22. A vehicle-related services system according to claim 16 and wherein said at least one data processor comprises a vehicle insurance billing data processor.

* * * * *